US008228973B2

(12) United States Patent
Ishii et al.

(10) Patent No.: US 8,228,973 B2
(45) Date of Patent: *Jul. 24, 2012

(54) COMMUNICATION SYSTEM, COMMUNICATION METHOD FOR THE SAME AND MOBILE STATION AND BASE STATION USED FOR THE SAME

(75) Inventors: Naoto Ishii, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1460 days.

This patent is subject to a terminal disclaimer.

(21) Appl. No.: 11/728,572

(22) Filed: Mar. 26, 2007

(65) Prior Publication Data

US 2007/0253473 A1 Nov. 1, 2007

(30) Foreign Application Priority Data

Apr. 28, 2006 (JP) ................. 2006-125576

(51) Int. Cl.
*H04B 3/46* (2006.01)
*H04B 17/00* (2006.01)
*H04Q 1/20* (2006.01)
(52) U.S. Cl. ....................... 375/228; 375/224
(58) Field of Classification Search .................. 375/224, 375/228
See application file for complete search history.

(56) References Cited

U.S. PATENT DOCUMENTS 8,040,868 B2 * 10/2011 Kuroda et al. ............. 370/345
2005/0025254 A1 * 2/2005 Awad et al. ................ 375/295

(Continued)

FOREIGN PATENT DOCUMENTS

EP 1 575 234 A2 9/2005

(Continued)

OTHER PUBLICATIONS

"3$^{RD}$ Generation Partnership Project; Technical Specification Group Radio Access Network; Physical Layer Aspects for Evolved TRA (Release 7)", V1.2.0, Feb. 2006.

(Continued)

*Primary Examiner* — Shuwang Liu
*Assistant Examiner* — Sung Ahn
(74) *Attorney, Agent, or Firm* — Scully, Scott, Murphy & Presser, P.C.

(57) ABSTRACT

When a downlink communication channel quality is informed of in the downlink packet communication using a shared channel, the communication channel quality for each RB that is obtained by dividing a downlink into a plurality of small bands (RBs) is informed of via the uplink. As the downlink band is getting wider, the number of RBs increases and the bands required to inform via the uplink also increases. Then, in the mobile station, RBs whose the communication channel quality is at a predetermined threshold or more are selected as a selected group, with the others considered as in the non-selected group, the information indicating which groups do they belong to is generated as a bitmap, and then the average value, the minimum value and the maximum value of the communication channel quality of the RBs are also obtained. Then the minimum or the maximum value is transmitted as a represented value of the selected group, the average value is transmitted as a representative value of the non-selected group, and also the bitmap is transmitted to the base station. At the base station, the communication channel quality for each RB is restored by replacing the communication channel quality belonging to the selected group by the minimum or the maximum value, and the communication channel quality belonging to the non-selected group by the average value.

11 Claims, 49 Drawing Sheets

U.S. PATENT DOCUMENTS

2005/0180450 A1* 8/2005 Gaal et al. .................. 370/437
2007/0298728 A1* 12/2007 Imamura et al. ............. 455/77

FOREIGN PATENT DOCUMENTS

| JP | 2004-032176 | | 1/2004 |
| JP | 2004-208234 | | 7/2004 |
| WO | 2004/114549 A1 | | 12/2004 |
| WO | 2005/088870 A1 | | 9/2005 |
| WO | WO2006028204 | * | 3/2006 |
| WO | 2007/015627 A1 | | 2/2007 |
| WO | 2007/073121 A1 | | 6/2007 |

OTHER PUBLICATIONS

Motorola "CQI Feedback Scheme for EUTRA", 3RD Generation Partnership Project (3GPP), Technical Specification Group (TSG) Radio Access Network (RAN); Workinggroup 1 No. r1-051334 pp. 1-9 Nov. 7, 2005.

Motorola, "Frequency Domain Scheduling for E-UTRA", 3rd Generation Partnership Project (3GPP), Technical Specification Group (TSG) Radio Access Network (RAN); Workinggroup 1 No. r1-060381 pp. 1-9, Feb. 13, 2006.

Motorola et al., "Text Proposal on CQI Report", 3GPP Draft, R1-060260, 3rd Generation Partnership Project (3GPP), Mobile Competence Centre; vol. RAN WG1, No. Helsinki, Finland Jan. 26, 2006.

NEC "CQI Reporting" 3GPP Draft; R1-06132, 3rd Generation Partnership Project (3GPP), Mobile Competence Centre; vol. RAN WG1, No. Shanghai, China May 2, 2006.

Extended European search report dated Jun. 10, 2011 in connection with the counterpart European Patent Application No. 07008455.3.

Japanese Office Aciton dated Feb. 22, 2011.

* cited by examiner

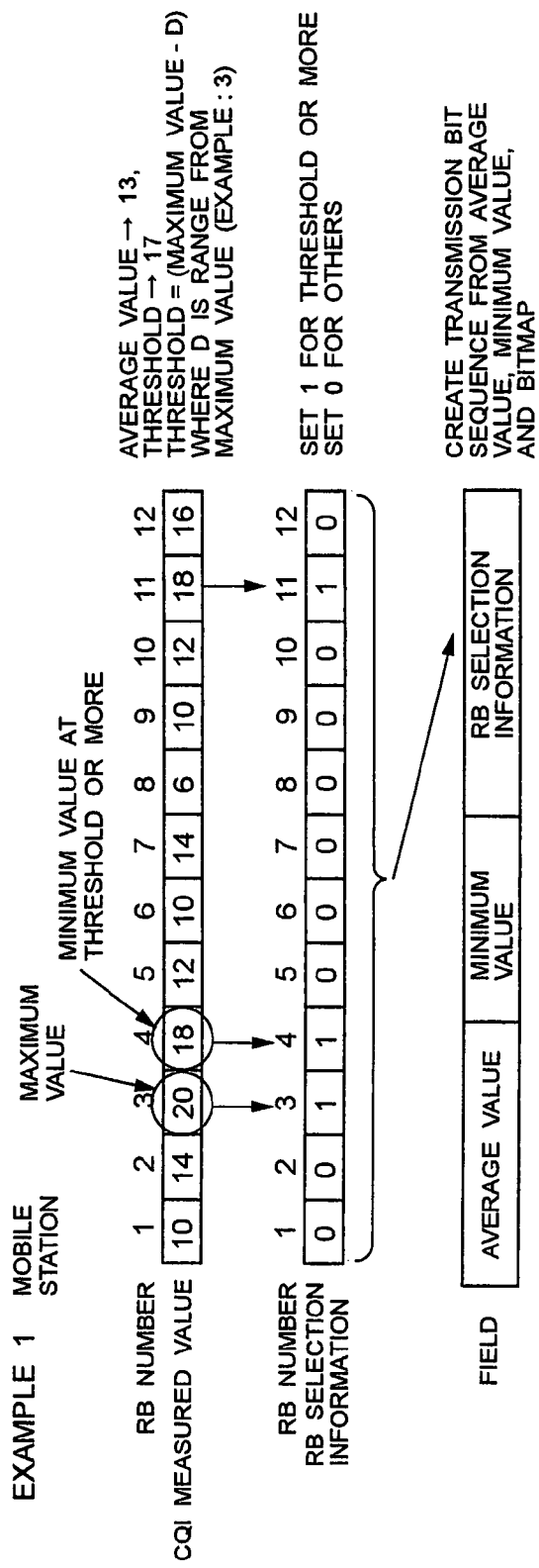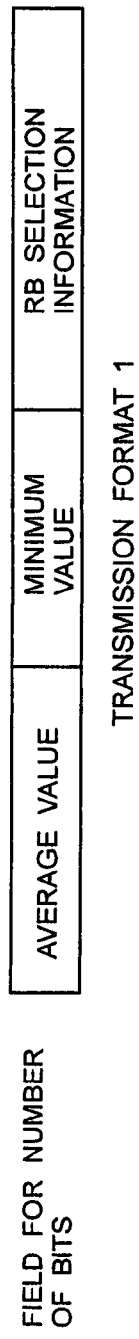

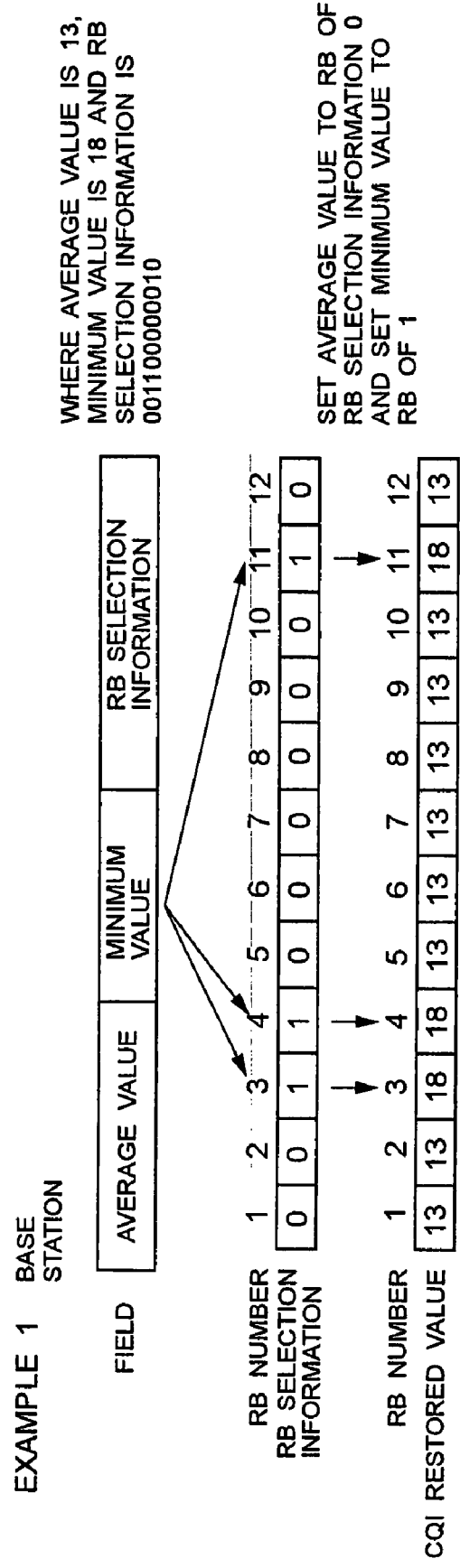

FIG. 15

| FIELD FOR NUMBER OF BITS | 5 | 11 | 1 |
|---|---|---|---|
| | CQI VALUE OF REFERENCE RB | TIME RELATIVE VALUE INFORMATION | STEP SIZE INFORMATION |

TRANSMISSION FORMAT 2

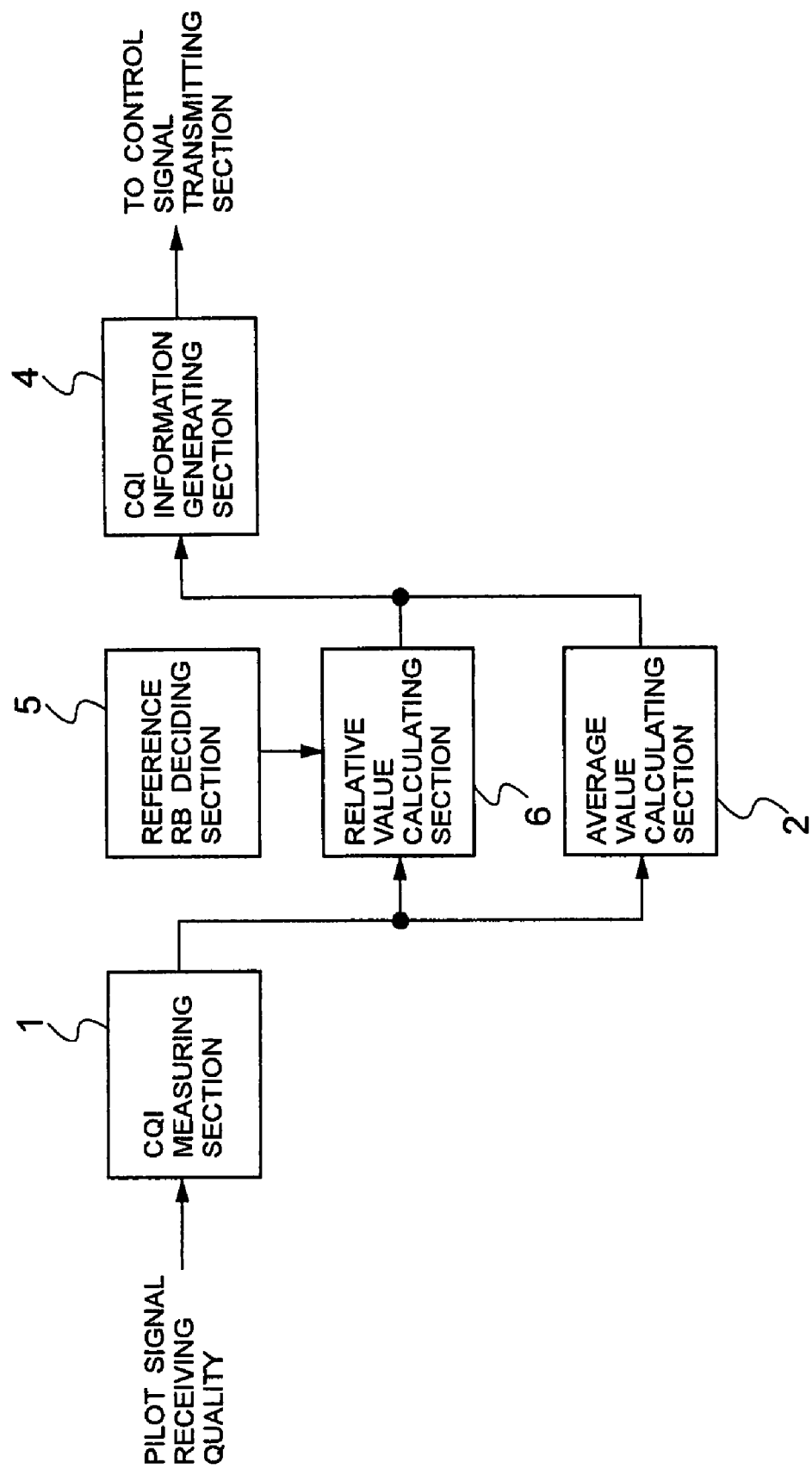

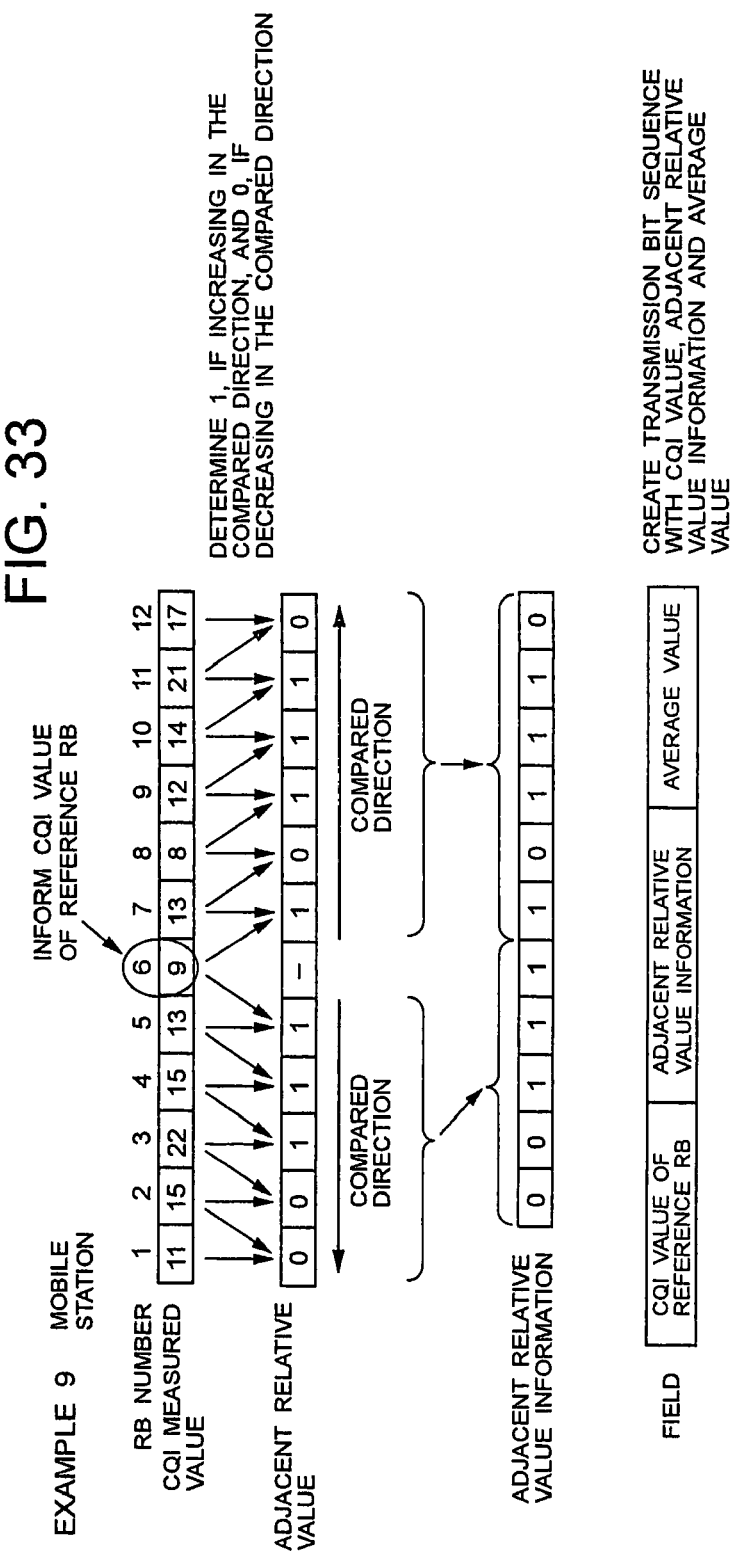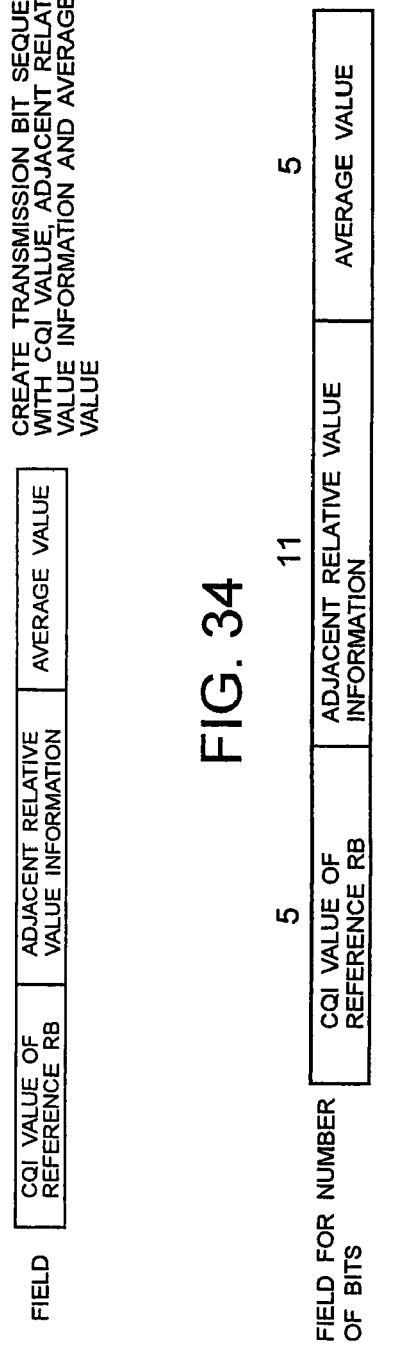

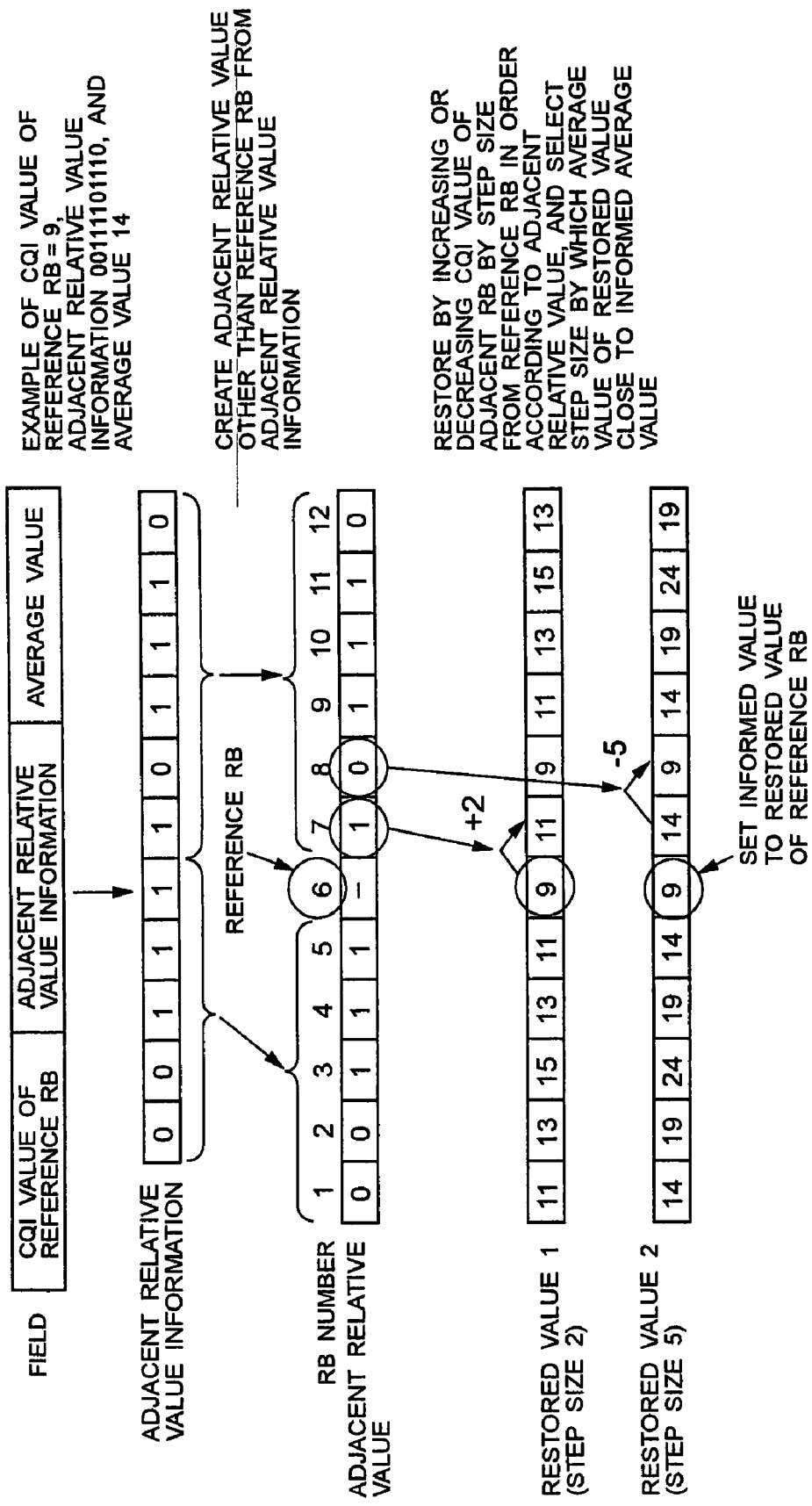

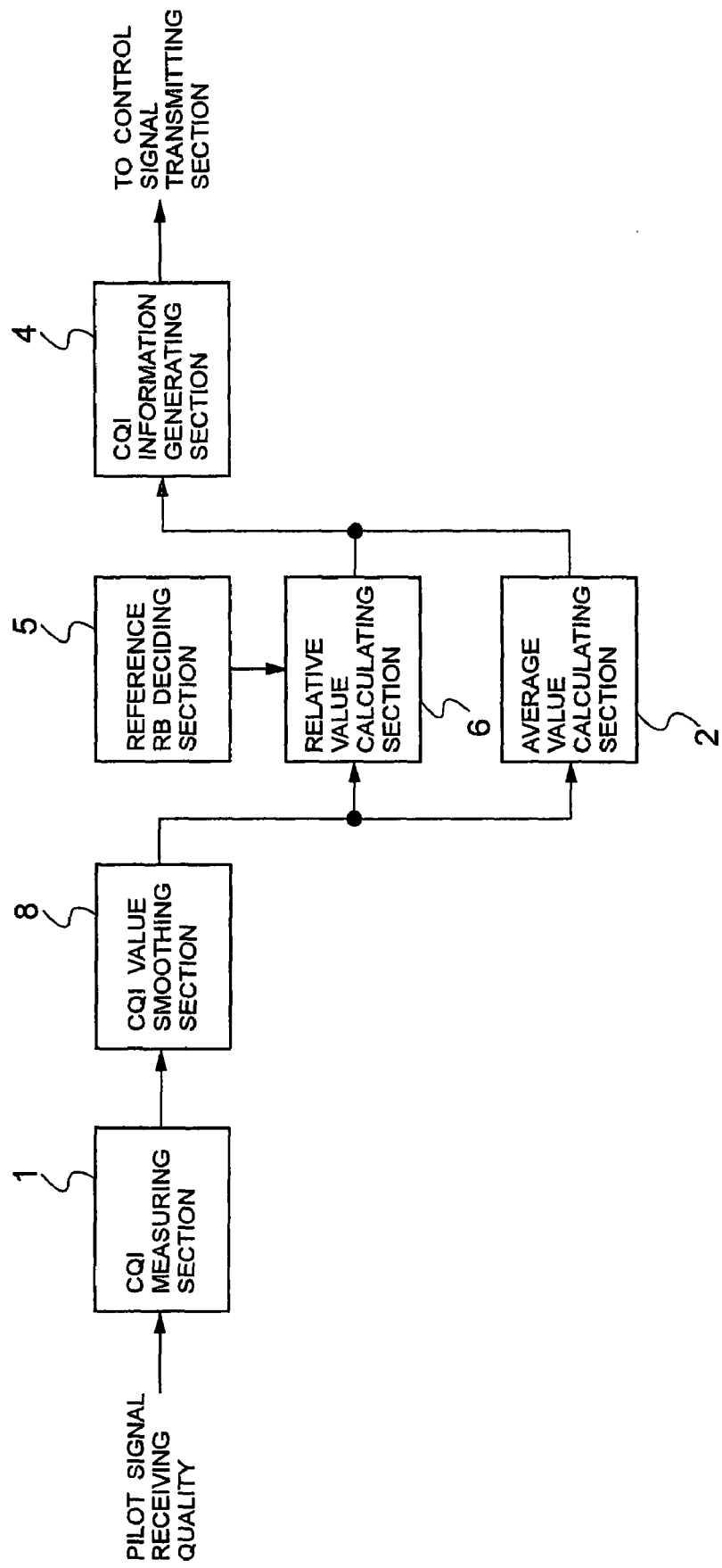

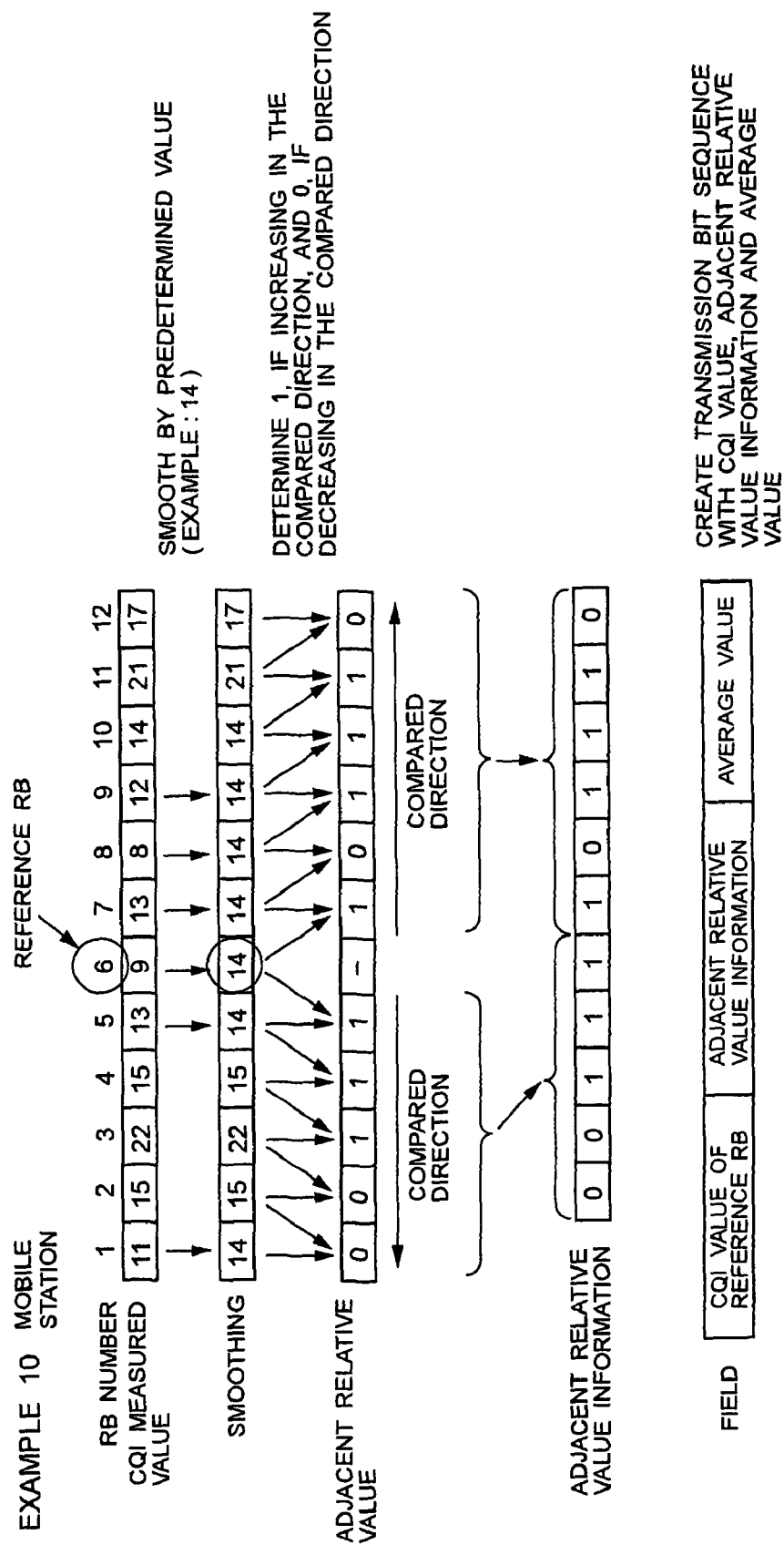

TRANSMISSION FORMAT 6

FIG. 46

| FIELD FOR NUMBER OF BITS | 5 | 11 | 1 |
|---|---|---|---|
| | MAXIMUM VALUE OF MEASURED VALUE | RELATIVE VALUE INFORMATION OF RESTORED VALUE | STEP SIZE INFORMATION |

TRANSMISSION FORMAT 7

FIG. 51

COMMUNICATION SYSTEM, COMMUNICATION METHOD FOR THE SAME AND MOBILE STATION AND BASE STATION USED FOR THE SAME

BACKGROUND OF THE INVENTION

1. Field of the Invention

The present invention relates to a communication system and a communication method for the same and a mobile station and a base station used for the same, and more particularly, to the improvement of a communication channel quality informing system for informing a downlink communication channel quality of a plurality of different frequency-bands in downlink packet communication using a shared channel in a mobile communication system.

2. Description of the Prior Art

As a packet communication system for performing a communication as a plurality of mobile stations share a radio band, a HSDPA (High Speed Downlink Packet Access) or a LTE (Long Term Evolution) that are standardized with the 3GPP are known. In such a packet communication system, the mobile station measures the receiving quality of a pilot channel transmitted in the downlink and informs the measurement in the uplink as a communication channel quality (CQI: Channel Quality Indicator).

Correspondence between the receiving quality and the CQI is decided in advance, for example, CQIs by the 30 levels (information in five bits) are defined in the HSDPA. The radio base station uses a CQI informed from the mobile station for packet scheduling for performing allocation of transmission opportunities, and for adaptive modulation for changing a modulating method and a coding rate for the communication channel coding. By using the communication channel quality in such a manner, a communication can be provided according to the communication channel for each mobile station; thus, a radio band can be efficiently used.

For the access system in the downlink of the LTE, the OFDM is considered. The radio band allocated to the system is divided into a plurality of small radio bands (RB: Resource Block) so that the mobile station informs a CQI for each RB to the radio base station. As a mobile station is allocated to each RB, the frequency division multiplex is realized. For example, relationship between the system band and the RB is shown in FIG. 54. Here, K represents the total number of RBs.

Related documents include 3GPP TSG RAN, TR25.814 ver. 1.2.0, "Physical Layer Aspects for Evolved UTRA", February 2006.

As a wireless band allocated to the system is getting wider, however, the transmission rate in the downlink increases and also the number of RBs increases. For example, in the LTE, the band of the RB is around 375 kHz, and in the system band of 5 MHz, it is divided into twelve. The band of the RB depends little on the width of the system band. Thus, as the system is getting to have a wider band, the number of CQIs for the mobile station needs to inform increases.

The mobile station uses the uplink to inform the CQI. In the LTE, however, the uplink is also a shared channel and uses the frequency division multiplex, thus, the number of the mobile stations that can transmit at a time is limited. Specifically, as the number of mobile stations to connect with the base station increases, a cyclical transmitting method is also used for increasing the number of multiplexing in the uplink.

On the other hand, as the CQI is used for scheduling or adaptive modulation in the downlink, if the CQI cannot inform the communication channel quality in an appropriate cycle, no scheduling nor adaptive modulation adapted to the communication channel quality of the mobile station is realized. Thus, it lowers a throughput in the downlink.

An object of the present invention is to provide a method for informing a communication quality which can transmit CQI required for scheduling or adaptive modulation in short cycles even if the number of the mobile stations to be connected with increases by reducing the amount of transmission for a time of transmission.

BRIEF SUMMARY OF THE INVENTION

A communication system according to the present invention is a communication system, in which a mobile station measures a communication channel quality of each of a plurality of bands obtained by dividing a communication band of a downlink and transmits, a result of the measurement to a base station via an uplink, wherein said mobile station includes means for selecting a band having a communication channel quality higher than a threshold from the measured communication channel quality and generating information indicating the selected band and the non-selected band as a bitmap, and means for transmitting the bitmap, the average value of the measured communication channel quality and a representative value (the minimum value and the maximum value) in said selected band to said base station.

A communication method according to the present invention is a communication method in a communication system, in which a mobile station measures a communication channel quality of each of a plurality of bands obtained by dividing a communication band of a downlink and transmits, a result of the measurement to a base station via an uplink, including: a step of selecting a band with a communication channel quality at a threshold or more from the measured communication channel quality and generating information indicating the selected band and the non-selected band as a bitmap, and a step of transmitting the bitmap, the average value of the measured communication channel quality and a representative value (the minimum value and the maximum value) in said selected band to said base station, in the mobile station.

A mobile station according to the present invention is a mobile station for measuring a communication channel quality of each of a plurality of bands and transmits the measurement to a base station via the uplink, each of said plurality of bands is obtained by dividing a downlink communication band into the plurality of bands, including: means for selecting a band with a communication channel quality at a threshold or more from the measured communication channel quality and generating information indicating a selected band and a non-selected band as a bitmap, and means for transmitting the bitmap, the average value of the measured communication channel quality and a representative value in the selected band (minimum value or maximum value) to the base station.

A base station according to the present invention includes means for receiving the bitmap, the average value and the representative value from the mobile station, and means for reproducing a communication channel quality for each band by setting the representative value to a communication channel quality of the selected band and the average value to the communication channel quality of the non-selected band, respectively.

Another communication system according to the present invention is a communication system, in which a mobile station measures a communication channel quality of each of a plurality of bands obtained by dividing a communication band of a downlink and transmits, a result of the measurement to a base station via an uplink, wherein the mobile station includes: means for representing a communication channel quality of a first band by a first code, representing a communication channel quality of a second band by a second code by using the communication channel quality of the first band as a reference, and representing a communication channel quality of a third band by a third code by using the communication channel quality of the second band as a reference, and means for transmitting at least the first, second and third codes to the base station.

Yet another communication system according to the present invention is a communication system, in which a mobile station measures a communication channel quality of each of a plurality of bands obtained by dividing a communication band of a downlink and transmits, a result of the measurement to a base station via an uplink, wherein the mobile station includes: means for representing a communication channel quality of a first band by a first code and representing a communication channel quality of a second band by a second code by using the first communication channel quality represented by the first code, and means for transmitting at least the first and second codes to the base station.

Yet another communication system according to the present invention is a communication system, in which a mobile station measures a communication channel quality of each of a plurality of bands obtained by dividing a communication band of a downlink and transmits, a result of the measurement to a base station via an uplink, wherein the mobile station includes: means for representing a communication channel quality of a first band by a first, code, representing a communication channel quality of a second band by a second code by using the communication channel quality of the first band as a reference, and representing a communication channel quality of a third band by a third code by using the communication channel quality of the second band as a reference; and means for transmitting at least the first, second and third codes to the base station.

A mobile station according to the present invention is a mobile station for measuring a communication channel quality of each of a plurality of bands and transmits the measurement to the base station via the uplink, each of the plurality of bands is obtained by dividing a downlink communication band into the plurality of bands, including means for representing a communication channel quality of a first band by a first code, representing a communication channel quality of a second band by a second code by using the communication channel quality of said first band as a reference, and representing a communication channel quality of a third band by a third code by using the communication channel quality of said second band as a reference; and means for transmitting at least said first, second and third codes to said base station. A base station according to the present invention includes means for receiving said first, second and third codes from said mobile station and reproducing a communication channel quality of each band.

Another communication method according to the present invention is a communication method for a mobile station to measure a communication channel quality of each of the plurality of bands and transmit the measurement to the base station via the uplink, each of the plurality of bands is obtained by dividing a downlink communication band into a plurality of bands, wherein the mobile station includes a step of representing a communication channel quality of a first band by a first code and representing a communication channel quality of a second band by a second code by using the first communication channel quality represented by the first code as a reference; and a step of transmitting at least the first and second codes to the base station.

Another mobile station according to the present invention is a mobile station for measuring a communication channel quality of each of the plurality of bands and transmitting the measurement to the base station via the uplink, each of the plurality of bands is obtained by dividing a downlink communication band into the plurality of bands, including means for representing a communication channel quality of a first band by a first code and representing a communication channel quality of the second band by a second code by using the first communication channel quality represented by said first code as a reference, and means for transmitting at least said first and second codes to said base station. Another base station according to the present invention includes means for receiving said first and second codes from said mobile station and reproducing a communication channel quality of each band.

Another communication system according to the present invention is a communication system, in which a mobile station measures a communication channel quality of each of a plurality of bands obtained by dividing a communication band of a downlink and transmits, a result of the measurement to a base station via an uplink, including: first means for selecting one of the plurality of bands and obtaining a restored value by increasing or decreasing a previous communication channel quality by a step size according to a relative value between the present communication channel quality and the previous communication channel quality for each band excepting the selected band, and generating information for increasing or decreasing a predetermined step size as a bitmap indicating time relative value information; and second means for transmitting at least the present communication channel quality of the one band and said bitmap, in the mobile station.

Another communication system according to the present invention is a communication system, in which a mobile station measures a communication channel quality of each of a plurality of bands obtained by dividing a communication band of a downlink and transmits, a result of the measurement to a base station via an uplink, including: first means for selecting one of the plurality of bands and obtaining two provisional restored values by increasing or decreasing a previous restored value by a predetermined step size for each band excepting the selected band, making the provisional restored value closer to a measured value the restored value, and generating information for increasing or decreasing the predetermined step size as a bitmap indicating a relative value of the restored value; and second means for transmitting at least the present communication channel quality of the one band and the bitmap, in the mobile station.

Another communication system according to the present invention is a communication system, in which a mobile station measures a communication channel quality of each of a plurality of bands obtained by dividing a communication band of a downlink and transmits, a result of the measurement to a base station via an uplink, including: first means for selecting one of the plurality of bands and generating a bitmap indicating a relative value for a restored value of the measured value by comparing a previous restored value and the present measured value for each band excepting the selected band, while obtaining next restored value by increasing or decreasing a predetermined step size according to said relative value; and second means for transmitting at least the present communication channel quality information of said one band and said bitmap, in the mobile station.

Another communication system according to the present invention is a communication system, in which a mobile station measures a communication channel quality of each of a plurality of bands obtained by dividing a communication band of a downlink and transmits, a result of the measurement to a base station via an uplink, including: first means for selecting one of the plurality of bands and obtaining relative value information for respective adjacent bands in higher and lower directions by using the selected band as a reference and generating the relative value information as a bitmap; and second means for transmitting at least communication channel quality information of said one band and said bitmap, in the mobile station.

Another communication system according to the present invention is a communication system, in which a mobile station measures a communication channel quality of each of a plurality of bands obtained by dividing a communication band of a downlink and transmits, a result of the measurement to a base station via an uplink, including: first means for selecting one of the plurality of bands and obtaining two restored value candidates for respective adjacent bands in higher and lower directions by increasing or decreasing a predetermined step size by using the selected value as a reference, and generating relative value information on a restored value indicating which restored value candidate increased or decreased by the step size is the restored value candidate closer to the measured value as a bitmap; and second means for transmitting at least the communication channel quality information of said one band and said bitmap, in the mobile station.

Another communication system according to the present invention is a communication system, in which a mobile station measures a communication channel quality of each of a plurality of bands obtained by dividing a communication band of a downlink and transmits, a result of the measurement to a base station via an uplink, including: first means for selecting one of the plurality of bands, setting a measured value of the selected band to a restored value, obtaining relative value information of each adjacent band by comparing the restored value and measured values of both of the adjacent bands in a higher and lower directions of the one band respectively, and generating the relative value information as a bitmap by performing the same procedure as obtaining a restored value of the each adjacent band by increasing or decreasing by a predetermined step size according to the relative value information also for the adjacent bands thereafter; and second means for transmitting at least the communication channel quality information of the one band and the bitmap, in the mobile station.

The operation of the present invention will be described. According to the invention of the Examples 1 to 3 by the present invention, when a mobile station measures a communication channel quality of each of a plurality of bands and transmits the measurement to a base station via the uplink, each of the plurality of bands is obtained by dividing a downlink communication band into the plurality of bands, the mobile station selects a band with a communication channel quality at a threshold or more from the measured communication channel quality and generates information indicating the selected band and the non-selected band as a bitmap, and transmits the bitmap, the average value of the measured communication channel quality and a representative value (the maximum value and the minimum value) in the selected band to the base station.

According to the invention of the Examples 4 and 7 to 10 by the present invention, when a mobile station measures a communication channel quality of each of a plurality of bands and transmits the measurement to a base station via the uplink, each of the plurality of bands is obtained by dividing a downlink communication band into the plurality of bands, the mobile station is adapted to represent a communication channel quality of a first band by a first code, represents a communication channel quality of a second band (the second band is different from the first band in time or frequency; if they are different in time, the bands are called first and second in the chronological order, and if they are different in frequency, the bands are called first and second in the ascending or descending order in the frequency) by a second code by using the communication channel quality of the first band as a reference, and represents a communication channel quality of a third band (the third band has the same relationship with the second band as that between the first and the second bands) by a third code by using the communication channel quality of the second band as a reference, and transmits at least the first to third codes to the base station.

According to the invention of the Examples 5, 6 and 11 to 20 by the present invention, when a mobile station measures a communication channel quality of each of a plurality of bands and transmits the measurement to a base station via the uplink, each of the plurality of bands is obtained by dividing a downlink communication band into the plurality of bands, the mobile station is adapted to represent a communication channel quality of a first band by a first code and represents a communication channel quality of a second band (the second band has the same relationship with the first band as that between the abovementioned first and the second bands) by a second code by using the first communication channel quality represented by the first code and transmit at least the first and second codes to the base station. With the abovementioned configuration, the objects of the present invention are achieved.

The present invention is adapted to decrease the amount of information to transmit in one transmission, even with the number of CQIs to be informed increases. If a communication band is limited, CQI information required for scheduling or adaptive modulation can be informed to a base station in short cycles. Accordingly, a correct communication channel state can be informed to the base station. Therefore, the present invention is effective in preventing the throughput in the downlink from being degraded.

BRIEF DESCRIPTION OF THE DRAWINGS

FIG. 4 is a diagram showing an example of operations of the mobile station of the first embodiment;

FIG. 5 is an example of a transmission format for data in the mobile station in the first, second, and third embodiments;

FIG. 6 is a diagram showing an example of operations of the base station of the first embodiment;

FIG. 15 is an example of a transmission format for data in the mobile station in the fourth embodiment;

FIG. 32 is a diagram showing a configuration of the mobile station of the ninth embodiment;

FIG. 33 is a diagram showing an example of operations of the mobile station of the ninth embodiment;

FIG. 34 is an example of a transmission format for data in the mobile station in the ninth and tenth embodiments;

FIG. 35 is a diagram showing an example of operations of the base station of the ninth embodiment;

FIG. 36 is a diagram showing a configuration of the mobile station of the tenth embodiment;

FIG. 37 is a diagram showing an example of operations of the mobile station of the tenth embodiment;

FIG. 46 is an example of a transmission format for data in the mobile station of the fourteenth and fifteenth embodiments;

FIG. 51 is a diagram showing an example of operations of the mobile station of the sixteenth embodiment;

DETAILED DESCRIPTION OF THE PREFERRED EMBODIMENTS

Embodiments of the present invention will be described below with reference to the drawings.

<The First Embodiment (Example 1)>

Figure 1:
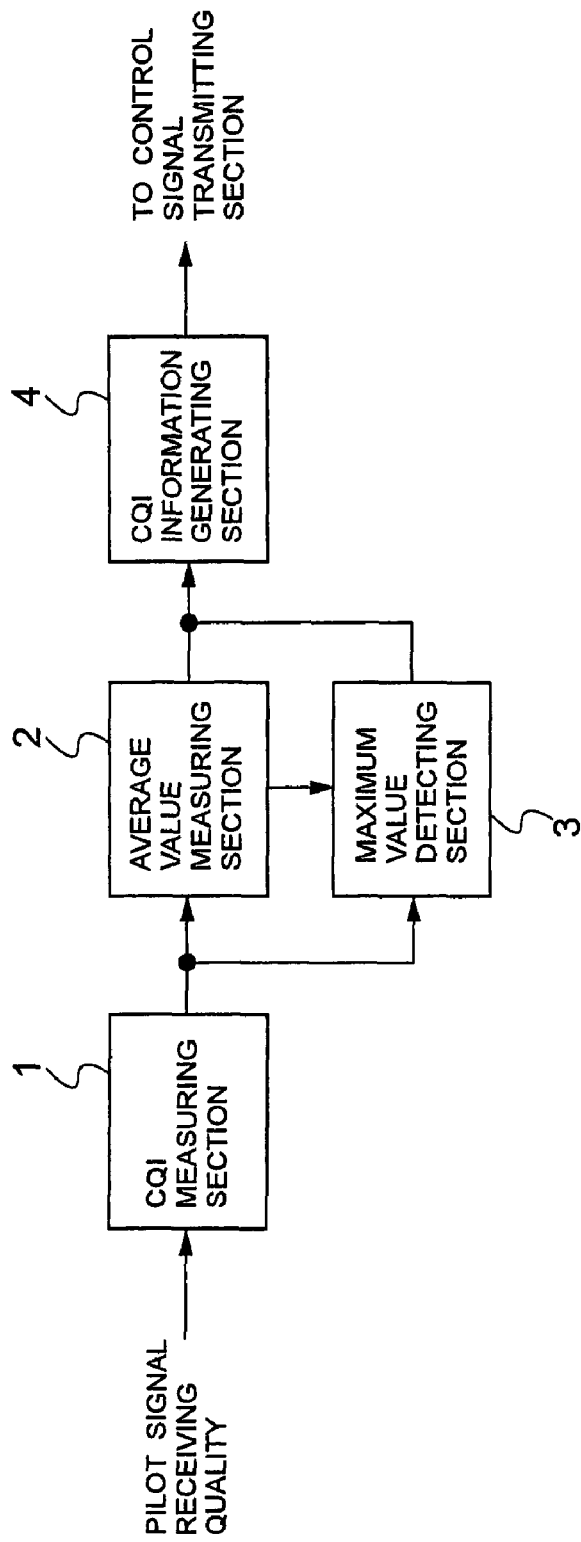
FIG. 1 is a diagram showing a configuration of the mobile station of the first embodiment.
Figure 2:
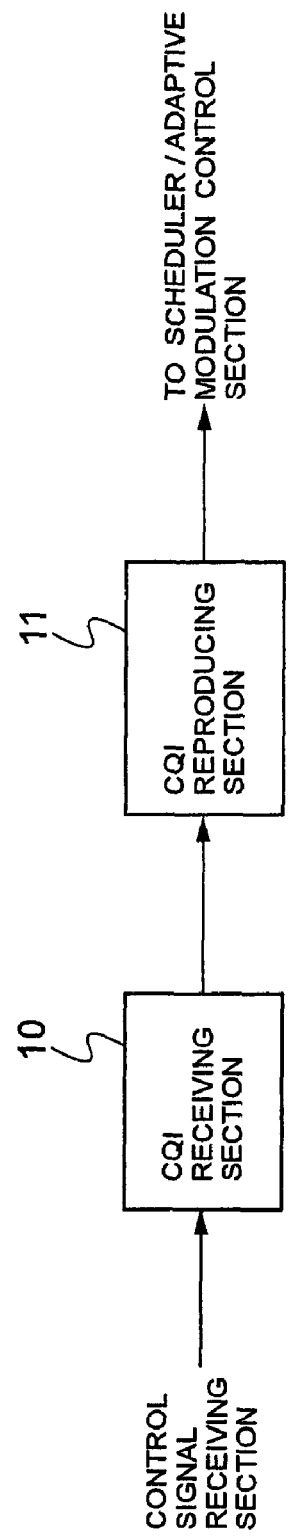
FIG. 2 is a diagram showing a configuration of the base station of the first embodiment.

FIGS. 1 and 2 are block diagrams showing configurations relating to functions of processing CQI of a mobile station and a base station, respectively. The mobile station includes a CQI measuring section 1, an average value measuring section 2, a maximum value detecting section 3, and a CQI information generating section 4. The base station includes a CQI receiving section 10, and a CQI reproducing section 11. As the other functions are the same as those of the conventional mobile station and the conventional base station, they are omitted from the description.

First, operations of the mobile station will be described. The mobile station measures a receiving quality of a pilot signal at the CQI measuring section 1 and obtains a CQI value for each RB. Here, a method for a CQIC measuring section 1 to obtain a value of a CQI for each RB may be exemplified by a method described below. The mobile station estimates communication channel quality from receiving power of the pilot signal. If the base station transmits with provisional transmission power in the estimated communication channel quality, the CQI measuring section obtains a CQI value for each RB by which a transport block error rate of the sub-frame does not exceed a predetermined value. Then the provisional transmission power can be calculated by any of calculating methods for adjusting a pilot to a reference such as to make the provisional transmission power the same as the power of the pilot included in the RB;

to make the provisional transmission power the addition/subtraction of power of the pilot included in the RB and a predetermined offset; or to make the provisional transmission power the addition/subtraction of power of the pilot included in the RB and a predetermined offset; and further to make the provisional transmission power the addition/subtraction to a predetermined reference adjustment offset. Instead of calculating the provisional transmission power by addition/subtraction as mentioned above, a method for calculating the provisional transmission power by multiplying power of a pilot by a predetermined coefficient can be taken.

Here, the predetermined offset or the predetermined reference adjustment offset can be given from outside over a network or obtained by referencing a table in the mobile station. Next, an average value in CQI values is calculated by the average measuring section 2.

Figure 3:
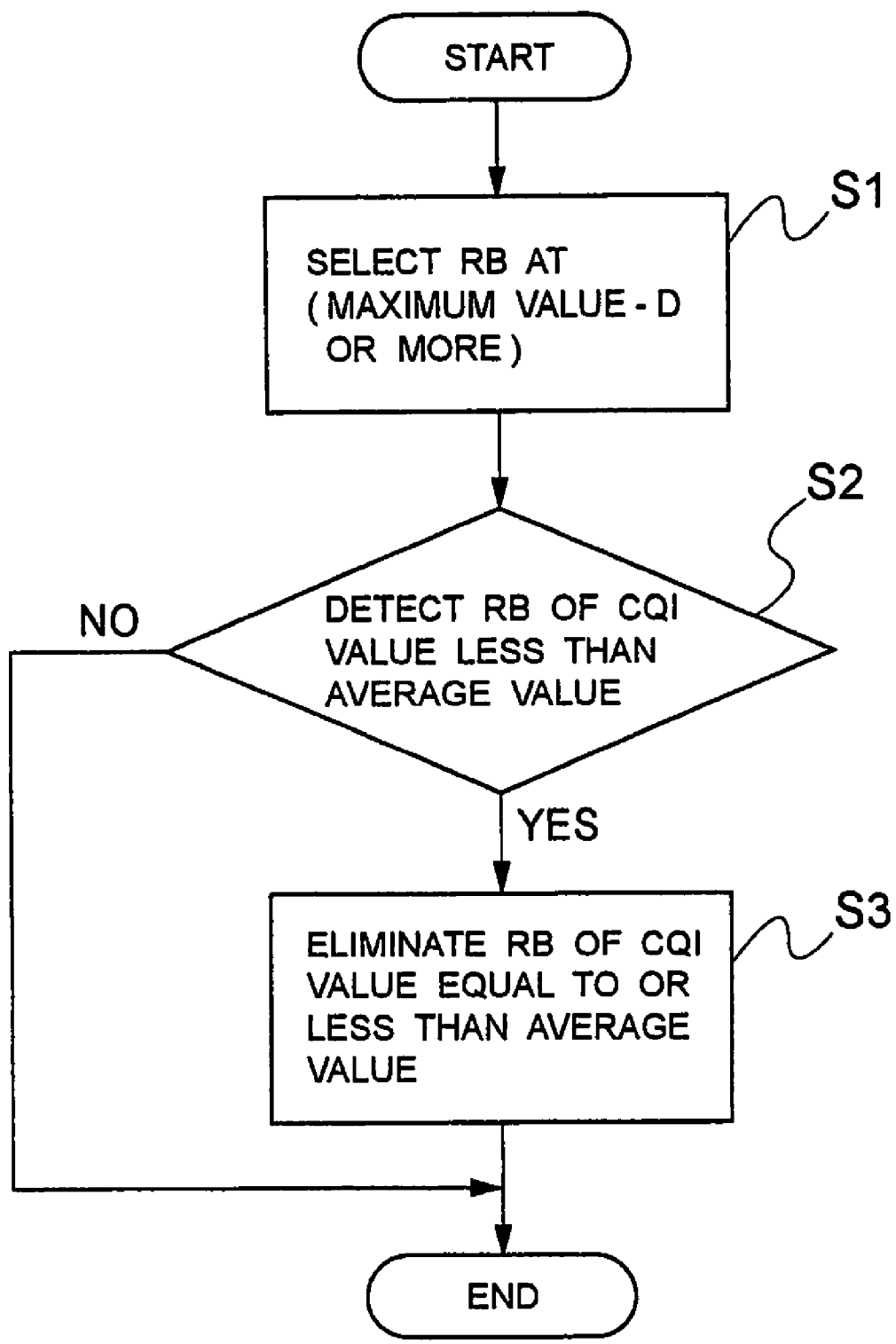
FIG. 3 is a flow showing operations of the mobile station of the first embodiment.

Operations of the maximum value detecting section 3 will be described with reference to FIG. 3. An RB with a CQI value within a certain range D from the maximum value (D is the number 0 or more) is selected. That is to say, an RB with a CQI value at a threshold or more is selected where the threshold is (the maximum value—D) (step S1), and the CQI value (minimum value) that is the minimum in the selected RBs is selected. FIG. 4 shows exemplary operations of the mobile station where the range from the maximum value D=3. "1" is allocated to the RB with a CQI value at the threshold or more and "0" is allocated to the other RBs.

Allocation of "1" and "0" to the RB is also described below as selecting the RB, the bandwidth with quality of a communication channel by which the value of the CQI, which is the measured quality of a communication channel, is at the threshold or more (selected bandwidth) and not selecting the RB which is the other bandwidth (non-selected bandwidth). If the CQI value of the selected RB is at the average value or less, only the RB that is the CQI value more than the average value is selected (steps S2, S3).

The steps S2 and S3 are not necessary, though, it may become more effective when processes at the steps S2 and S3 are performed. That is to say, as the selected bandwidth intends to select an RB with a good CQI value but the threshold is set regardless of the average value so that a bandwidth with a CQI value less than the average value is selected, thus, the object may not be achieved. With processes at the steps S2 and S3 performed, a case with an inappropriately set threshold can be eliminated.

With reference to FIG. 4, operations of the mobile station will be described. The maximum value in the CQI measured values for respective RBs is 20 in the embodiment. Accordingly, the threshold is 20−D=17 (D is 3) The CQI information generating section 4 creates RB selection information for indicating the presence of the RB selection by using "1" and "0" for each RB (if it belongs to the selected group, the information indicating "1", and if it belongs to the non-selected group, the information indicating "0"). That is to say, a bitmap in which "1" and "0" are sorted in the order of RB numbers only needs to be created.

Therefore, the CQI information generating section 4 creates a transmission sequence by using the average value (a representative value of a non-selected group), the minimum CQI value at the threshold or more (a representative value of a selected group), and a bit-map, and the RB selection information and transmits the sequence to the control signal transmitting section in the transmission format 1 shown in FIG. 5. In the transmission format shown in FIG. 5, the CQI value is represented in five bits from 0 to 31 and the number of bits to be transmitted when the number of RBs is 12 is written side by side. The sequence in the information is merely an example.

Next, operations of the base station will be shown. The base station detects the average value, the minimum CQI value at the threshold or more and the RB selection information at the CQI receiving section 10. The CQI reproducing section 11 reproduces the CQI value for all the RBs by setting the minimum value given by the transmission format 1 to RB with RB selection information allocated with "1" and the average value given by the transmission format 1 to the RB with RB selection information allocated with "0", respectively. An example of the abovementioned operations of the base station is shown in FIG. 6. The value in the range D from the maximum value may be noticed from the base station to the mobile station as a control parameter or a predetermined value may be used.

<The Second Embodiment (Example 2)>

Figure 7:
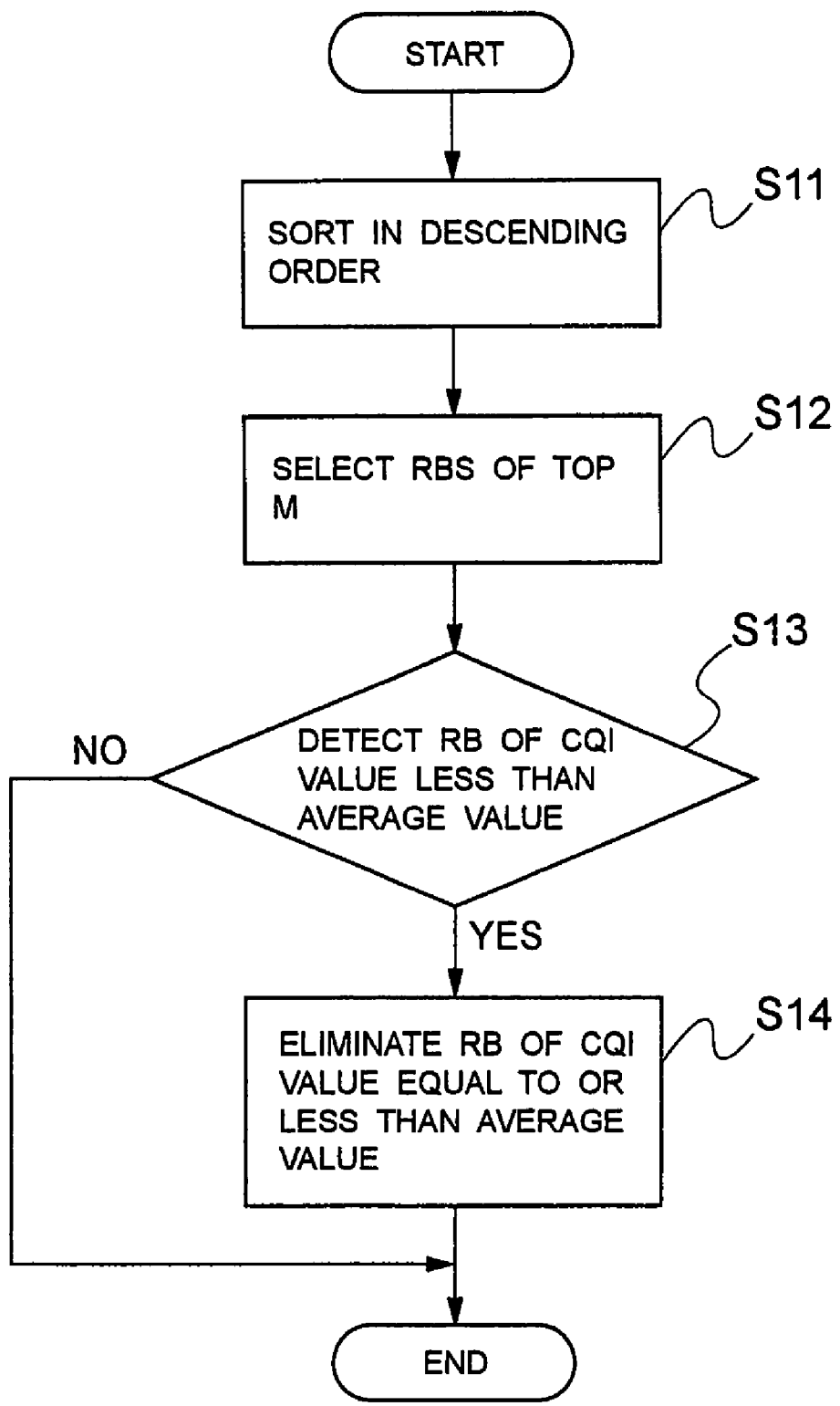
FIG. 7 is a flow showing operations of the mobile station of the second embodiment.
Figure 8:
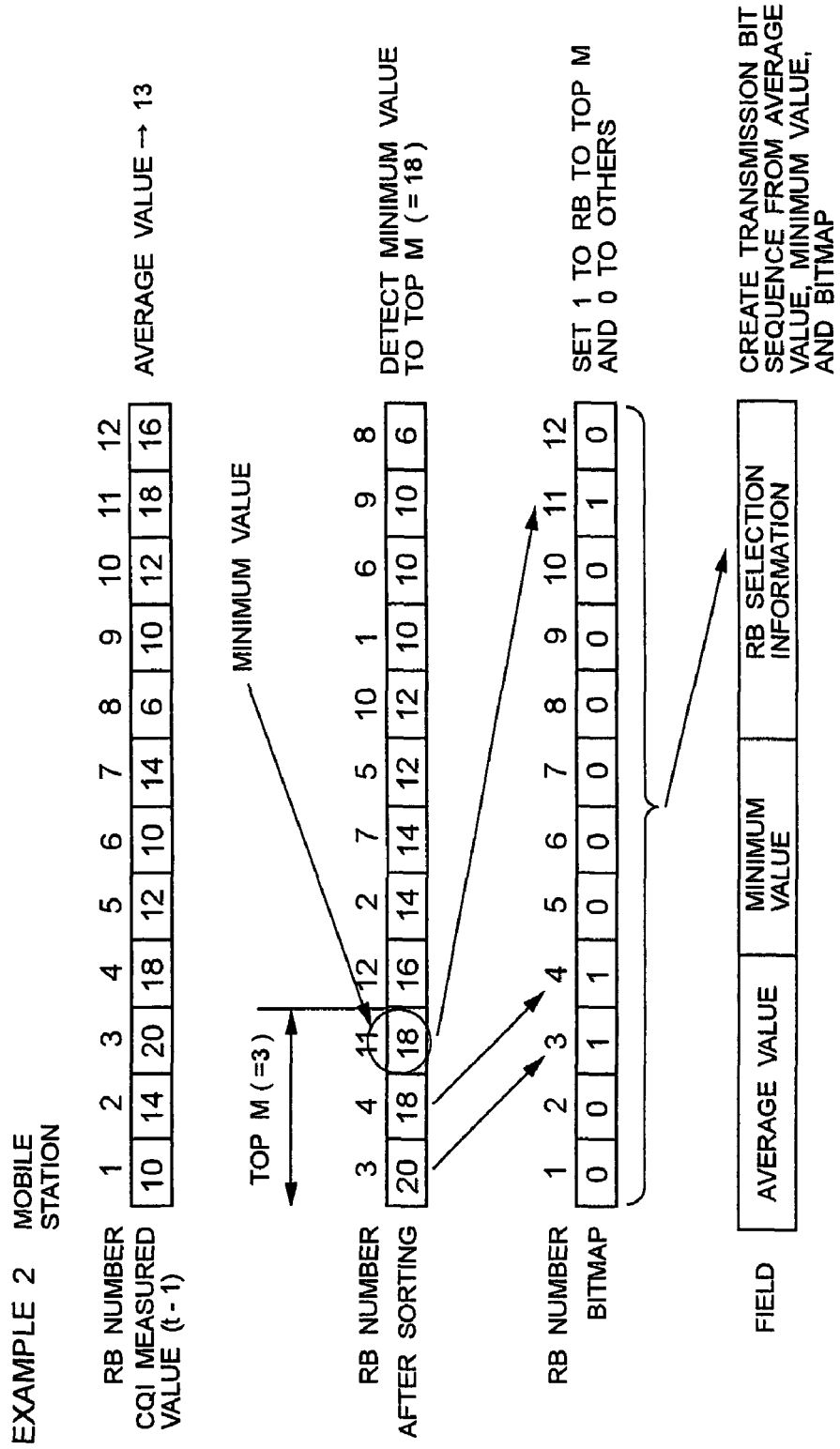
FIG. 8 is a diagram showing an example of operations of the mobile station of the second embodiment.

As the second embodiment has the same configuration as that of the first embodiment, it is omitted from the drawings. The second embodiment is different from the first embodiment only in operations of the maximum value detecting section 3 of the mobile station, which will be described with reference to FIG. 7. After the CQI values are sorted in the favorable order at the maximum value detecting section 3 (step S11), M RBs are selected in the favorable order (M is an integer of 1 or more) (step S12). Exemplary operations of the mobile station where M=3 are shown in FIG. 8. Referring to FIG. 8, a bitmap is generated by detecting the CQI measured value for each RB for the top M (=3) and setting "1" to the top M RBs and "0" to the other RBs. Then, a transmission sequence is generated by the average value, the minimum value and the bitmap as in the Example 1, and the transmission sequence is informed of in the format 1.

If there are RBs that are the CQI values at the average value or less among the CQI values for the selected M RBs selected in the favorable order, only the RB that is the CQI value more than the average value is selected (step S13, S14). The other operations are the same so that they will be omitted from the description. The M which is the favorable number of the RBs may be noticed from the base station to the mobile station as a control parameter or a predetermined value may be used. The steps S13, S14 are not necessary, though, it may become more effective if the steps are included. That is to say, the second embodiment is adapted to eliminate a case where an inappropriately set threshold as in the case of the first embodiment.

<The Third Embodiment (Example 3)>

Figure 9:
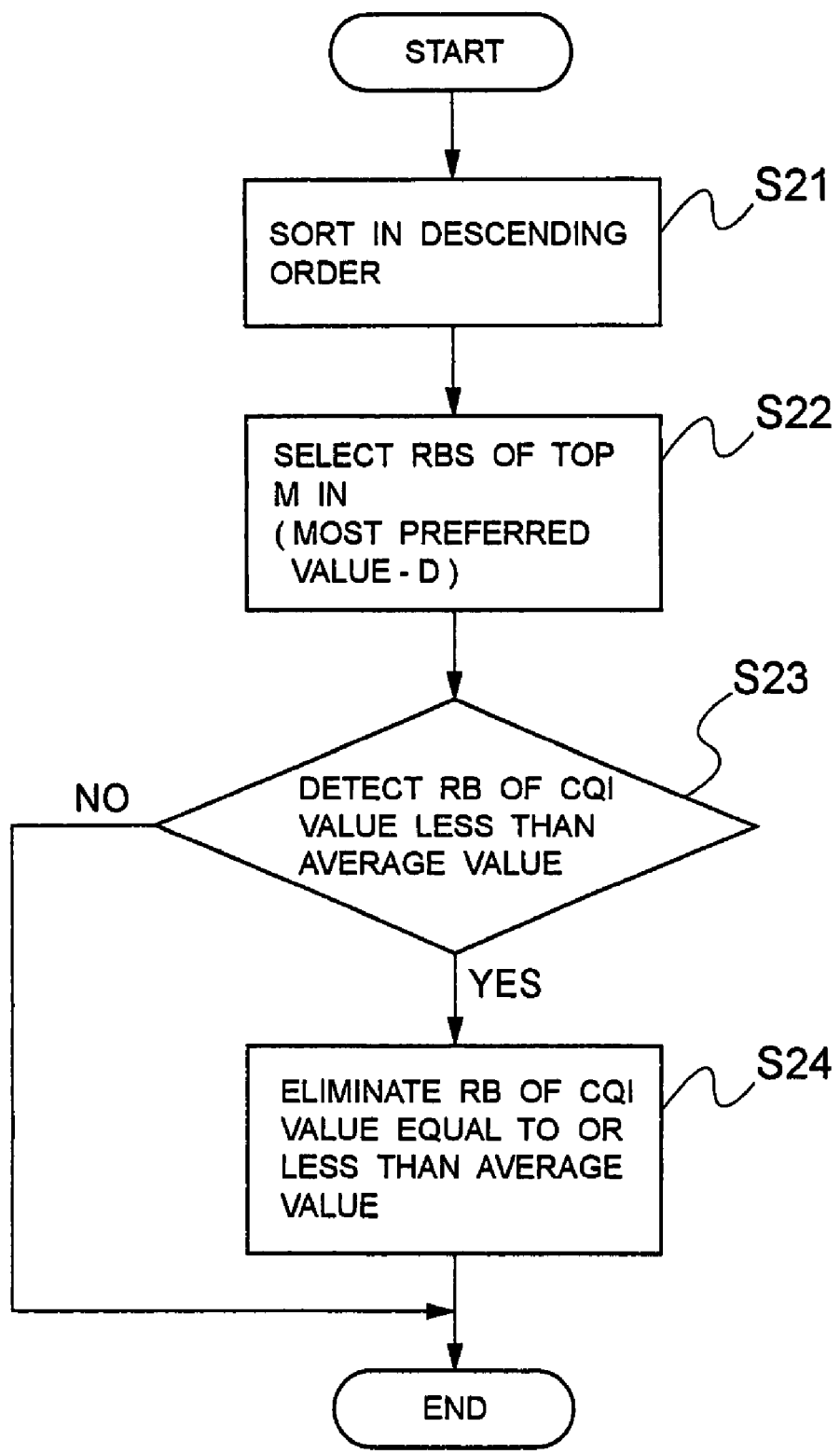
FIG. 9 is a flow showing operations of the mobile station of the third embodiment.
Figure 10:
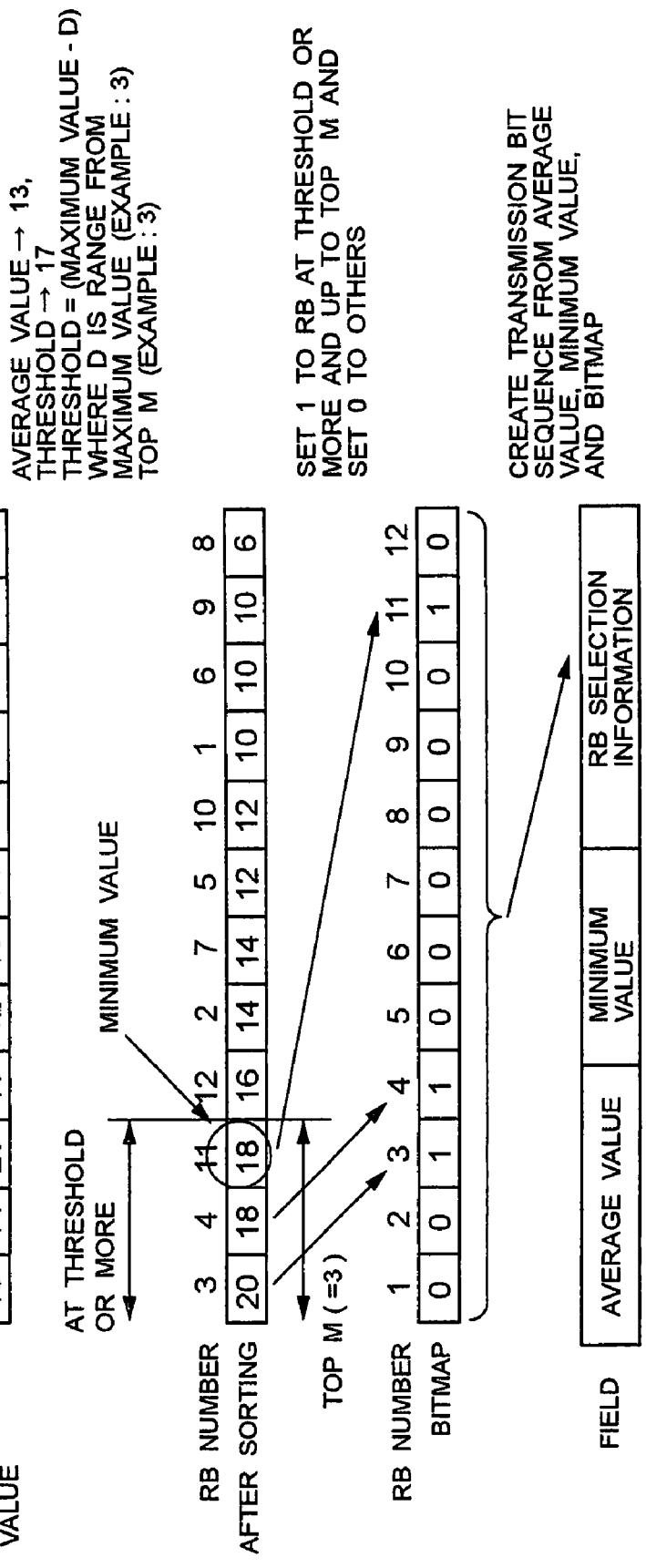
FIG. 10 is a diagram showing an example of operations of the mobile station of the third embodiment.

As the third embodiment has the same configuration as that of the first embodiment, it is omitted from the description. The third embodiment is different from the first embodiment only in operations of the maximum value detecting section 3 of the mobile station, which will be described with reference to FIG. 9. After the CQI values are sorted in the favorable order at the maximum value detecting section (step S21), RBs are detected in the range D from the maximum value for the most favorable value, and M are selected in the favorable order (step S22). Exemplary operations of the mobile station where D=3 and M=3 are shown in FIG. 10. In FIG. 10, a bitmap is generated by setting "1" to the RB that at the threshold (17 as in the above-description) or more and at most of the top M for the CQI measured value for each RB, and "0" to the other RBs. Then, the bitmap is informed of in the transmission format 1.

If the CQI value of the selected RB is the average value or less as in the first embodiment, only the RBs that are more than the average value are selected (step S23, S24). The threshold D and M, which is the number of favorable RBs, may be informed from the base station to the mobile station as a control parameter or a predetermined value may be used. The steps S23, S24 are not necessary, though, it may be very efficient if the steps are included. In such a case, a case where a threshold is set inappropriately can be eliminated as in the first embodiment.

In the transmission format 1 used in the first to the third embodiments, the absolute value on one side may be transmitted and the relative value may be transmitted for the absolute value from the other side instead of transmitting the average value and the minimum value. As the average value in the transmission format 1 is the representative value of the non-selected group and the maximum value is the representative value of the selected group, the representative value of the latter selected group is not limited to the maximum value in the group and may be the minimum value in the group.

<The Fourth Embodiment (Example 4)>

Figure 11:
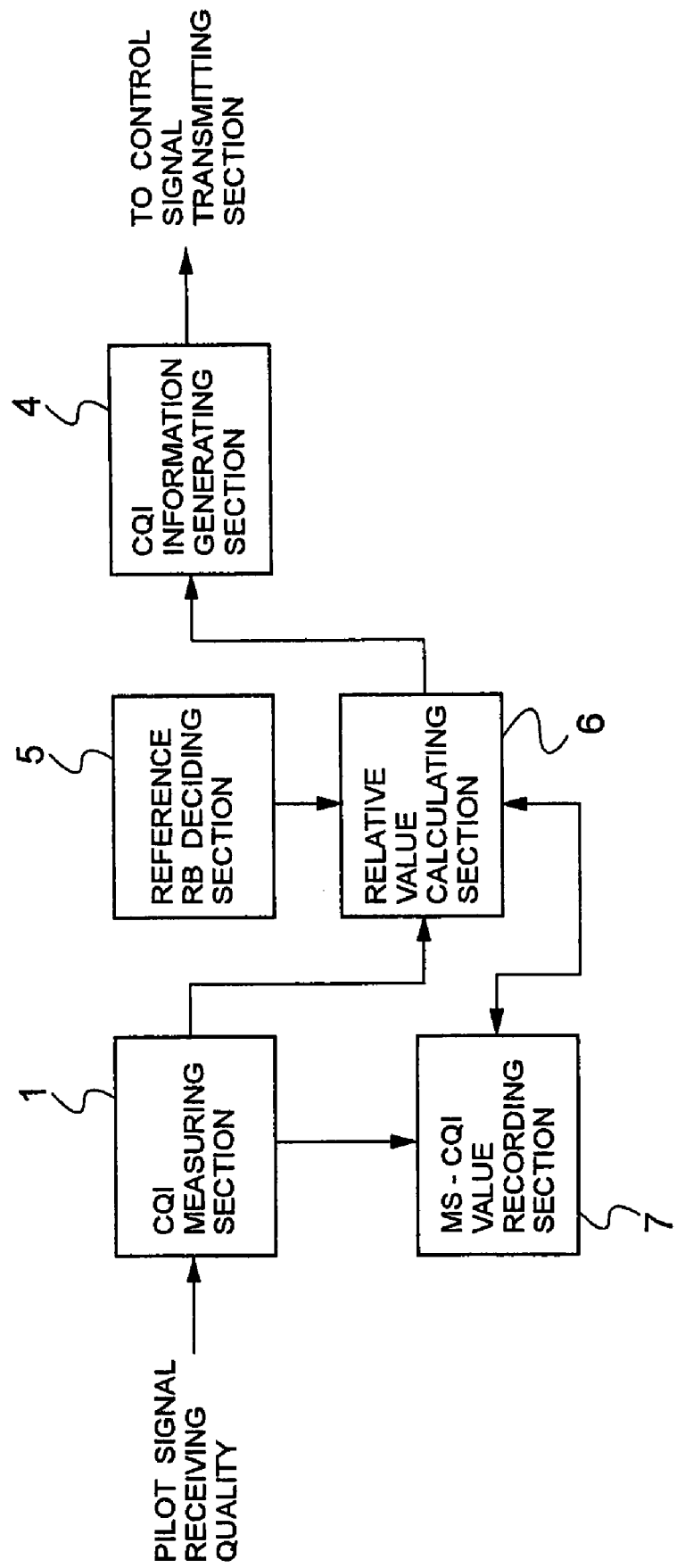
FIG. 11 is a diagram showing a configuration of the mobile station of the fourth embodiment.
Figure 12:
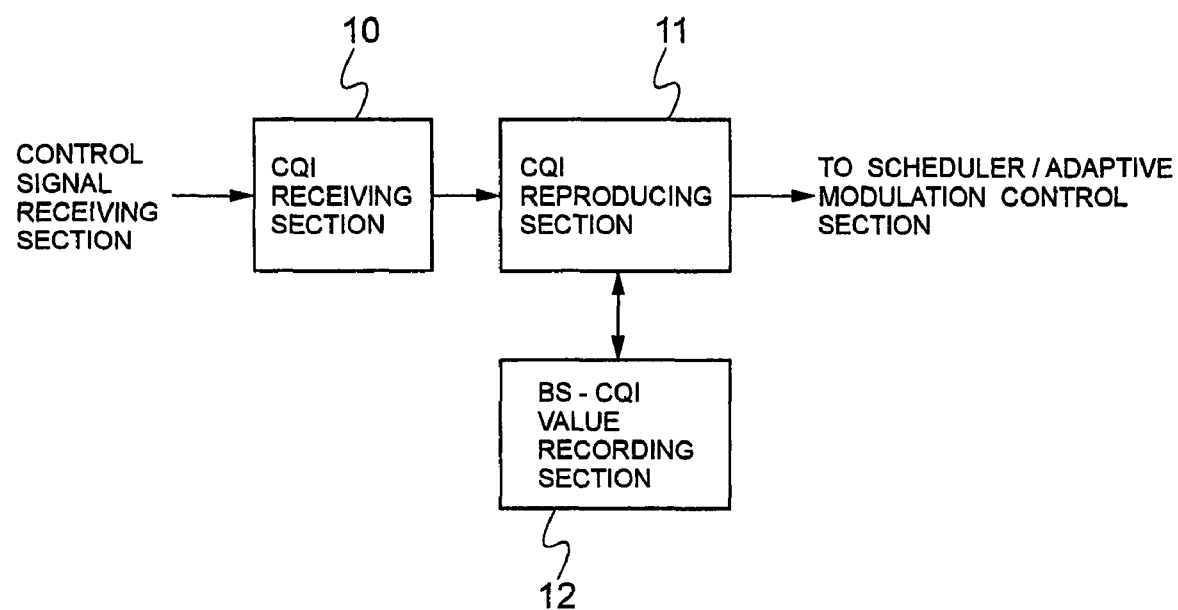
FIG. 12 is a diagram showing a configuration of the base station of the fourth embodiment.

Configurations of the mobile station and the base station in the fourth embodiment are shown in FIGS. 11 and 12, respectively. The mobile station includes a CQI measuring section 1, an MS-CQI value recording section 7, a reference RB deciding section 5, a relative value calculating section 6, and a CQI information generating section 4. The base station includes a CQI receiving section 10, a CQI reproducing section 11, and a BS-CQI value recording section 12.

Figure 13:
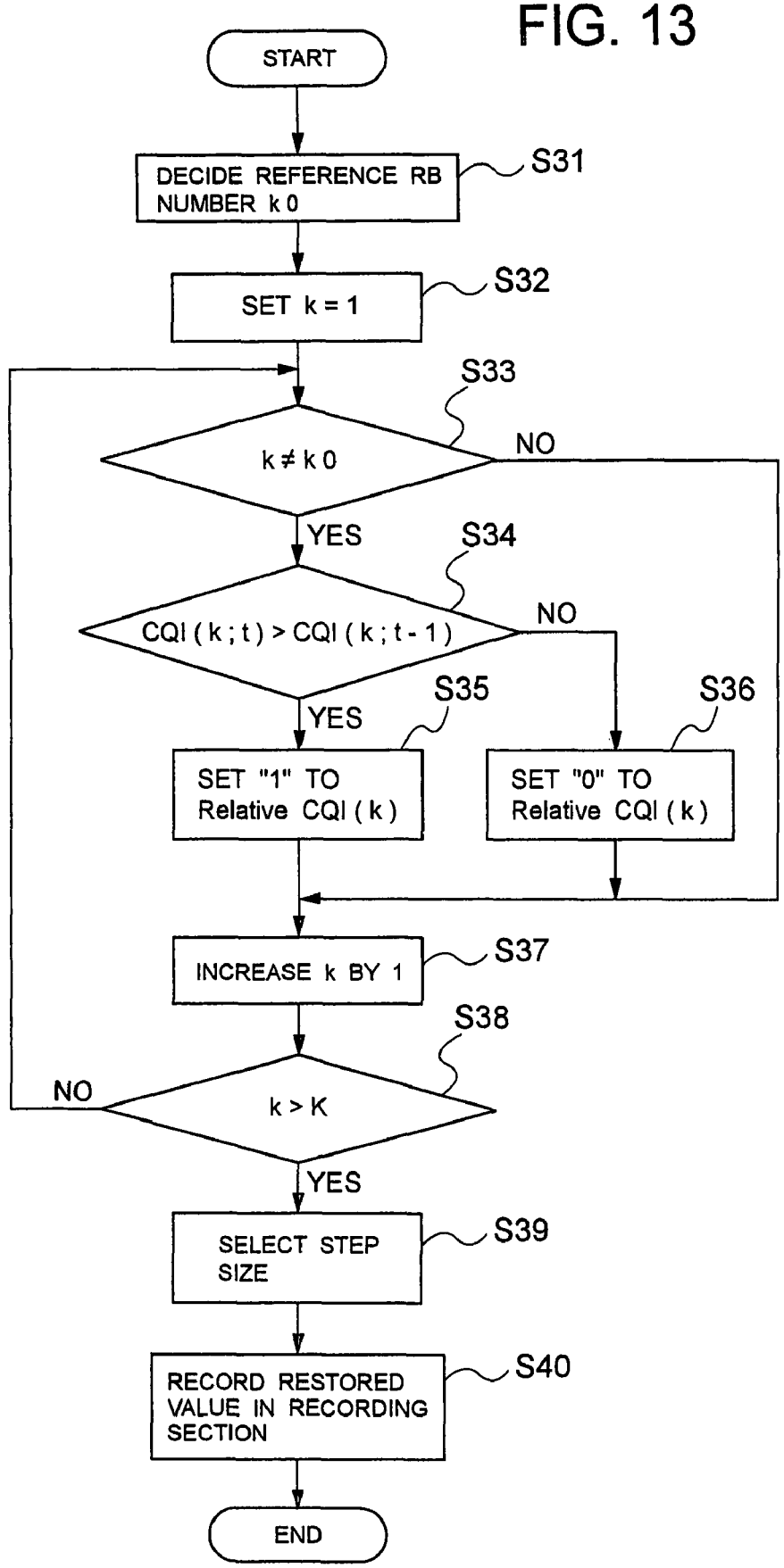
FIG. 13 is a flow showing operations of the mobile station of the fourth embodiment.

Operations of the mobile station will be described with reference to FIG. 13. The mobile station generates a CQI value for each RB at the CQI measuring section 1. The MS-CQI value recording section 7 is initialized by a predetermined value in starting communication. For example, the predetermined value will be the median value of the CQI values. The reference RB deciding section 5 decides an RB, which makes a reference according to a predetermined rule (step S31). For example, it only needs to decide an initial value by using a frame number and make rounds of all RBs starting from that RB in the order of the RB numbers. Another method may be used such that the RB numbers of the maximum value, the minimum value, and the median value using those previously informed of, or the RB numbers may be previously decided according to the system.

In the relative value calculating section 6, the CQI value of the RB is compared with the previous CQI value recorded in the MS-CQI value recording section 7 in order. The CQI (k; t) shown in FIG. 13 indicates the CQI value at the time t of the RB number k. The time relative value RelativeCQI (k) (k is an integer representing 1 to K, where K is the total sum of RBs) is calculated by the next formula (steps S32 to S38).

$$\text{RelativeCQI}(k)=1 \ldots \text{CQI}(k;t) > \text{CQI}(k;t-1) \quad (1)$$

$$\text{RelativeCQI}(k)=0 \ldots \text{CQI}(k;t) < \text{CQI}(k;t-1) \quad (2)$$

The RB number k 0 which is selected at the reference RB deciding section 5 is not compared, however. This is because as a restored value to be described later uses the current CQI value for the reference RB, the restored value can be obtained without using relationship with a past-restored value. Although it is called a reference RB here, it is an RB for informing the absolute value, which is the measured CQI value itself.

For the inequality signs in the formulas (1) and (2), it may be ≧ in the formula (1) and < in the formula (2) (hereafter same as above). In this example, although the comparison result is indicated by two stages -for big and small as the one-bit notation, it may be indicated by the four-stage notation as the two-bit notation (hereafter same as above).

The restored value ReCQI (k; t) is calculated by the formula below with the comparison result and the step size A (step S39).

$$\text{ReCQI}(k;t)=\text{CQI } 0 \ldots k=k0$$

$$\text{ReCQI}(k;t)=\text{CQI}(k;t-1)+A \ldots \text{RelativeCQI}(k)=1$$

$$\text{ReCQI}(k;t)=\text{CQI}(k;t-1)-A \ldots \text{RelativeCQI}(k)=0$$

A plurality of restored values ReCQI (k; t) are calculated by the abovementioned calculation for a prepared plurality of step sizes. The step size with the smallest difference between a restored value obtained for each step and the measured CQI value is selected. Methods for selecting the step size include a method for calculating an appropriate value with the least-square method followed by selecting the step size close to the value. A method for calculating the difference only needs to use the sum of the absolute values of differences of all RBs. Alternatively, a difference among RBs whose measured CQIs are the maximum may also be used. Further, a difference among RBs which makes the top M (M is an integer of 1 or more) may be used. The MS-CQI value recording section 7 records the restored value ReCQI (k;t) that is calculated by the step size whose difference is the minimum as the CQI (k; t−1) (step S40).

Figure 14:
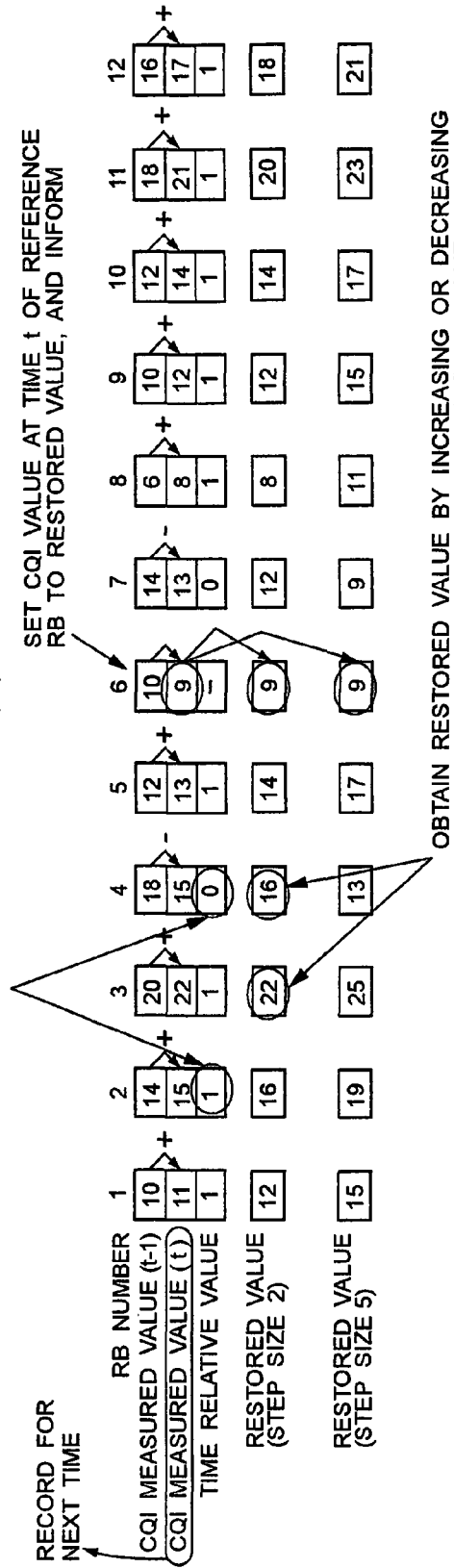
FIG. 14 is a diagram showing an example of operations of the mobile station of the fourth embodiment.

FIG. 14 shows an example of a calculating operation of the mobile station. This example shows a case where two and five are prepared for the step size A. Referring to FIG. 14, the present CQI measured value and the previous CQI measured value (recorded value) are compared with each other for each RB other than a reference RB; and if the present measured value is bigger than the previous measured value, the bitmap indicating the time relative value information is generated as "1", while the present measured value is smaller than the previous measured value, the bitmap is generated as "0". According to "1" and "0", the step size A is increased or decreased for the previous measured value and a new restored value is obtained. At this moment, the step size, by which a difference between the restored value and the present measured value is the smallest, is selected; and the restored value that is obtained by the step size is recorded as a recorded value to be used next.

At the CQI information generating section 4, the time relative value information generated from the CQI value of the RB (CQI 0) decided at the reference RB deciding section and the time relative value Relative CQI (k) and the step size information are informed to the control signal transmitting section in the format 2 as shown in FIG. 15. If there are two step sizes, information on the step size may be one bit. The order of pieces of information is merely an example.

The time relative value information can be created by sorting the time relative values Relative CQI (k) in the ascending order of the (K−1) RB numbers other than the number k0 of the reference RB. The step size information is informed such that a correspondence table of a plurality of step sizes and the numbers is prepared in the mobile station and the base station in advance and the mobile station informs the number of the selected step size as step size information.

Figure 16:
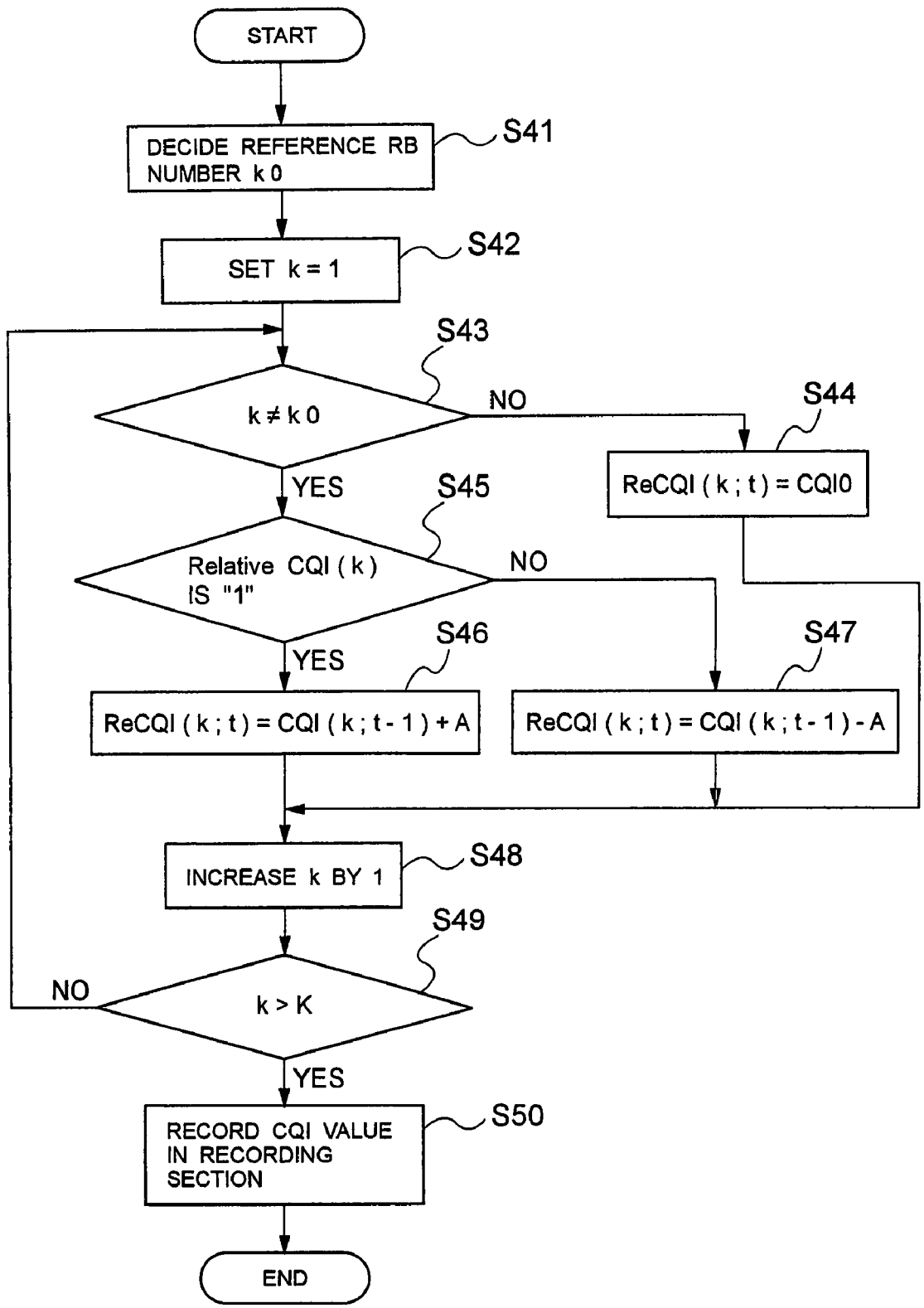
FIG. 16 is a flow showing operations of the base station of the fourth embodiment.

With reference to FIG. 16, operations of the base station will be described. The base station retrieves the CQI value (CQI 0) and the time relative value, which is obtained from the time relative value information, and the step size A at the CQI receiving section 10. The BS-CQI value recording section 12 is initialized with a predetermined value in starting communication. For example, it is the median value of the CQI values. The CQI value for each RB is calculated anew in the same manner as that for the mobile station described above based on the CQI value recorded in the BS-CQI value recording section 12, the informed step size and the time relative value (step S41 to S49).

Figure 17:
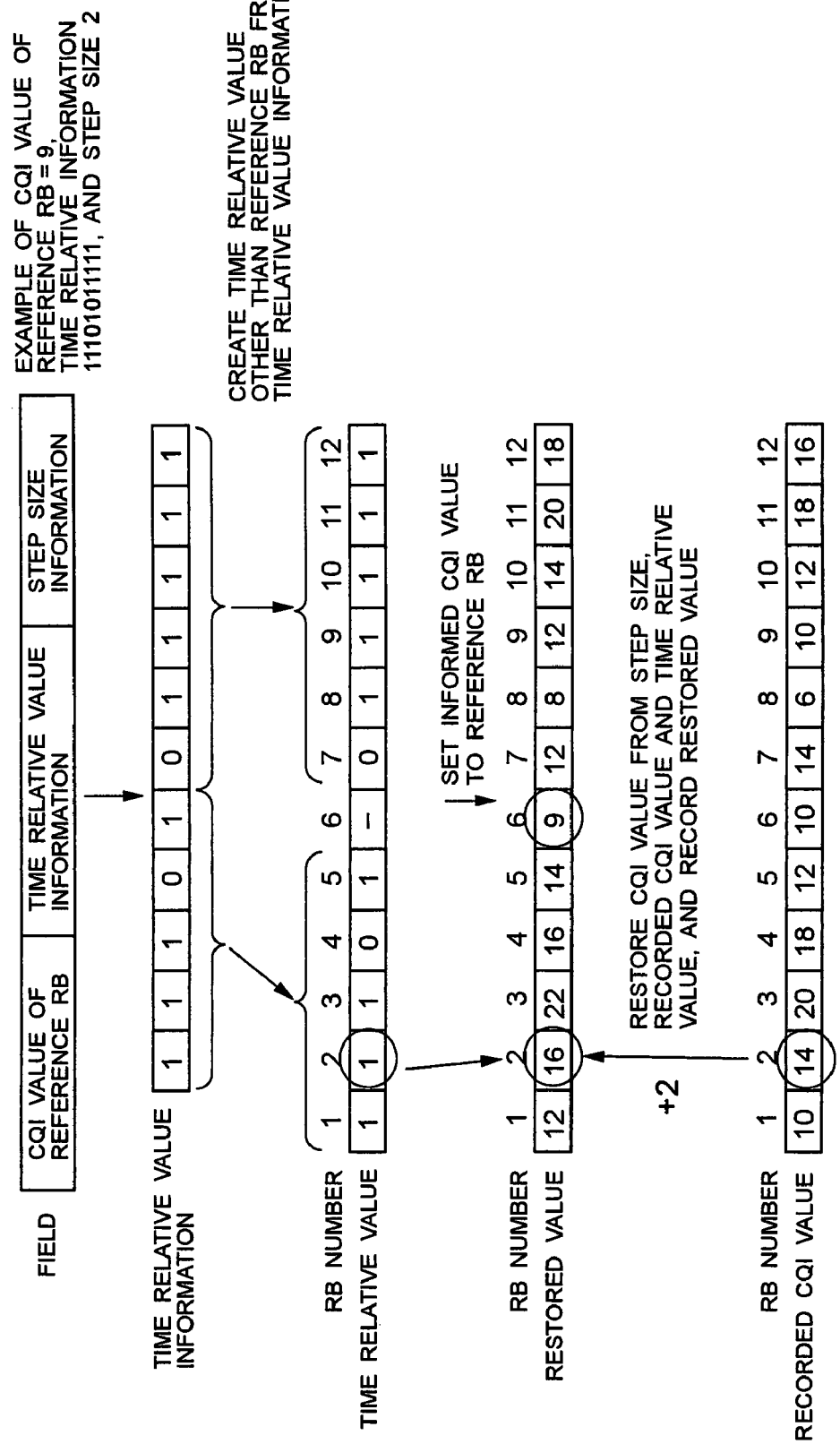
FIG. 17 is a diagram showing an example of operations of the base station of the fourth embodiment.

The CQI value obtained by calculation is recorded in the BS-CQI value recording section 12 (step S50), while it is outputted to a scheduler/adaptive modulation control section. FIG. 17 is exemplary restoration when the step size is two, showing exemplary operations of the base station. In FIG. 17, a restored value is obtained by receiving a transmission sequence in the format 2 and making the restored value the informed CQI value for the reference RB, while increasing or decreasing the step size for the previous recorded value according to "1" and "0" in the time relative value information (bitmap) for the other RBs.

<The Fifth Embodiment (Example 5)>

As the fifth embodiment has the same configuration as that of the fourth embodiment with a difference in operations of the relative value calculating section 6 of the mobile station, which will be described. In the example, instead of informing a relative value representing relationship among the values of the CQI values measured at sequential times with each other as shown in the Example 4, a value indicating to increase or decrease the step size such that the restored CQI value approaches to the measured value is used as a relative value for the restored value.

At the relative value calculating section 6, two differences Err ("1") and Err ("0") that are obtained by increasing/decreasing the CQI value of the RB to the CQI value recorded in the MS-CQI value recording section 7 in order by the step size A are obtained, and the relative value Relative ReCQI (k) of the restored value is obtained.

$$\text{Err}("1")=|CQI(k; t)-ReCQI(k;t-1)-A|$$

$$\text{Err}("0")=|CQI(k; t)-ReCQI(k;t-1)+A|$$

$$\text{RelativeCQI}(k)=1 \ldots \text{Err}("1")<\text{Err}("0") \quad (3)$$

$$\text{RelativeCQI}(k)=0 \ldots \text{Err}("1")\geq\text{Err}("0") \quad (4)$$

The restored value is obtained according to the relative value.

$$ReCQI(k;t)=CQI(k;t-1)+A \ldots \text{RelativeCQI}(k)=1$$

$$ReCQI(k;t)=CQI(k;t-1)-A \ldots \text{RelativeCQI}(k)=0$$

Here, the recorded CQI value is represented by the CQI (k;t−1), where k represents the RB number and t represents the time. As in the fourth embodiment, a plurality of step sizes are compared with that and the step size with the smallest difference is selected. In the MS-CQI value recording section 7, ReCQI (k;t) whose difference is the smallest is recorded.

Figure 18:
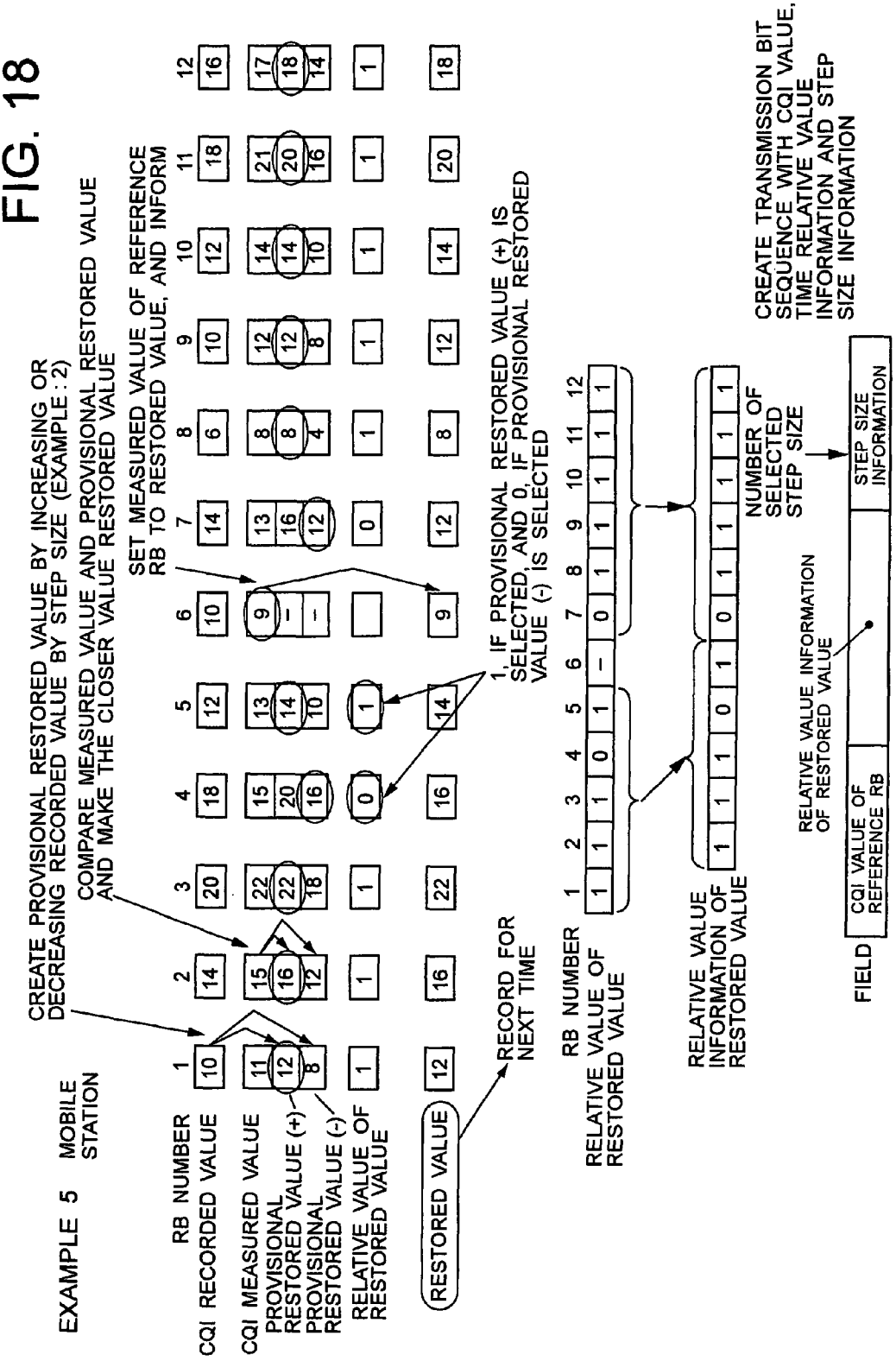
FIG. 18 is a diagram showing an example of operations of the mobile station of the fifth embodiment.

FIG. 18 shows exemplary operations of calculating the restored value by the mobile station. The case where the size of the step size A is two is shown. In FIG. 18, two provisional restored values are obtained by increasing or decreasing the step size against the previous restored value (recorded value) for the other RBs except for the reference RB respectively to make the provisional restored value closer to the measured value the restored value, and the bitmap indicating the relative value of the restored value is generated by information for increasing or decreasing the step size. Selecting the step size is the same as those mentioned above in that the restored value closest to the present measured value is selected.

Figure 19:
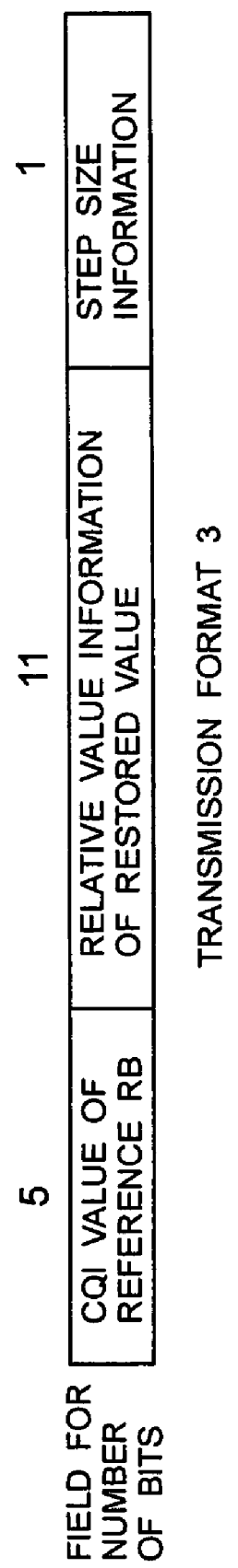
FIG. 19 is an example of a transmission format for data in the mobile station in the fifth and sixth embodiments.
Figure 20:
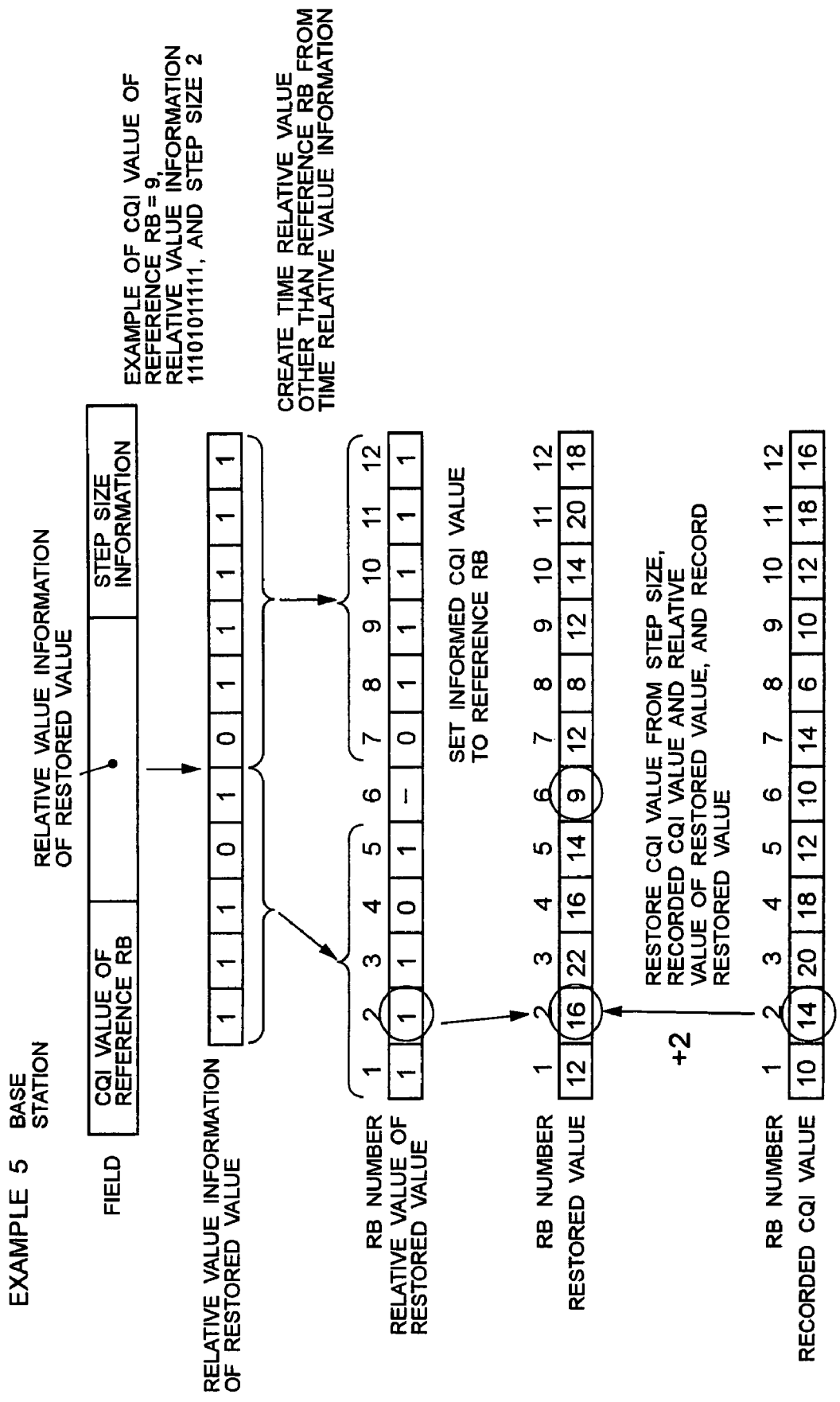
FIG. 20 is a diagram showing an example of operations of the base station of the fifth embodiment.

The CQI information generating section 4 informs information on the reference RB number, the CQI value of the reference RB (the RB for informing the absolute value), the relative value of the restored value Relative CQI (k) and the step size to the control signal transmitting section in the format 3 shown in FIG. 19. The method for converting the relative value Relative ReCQI (k) of the restored value into the relative value information of the restored value is the same as that in the fourth embodiment. The operations of the base station are shown in FIG. 20. If the relative value information of the restored value is considered as the time relative value information, the operations are the same as those of the base station in the fourth embodiment; thus, the details are omitted from the description.

<Modification Of The Fifth Embodiment (Modification Of The Example 5)>

Figure 21:
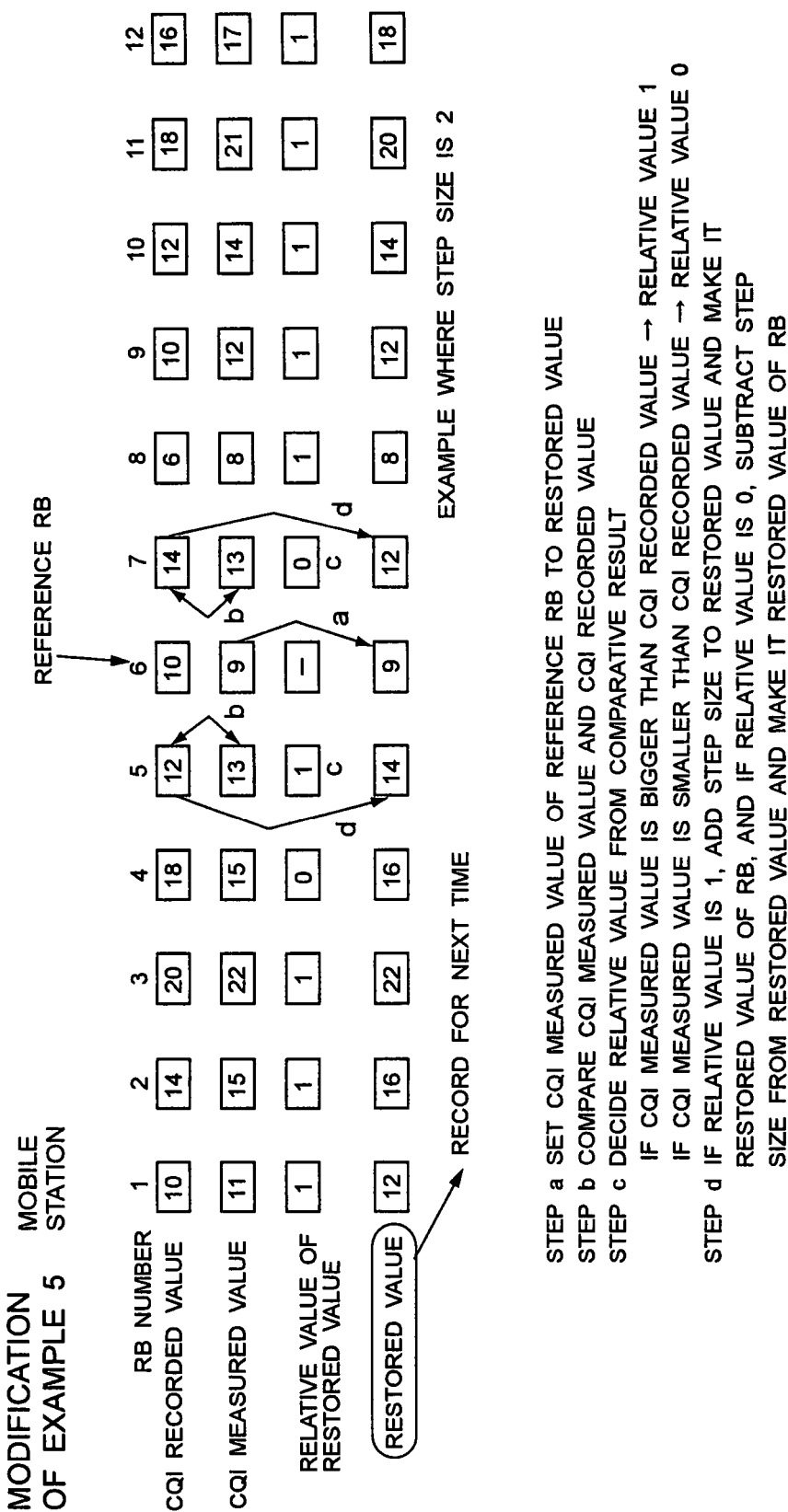
FIG. 21 is a diagram showing an example of operations of the mobile station in a modification of the fifth embodiment.

Operations of the mobile station in a modification of the fifth embodiment are shown in FIG. 21. First, the CQI measured value of the reference RB is set to the restored value (Step a). Then, the CQI measured value and the CQI recorded value are compared with each other (Step b). If the CQI measured value is bigger than the CQI recorded value in the comparison result, the relative value 1 is made as the relative value of the restored value; if otherwise, the relative value 0 is made as the relative value of the restored value (Step c). If the relative value is 1, the step size is added to the restored value to make the result the restored value of the RB. If the relative value is 0, the step size is subtracted from the restored value to make the result the restored value of the RB (Step d).

The restored value ReCQI (k;t) is calculated by the formula below, where k0 is the RB number of the reference RB, the CQI (k) is the CQI value of the RB number k and A is the step size.

$$k=k0 \ ReCQI(k;t)=CQI(k;t)$$

$$k\neq k0 \ ReCQI(k;t)=ReCQI(k;t-1)+A \ldots \text{RelativeCQI}(k)=1$$

$$ReCQI(k;t)=ReCQI(k;t-1)-A \ldots \text{RelativeCQI}(k)=0$$

The relative value Relative CQI (k) of the restored value is defined by the formulas below.

$$\text{RelativeCQI}(k)=1 \ldots CQI(k;t)>ReCQI(k;t-1)$$

$$\text{RelativeCQI}(k)=0 \ldots CQI(k;t)<ReCQI(k;t-1)$$

As the operations of the base station are the same as those of the fifth embodiment, they are omitted from the description.

<The Sixth Embodiment (Example 6)>

Figure 22:
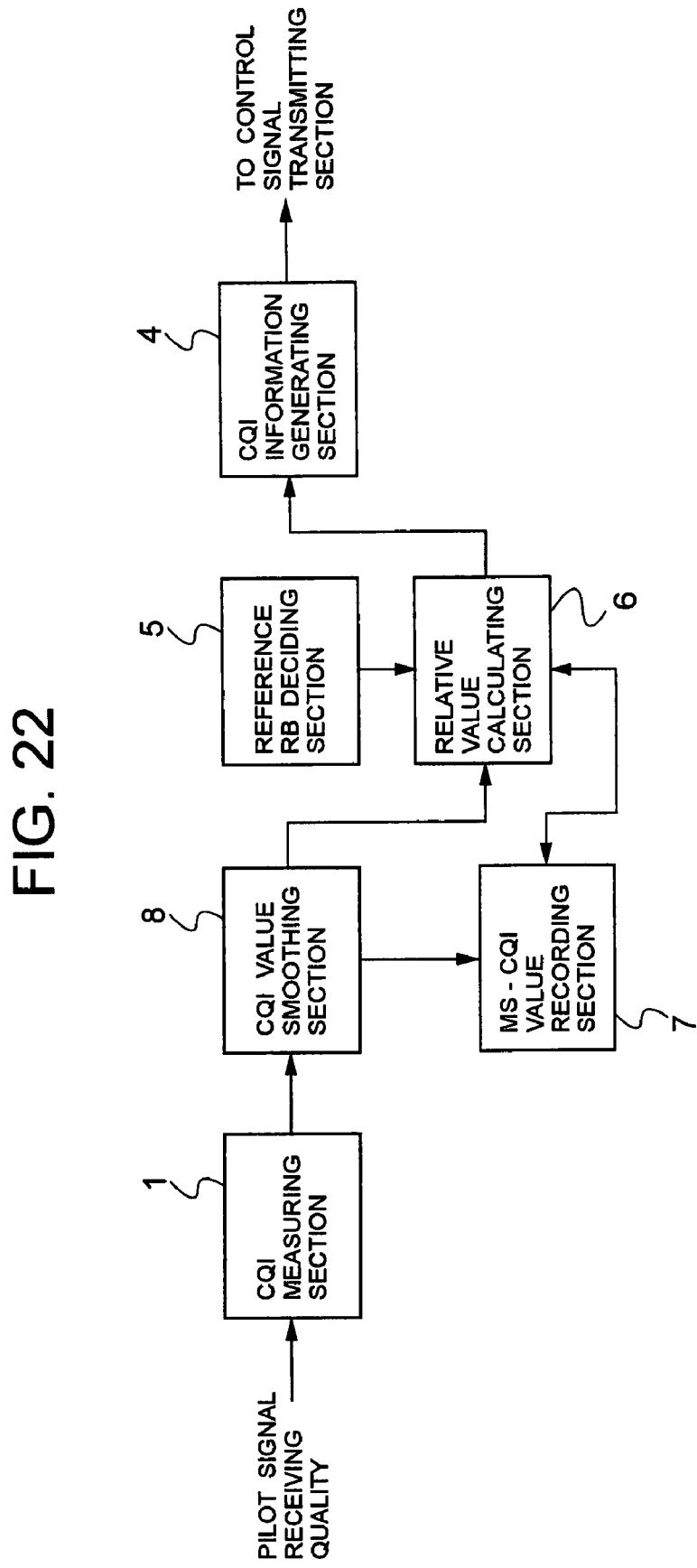
FIG. 22 is a diagram showing a configuration of the mobile station of the sixth embodiment.
Figure 23:
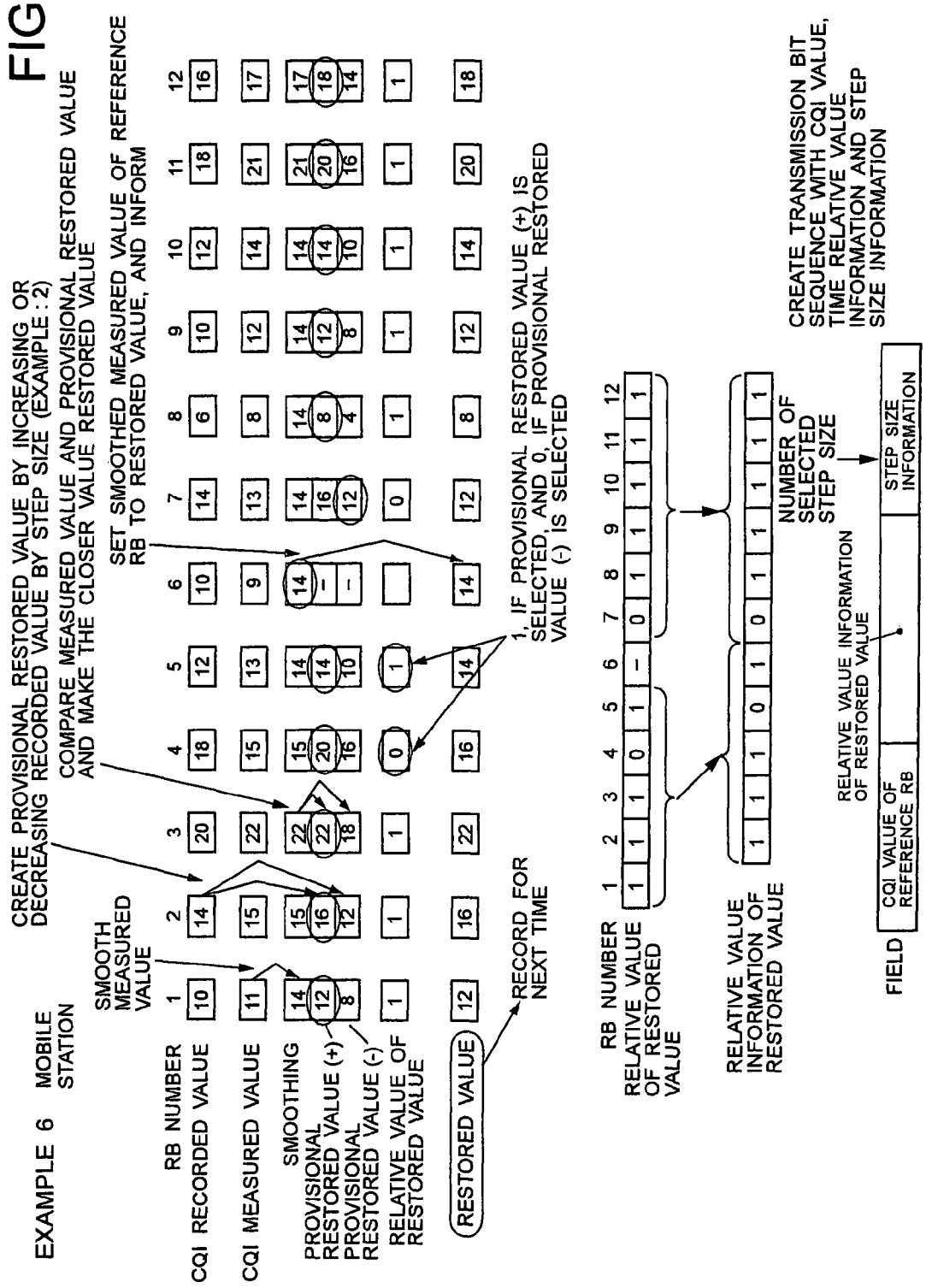
FIG. 23 is a diagram showing an example of operations of the mobile station of the sixth embodiment.

Configuration of the mobile station of the sixth embodiment is shown in FIG. 22. As the configuration and operations of the base station are not different from those of the fifth embodiment, they are omitted from the description. The sixth embodiment is different from the fifth embodiment in that the CQI value smoothing section 8 is added behind the CQI measuring section 1 of the mobile station. The CQI value smoothing section 8 replaces a CQI value equal to or below a predetermined value by the predetermined value for the CQI value obtained by the CQI measuring section 1. For example, it may be the predetermined value or an average value. FIG. 23 shows an example of calculating operations of the mobile station, which are the operations of the fifth embodiment added with an operation of replacing a CQI value equal to or below the predetermined value by the predetermined value for the measured CQI value with the other operations being the same. The transmission format of the mobile station is the same as that of the fifth embodiment.

Further, the fourth embodiment can take the configuration added with the CQI value smoothing section as in the sixth embodiment. A CQI value may be smoothed in a certain range by using a certain level for a reference as a smoothing level for smoothing the CQI value, other than the maximum value or the median value in addition to the abovementioned values (cut off a certain value and below).

In the fourth to the sixth embodiments, the past value of the RB is used other than the reference RB (the RB for informing the absolute value) so that the reference RB has a time lag. Thus, the value of the CQI is periodically reset. The RB for informing the absolute value of the CQI value is not necessarily one and the absolute values of the CQI values for a plurality of RBs are informed at a time. The absolute values may be periodically transmitted for all the RBs at a time; however, the number of bytes required for transmission does not become extremely big if an RB for informing the absolute value is changed in order.

<The Seventh Embodiment (Example 7)>

Figure 24:
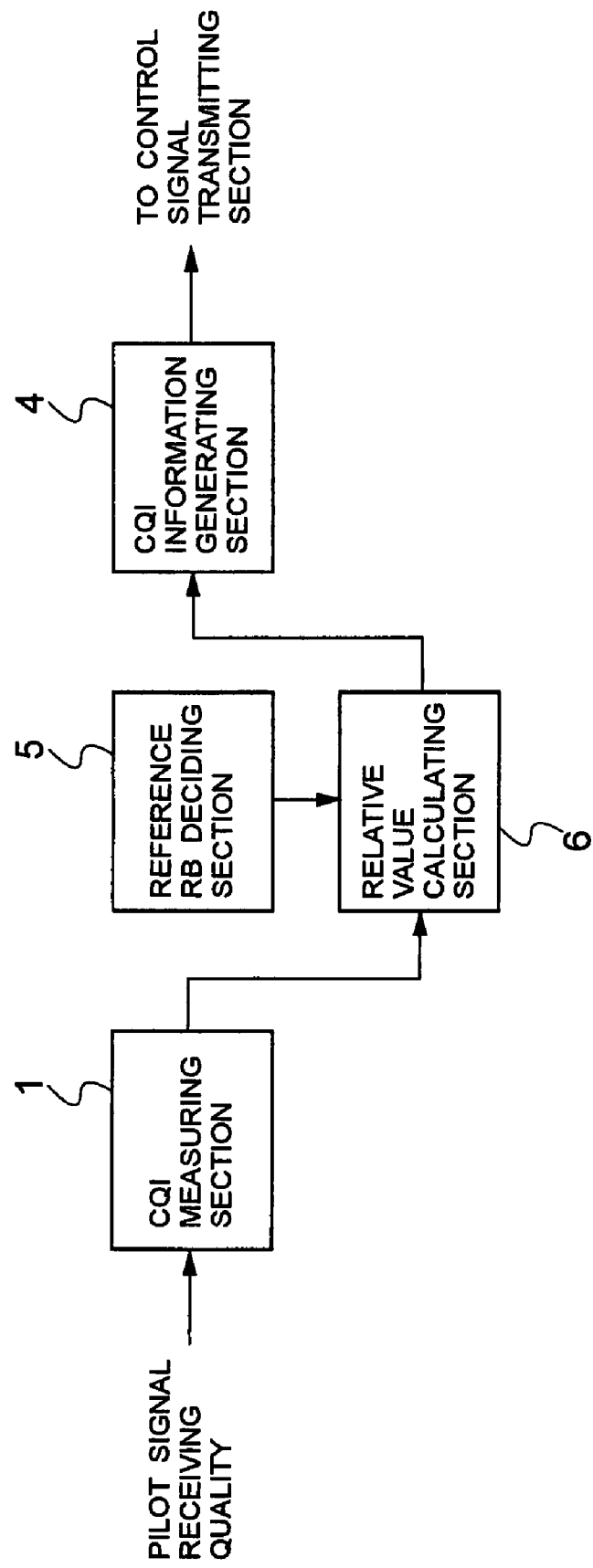
FIG. 24 is a diagram showing a configuration of the mobile station of the seventh embodiment.

The configuration of the mobile station of the seventh embodiment is shown in FIG. 24. The configuration of the base station is the same as that in FIG. 2. The mobile station includes a CQI measuring section 1, a reference RB deciding section 5, a relative value calculating section 6, and a CQI information generating section 4.

Figure 25:
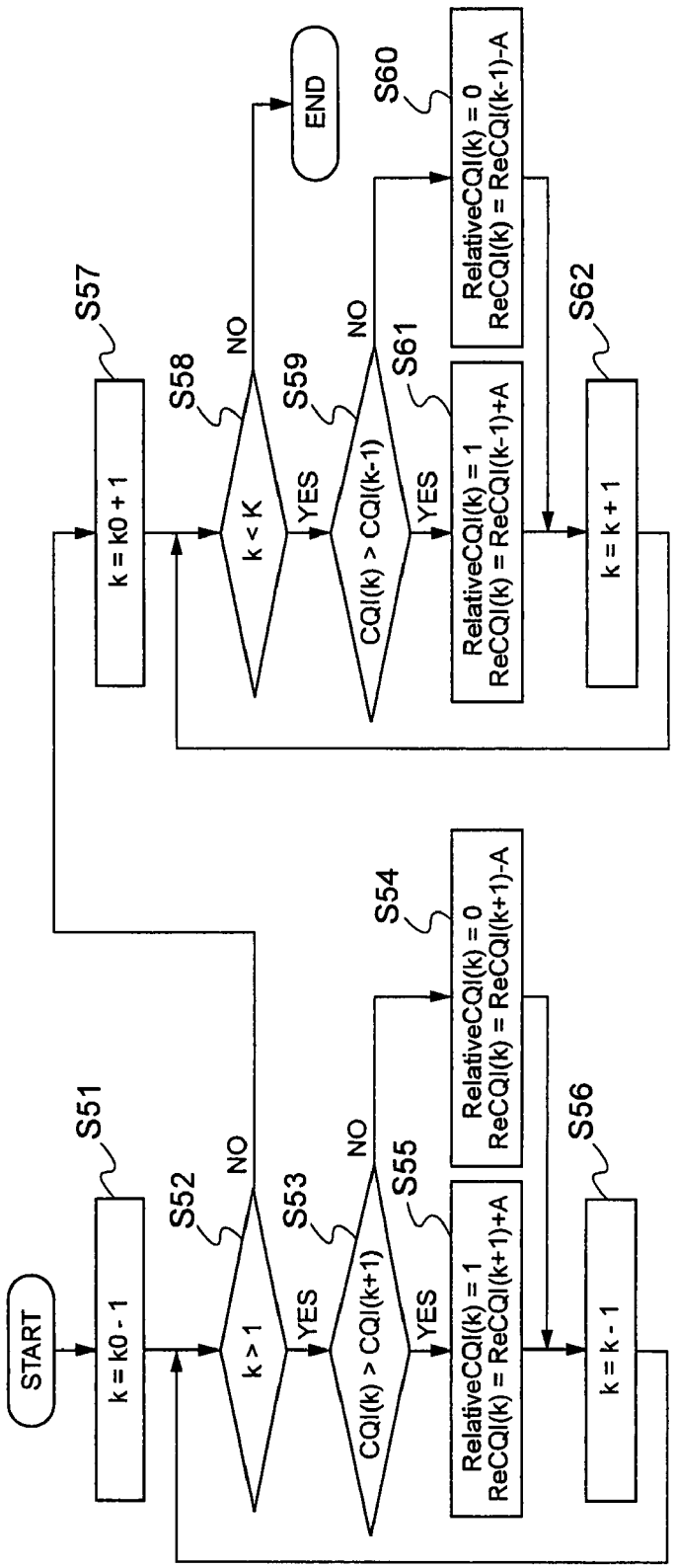
FIG. 25 is a flow showing operations of the mobile station of the seventh embodiment.

With reference to FIG. 25, operations of the mobile station will be described. First, the mobile station performs restoration to obtain the step size by which the difference between the restored CQI value and the measured CQI value is the minimum. A method for restoring the CQI value by using a step size will be described. The relative value represents relationship among the sizes of the CQI values of RBs to be adjacent (adjacent in the directions of high and low in the frequency or in the directions of up and down). First, the relative value of the RB number k smaller than the reference RB number k0 is examined for whether it is bigger or smaller than the measured value of the adjacent RB number (k+1) (steps S51, 52). For example, if the reference RB number is 6, the relative value of the RB number 4 represents whether the CQI of the RB number 4 is bigger or smaller than the CQI of the RB number 5.

On the other hand, the relative value of the RB number k which is bigger than the reference RB number k0 is examined for whether the measured value is bigger or smaller than the adjacent RB number (k−1) (steps S57, 58). For example, if the reference RB number is 6, the relative value of the RB number 8 represents whether the CQI value of the RB number 8 is bigger or smaller than the CQI value of the RB number 7. Therefore, the adjacent relative value Relative CQI (k) of the RB number k is shown by the formula below. The CQI (k) represents the measured CQI value of the RB number k, however (steps S54, S55, S60, S61).

$k<k0$ RelativeCQI$(k)=1$ ... CQI$(k)>$CQI$(k+1)$

RelativeCQI$(k)=0$ ... CQI$(k)\leq$CQI$(k+1)$ $k>k0$ RelativeCQI$(k)=1$ ... CQI$(k)>$CQI$(k-1)$ RelativeCQI$(k)=0$ ... CQI$(k)\leq$CQI$(k-1)$ In this example, although the comparison result is indicated by two stages for big and small as the one-bit notation of "0" and "1", it may be indicated by the four-stage notation as the two-bit notation of "00", "01", "10" and "11". Here, the definition can be made as below by introducing a determination threshold X. The determination threshold X may be decided in advance.

$k<k0$ RelativeCQI$(k)=11$ ... CQI$(k)>$CQI$(k+1)+X$

RelativeCQI$(k)=01$ ... CQI$(k+1)<$CQI$(k)\leq$CQI$(k+1)+X$

RelativeCQI$(k)=00$ ... CQI$(k+1)-X<$CQI$(k)\leq$CQI$(k+1)$

RelativeCQI$(k)=10$ ... CQI$(k)\leq$CQI$(k+1)-X$ $k>k0$ RelativeCQI$(k)=11$ ... CQI$(k)>$CQI$(k-1)+X$ RelativeCQI$(k)=01$ ... CQI$(k-1)<$CQI$(k)\leq$CQI$(k-1)-X$ RelativeCQI$(k)=00$ ... CQI$(k-1)-X<$CQI$(k)\leq$CQI$(k-1)$ RelativeCQI$(k)=10$ ... CQI$(k)\leq$CQI$(k-1)-X$ The restored value ReCQI (k) is restored as below by using the reference RB number k0, its CQI value (CQI0), the adjacent relative value Relative CQI (k) and the step size A.

$k=k0$ ReCQI$(k)=$CQI 0

$k<k0$ ReCQI$(k)=$ReCQI$(k+1)+A$ ... RelativeCQI$(k)=1$

ReCQI$(k)=$ReCQI$(k+1)-A$ ... RelativeCQI$(k)=0$ $k>k0$ ReCQI$(k)=$ReCQI$(k-1)+A$ ... RelativeCQI$(k)=1$ ReCQI$(k)=$ReCQI$(k-1)-A$ ... RelativeCQI$(k)=0$ If the adjacent relative value Relative CQI (k) is indicated by four stages, the restore value ReCQI (k) is restored by the formula below.

$k=k0$ ReCQI$(k)=$CQI 0

$k<k0$ ReCQI$(k)=$ReCQI$(k+1)+3\times A$ ... RelativeCQI$(k)=11$

ReCQI$(k)=$ReCQI$(k+1)+A$ ... RelativeCQI$(k)=01$

ReCQI$(k)=$ReCQI$(k+1)-A$ ... RelativeCQI$(k)=00$

ReCQI$(k)=$ReCQI$(k+1)-3\times A$ ... RelativeCQI$(k)=10$ $k>k0$ ReCQI$(k)=$ReCQI$(k-1)+3\times A$ ... RelativeCQI$(k)=11$ ReCQI$(k)=$ReCQI$(k-1)+A$ ... RelativeCQI$(k)=01$ ReCQI$(k)=$ReCQI$(k-1)-A$ ... RelativeCQI$(k)=00$ ReCQI$(k)=$ReCQI$(k-1)-3\times A$ ... RelativeCQI$(k)=10$ A plurality of sizes are prepared for the step size A in advance, for example, for selecting the step size by which a difference from the CQI measured value is the minimum. A method for calculating the difference is such that the difference is obtained by the sum of the absolute values of differences between the CQI values measured for respective RBs and the restored CQI values. Alternatively, it may be obtained by the sum of the absolute values of differences between the measured CQI values of the RBs of the top M (M is an integer of 1 or more) and the restored CQI value.

Figure 26:
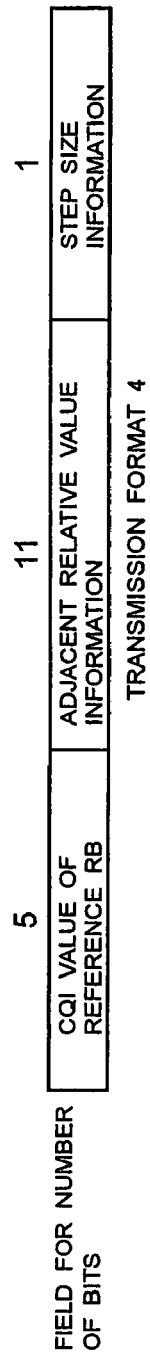
FIG. 26 is an example of a transmission format for data in the mobile station of the seventh and eighth embodiments.

In the CQI information generating section 4, information on the CQI value of the reference RB, the adjacent relative value information, and the step size is informed to the control information transmitting section in the format 4 shown in FIG. 26. The order of pieces of the information is merely an example. Here, the adjacent relative value information can be created by sorting (K−1) RB numbers, except for the number k0 of the reference RB, in the ascending order from the adjacent relative value Relative CQI (k). The step size information is informed such that a correspondence table of a plurality of step sizes and the numbers is prepared in the mobile station and the base station in advance, and the mobile station informs the number of the selected step size as the step size information.

Figure 27:
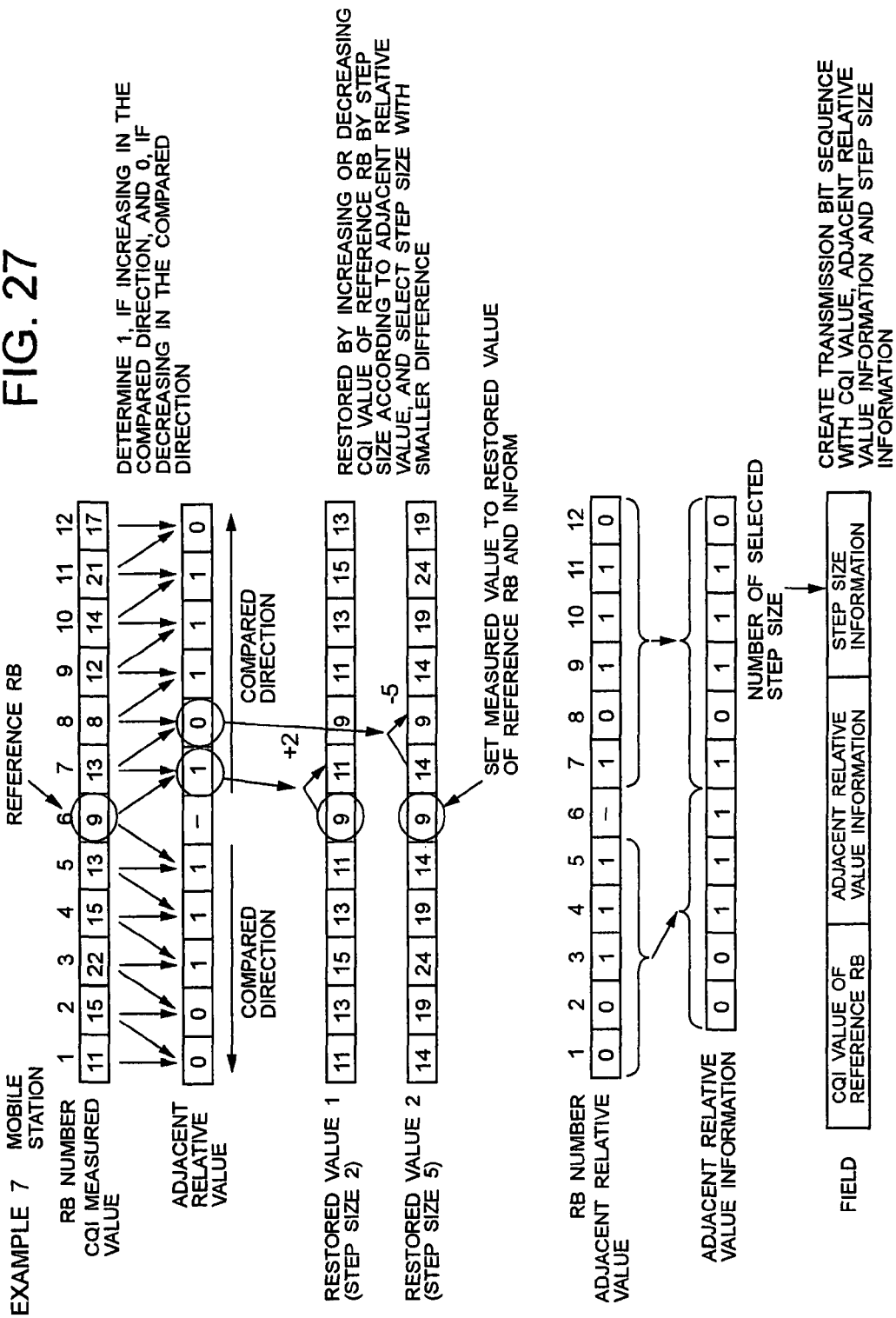
FIG. 27 is a diagram showing an example of operations of the mobile station of the seventh embodiment.

FIG. 27 shows an example of a calculating operation of the mobile station. At the CQI receiving section 10 of the base station, the CQI value of the reference RB, the adjacent relative value information and the step size are retrieved. The adjacent relative value of the RB other than the reference RB is retrieved from the adjacent relative value information. Relative value information for the bands adjacent upward and downward respectively (in the directions of high and low) is obtained with the reference RB being a reference, and the relative value information is generated as a bitmap. Then, the restored value for a quality of a communication channel for each RB is obtained by increasing or decreasing the step size according to the relative value information and the step size by which the restored value is the closest to the present measured value is selected. Finally, information on the CQI value of the reference RB, the adjacent relative value information and the step size is transmitted in the format 4 as shown in FIG. 26.

Figure 28:
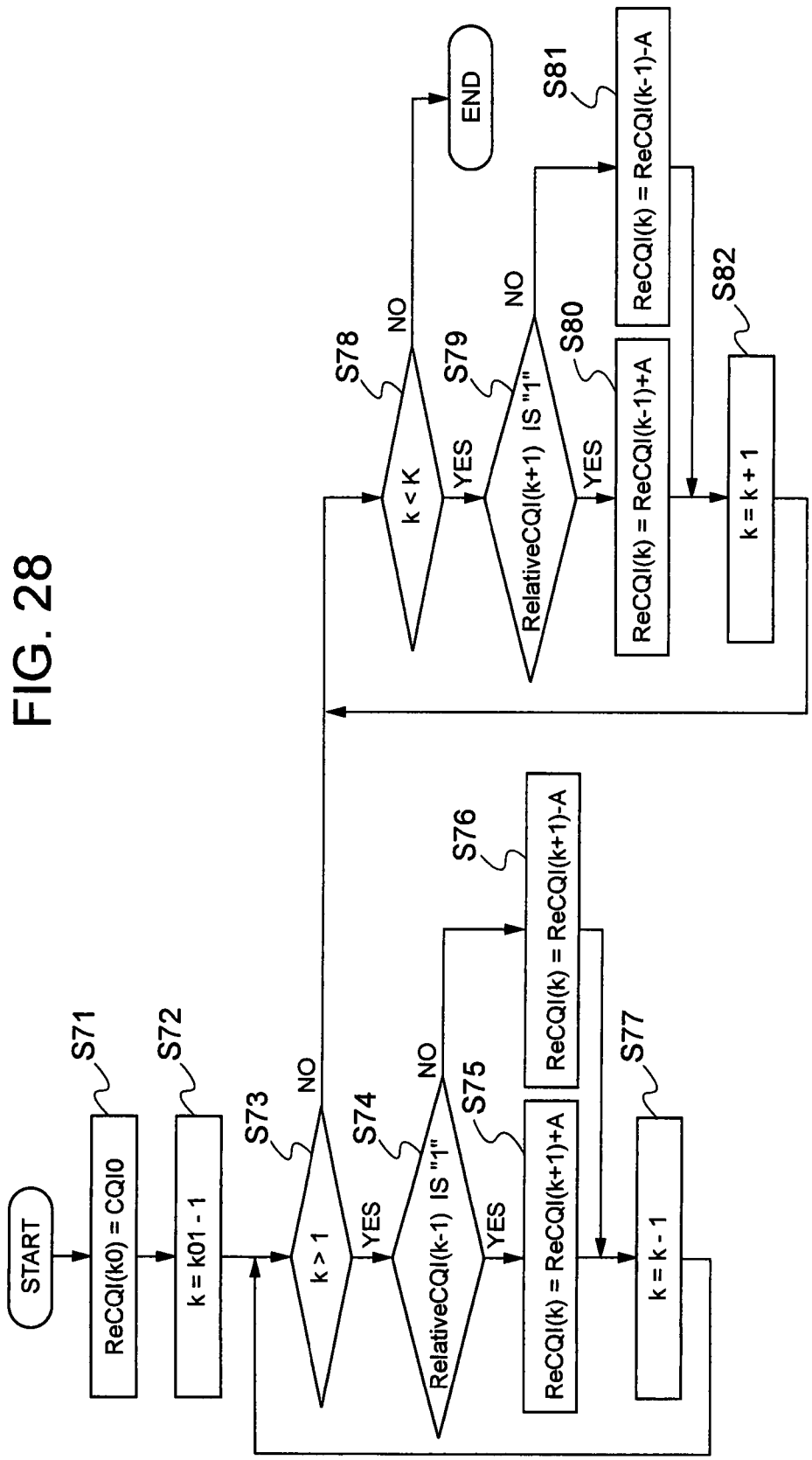
FIG. 28 is a flow showing operations of the base station of the seventh embodiment.

As shown in FIG. 28, the restored value of the reference RB is set (step S71) and the restored value of the RB number k which is smaller than the reference RB number k0 is calculated (step S71 to step S77). After the restored value of the smallest RB is calculated, the restored value of the RB number k that is bigger than the reference RB k0 is calculated (see the step S78 to the step 82).

$k=k0$ ReCQI$(k)$=CQI 0

$k<k0$ ReCQI$(k)$ReCQI$(k+1)+A$ ... RelativeCQI$(k)$=1

ReCQI$(k)$=ReCQI$(k+1)-A$ ... RelativeCQI$(k)$=0

$k>k0$ ReCQI$(k)$=ReCQI$(k-1)+A$ ... RelativeCQI$(k)$=1

ReCQI$(k)$=ReCQI$(k-1)-A$ ... RelativeCQI$(k)$=0

Figure 29:
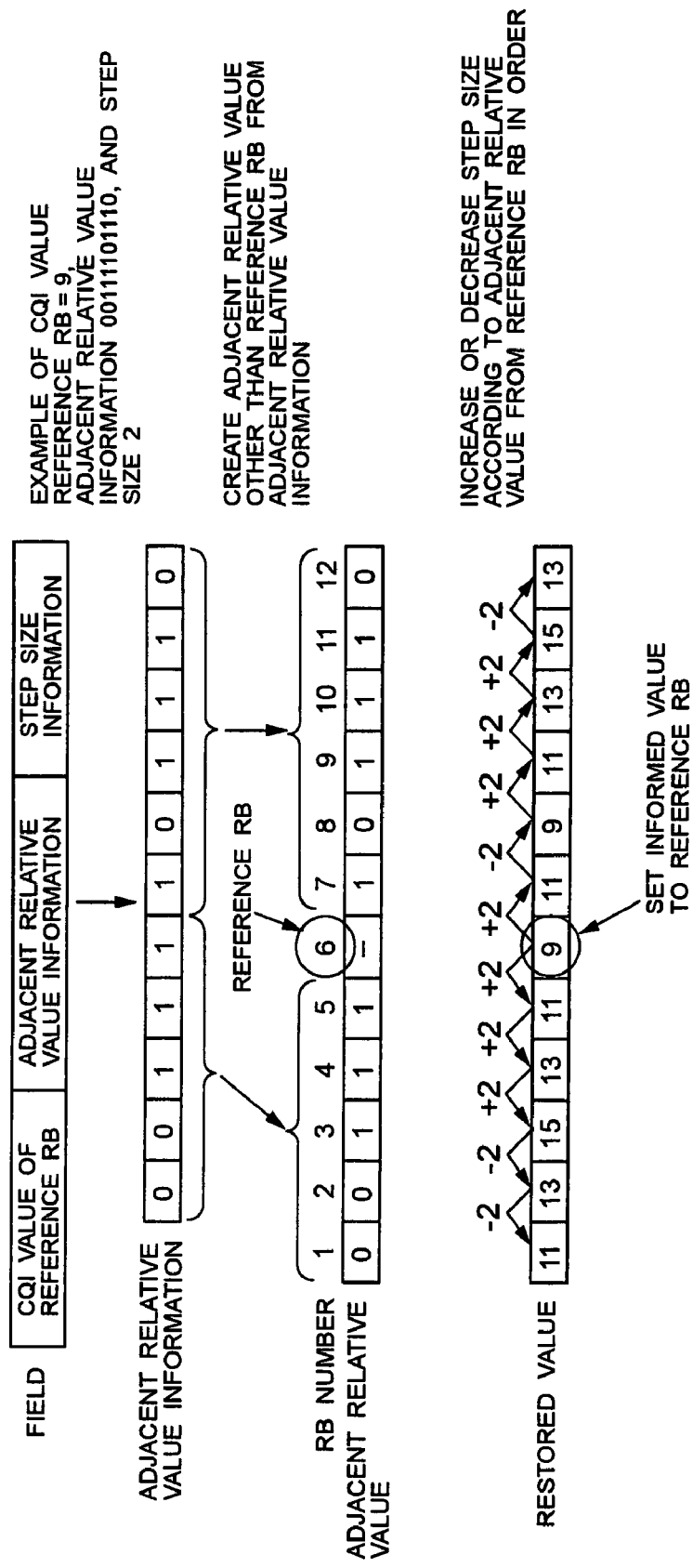
FIG. 29 is a diagram showing operations of the base station of the seventh embodiment.

Referring to FIG. 29, the adjacent relative value other than the reference RB is created from the bitmap, the step size is increased or decreased according to the adjacent relative value starting from the reference RB in order, a notice value is set to the reference RB to obtain the CQI restored value for each RB.

<The Eighth Embodiment (Example 8)>

Figure 30:
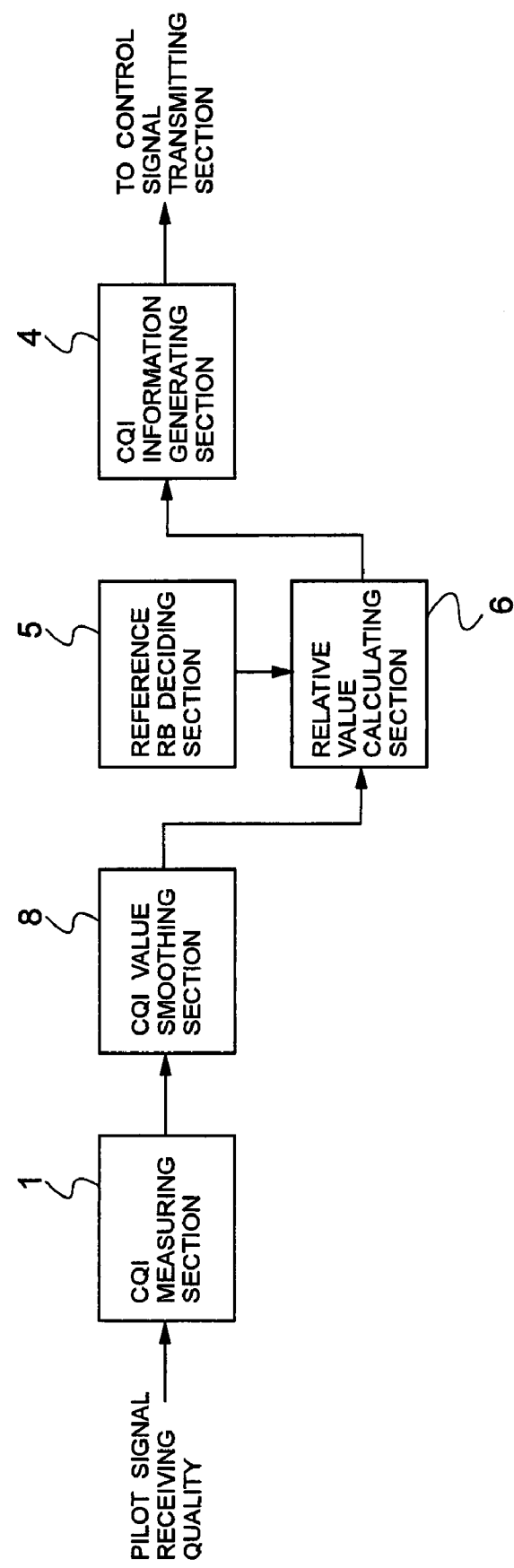
FIG. 30 is a diagram showing a configuration of the mobile station of the eighth embodiment.
Figure 31:
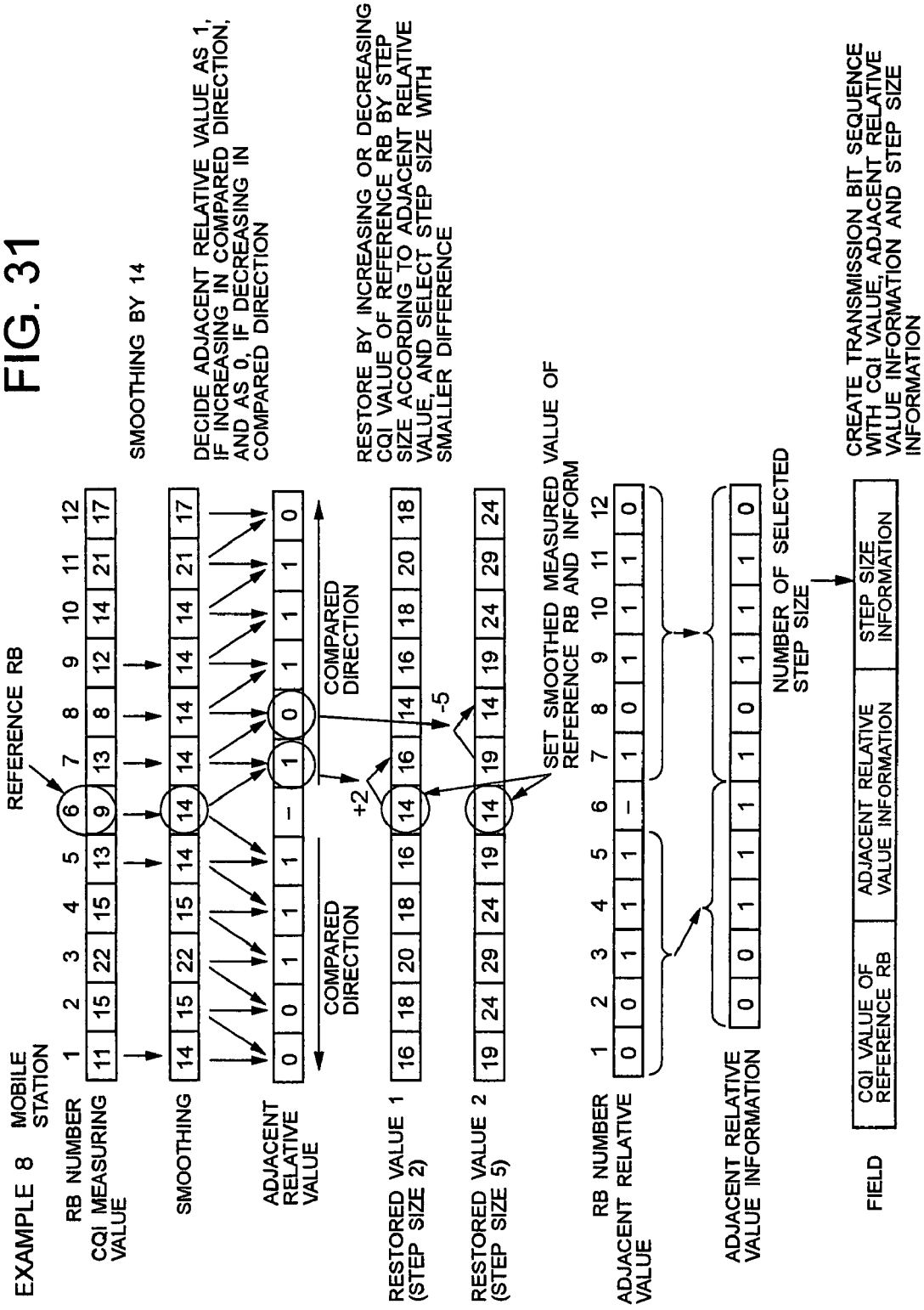
FIG. 31 is a diagram showing an example of operations of the mobile station of the eighth embodiment.

The configuration of the mobile station of the eighth embodiment is shown in FIG. 30. As the configuration of the base station is not different from that of the seventh embodiment, it is omitted from the description. The configuration of the eighth embodiment is different from that of the seventh embodiment in that the CQI value smoothing section 8 is added. The CQI value smoothing section 8 replaces a CQI value equal to or below a predetermined value by the predetermined value for the CQI value obtained by the CQI measuring section 1. For example, it may be a predetermined certain value or an average value. A CQI value may be smoothed in a certain range by using a certain level for a reference as a smoothing level for smoothing the CQI value, other than the maximum value or the median value in addition to the abovementioned values (cut off a certain value and below). FIG. 31 shows an example of calculation of the mobile station. The transmission format is the format 4 that is the same as the seventh embodiment. As the remaining processes are the same as those of the seventh embodiment, they are omitted from the description.

<The Ninth Embodiment (Example 9)>

The configuration of the mobile station of the ninth embodiment is shown in FIG. 32. As the configuration of the base station is not different from that of the seventh embodiment, it is omitted from the description. The configuration of the ninth embodiment is different from that of the seventh embodiment in that the average value calculating section 2 is added.

Operations of the mobile station are to obtain an average value of the CQIs and to perform comparison as in the seventh embodiment. The operations are different from those in the seventh embodiment in that the step size is not calculated at the mobile station. Exemplary operations of calculation of the mobile station are shown in FIG. 33. At the CQI information generating section 4, the CQI value of the reference RB, the adjacent relative value information and the average value are informed to the control information transmitting section in the format 5 of FIG. 34. The order of pieces of the information is merely an example.

The base station calculates the restored value for each RB by using the CQI value of the reference RB and adjacent relative value information informed from the mobile station as in the seventh embodiment. Here, the step size is a value kept in the base station. A CQI value for each RB and the average value obtained by a certain step size have the relationship as shown in the formula below.

$\Sigma$ReCQI$(k)$=$K\times$CQIA($\Sigma$ is the total sum of $k$=1 to $K$)

Here, ReCQI (k) is the restored value of the RB number k and the CQIA is the average value.

A plurality of the left-hand side of the abovementioned formula is obtained by changing the step size, and the value restored with the step size that is the closest to the right-hand side obtained with the informed average value is made as the restored value. Exemplary operations of calculation by the base station are shown in FIG. 35.

<The Tenth Embodiment (Example 10)>

The configuration of the mobile station of the tenth embodiment is shown in FIG. 36. As the configuration of the base station is not different from that of the ninth embodiment, it is omitted from the description. The configuration of the tenth embodiment is different from that of the ninth embodiment of the mobile station in that the CQI value smoothing section 8 is added. The CQI value smoothing section 8 replaces a CQI value equal to or below a predetermined value by the predetermined value for the CQI value that is obtained by the CQI measuring section 1. For example, it may be a predetermined value or an average value. A CQI value may be smoothed in a certain range by using a certain level for a reference as a smoothing level for smoothing the CQI value, other than the maximum value or the median value in addition to the abovementioned values (cut off a certain value and below). The same operations as those of the ninth embodiment are performed by using the CQI smoothed by a predetermined value. Exemplary operations of calculation by the mobile station are shown in FIG. 37. They are informed in the transmission format 5 as in the ninth embodiment.

In the transmission format 5 used in the ninth and the tenth embodiments, an absolute value on one side may be transmitted and the other side may transmit the relative value for the absolute value, instead of transmitting the CQI value of the reference RB and the average value.

<The Eleventh Embodiment (Example 11)>

Figure 38:
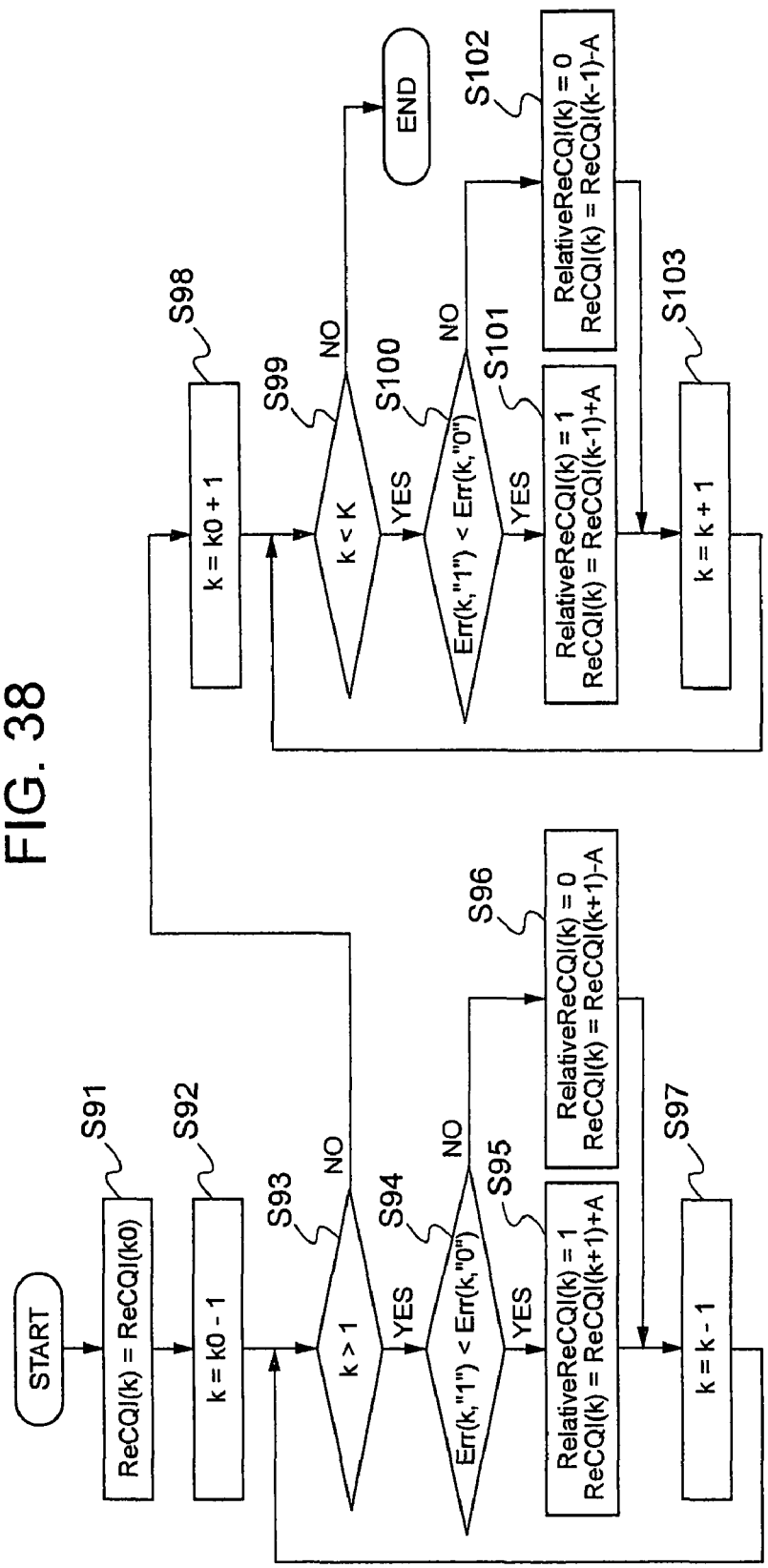
FIG. 38 is a flow showing operations of the base station of the eleventh embodiment.

The eleventh embodiment has the same configuration as that of the seventh embodiment, with an only difference in operations of the relative value calculating section 6. In this example, the relative value of the restored value represents whether to increase or decrease the restored value of the adjacent RB by adding or subtracting the step size A to or from the restored value so that the resulting restored value and the measured value are close to each other. Operations of the mobile station will be described with reference to FIG. 38. The eleventh embodiment is different from the seventh embodiment in that the relative value is calculated by using the restored CQI and the measured CQI.

The relative value represents whether to increase or decrease the restored value that is created from a restored value of the adjacent RB number (k+1) so that the restored value is close to the measured value of the RB number k for the RB number k (step S92) that is smaller than the reference RB number k0 (step S91). For example, if the reference RB number is 6, the relative value of the RB number 4 is decided by comparing a candidate for the restored value of the RB number 4 that is obtained by increasing or decreasing the restored value of the RB number 5 by the step size and the measured value of the RB number 4; examining whether the difference between them decreases as the restored value of the RB number 5 increases or decreases; and making the candidate for the restored value with a small difference the restored value of the RB number 4. The relative value is decided as a value representing to increase or decrease the restored value at that time (steps S93 to S97).

On the other hand, for the RB number k that is bigger than the reference RB number k0 (step S98), the relative value represents whether to increase or decrease the restored value created from the restored value of the adjacent small RB number (k−1) so that the created restored value is close to the measured value of the RB number k. For example, if the reference RB number is 6, the relative value of the RB number 8 is decided by comparing a candidate for the restored value of the RB number 8 that is obtained by increasing or decreasing the restored value of the RB number 7 by the step size and the measured value of the RB number 8; examining whether the difference between them decreases as the restored value of the RB number 7 increases or decreases, and making the candidate for the restored value with a small difference the restored value of the RB number 8. The relative value is decided as a value representing to increase or decrease the restored value at that time (steps S99 to S103).

The restored value ReCQI (k) is calculated by the formula below according to the relative value Relative CQI (k) where the step size is assumed as A.

$k=k0$ ReCQI$(k)$=CQI 0

$k<k0$ ReCQI$(k)$=ReCQI$(k+1)$+$A$ ... RelativeReCQI$(k)$=1

ReCQI$(k)$=ReCQI$(k+1)$−$A$ ... RelativeReCQI$(k)$=0

$k>k0$ ReCQI$(k)$=ReCQI$(k−1)$+$A$ ... RelativeReCQI$(k)$=1

ReCQI$(k)$=ReCQI$(k−1)$−$A$ ... RelativeReCQI$(k)$=0

Here, the relative value RelativeReCQI of the restored value is shown in the formulae below.

RelativeReCQI$(k)$=1 ... if Err$(k;$ "1"$)$≦Err$(k;$ "0"$)$

RelativeReCQI$(k)$=0 ... if Err$(k;$ "1"$)$>Err$(k;$ "0"$)$

Err$(k;$ "1"$)$ and Err$(k;$ "0"$)$ represent differences obtained by the formulas below, respectively. The number "1" represents the case where it increases by the step size, while "0" represents the case where it decreases by the step size.

$k<k0$ Err $(k;$ "1"$)$=|CQI$(k)$−ReCQI$(k+1)$+$A$|

Err$(k;$ "0"$)$=|CQI$(k)$−ReCQI$(k+1)$−$A$|

$k>k0$ Err$(k;$ "1"$)$=|CQI$(k)$−ReCQI$(k−1)$+$A$|

Err$(k;$ "0"$)$=|CQI$(k)$−ReCQI$(k−1)$−$A$|

In this example, the comparison result is indicated by the two stages for big and small as the one bit notation, it may be indicated by the four-stage notation as the two-bit notation. Here, it is calculated as below.

$k<k0$ Err$(k;$ "11"$)$=|CQI$(k)$−ReCQI$(k+1)$+3×$A$|

Err$(k;$ "01"$)$=|CQI$(k)$−ReCQI$(k+1)$+$A$|

Err$(k;$ "00"$)$=|CQI$(k)$−ReCQI$(k+1)$−$A$|

Err$(k;$ "10"$)$=|CQI$(k)$−ReCQI$(k+1)$−3×$A$|

$k>k0$ Err$(k;$ "11"$)$=|CQI$(k)$−ReCQI$(k−1)$+3×$A$|

Err$(k;$ "01"$)$=|CQI$(k)$−ReCQI$(k−1)$+$A$|

Err$(k;$ "00"$)$=|CQI$(k)$−ReCQI$(k−1)$−$A$|

Err$(k;$ "10"$)$=|CQI$(k)$−ReCQI$(k−1)$−3×$A$|

The restored value is obtained by using a plurality of step sizes and the step size that decreases the difference between the CQI measured value and the restored value is selected. A method for calculating the difference is such that the difference is obtained by the sum of the absolute values of differences between the CQI values measured for respective RGs and the restored CQI value. Alternatively, it may be obtained by the sum of the absolute values of differences between the measured CQI values of the RB of the top M (M is an integer of 1 or more) and the restored CQI value.

Figure 39:
FIG. 39 is an example of a transmission format for data in the mobile station of the eleventh to thirtieth embodiments.

The CQI information generating section 4 informs the control signal transmitting section of the obtained reference RB number, relative value information between the CQI value of the reference RB and the restored value, and the step size in the format 6 shown in FIG. 39. Here, the relative value information of the restored value can be created by sorting the (K−1) RB numbers except for the number k0 of the reference RB in the ascending order starting from the relative value RelativeReCQI (k) of the restored value. The step size information is informed such that a correspondence table of a plurality of steps and the numbers is prepared in the mobile station and the base station in advance and the mobile station informs the number of the selected step size as the step size information.

Figure 40:
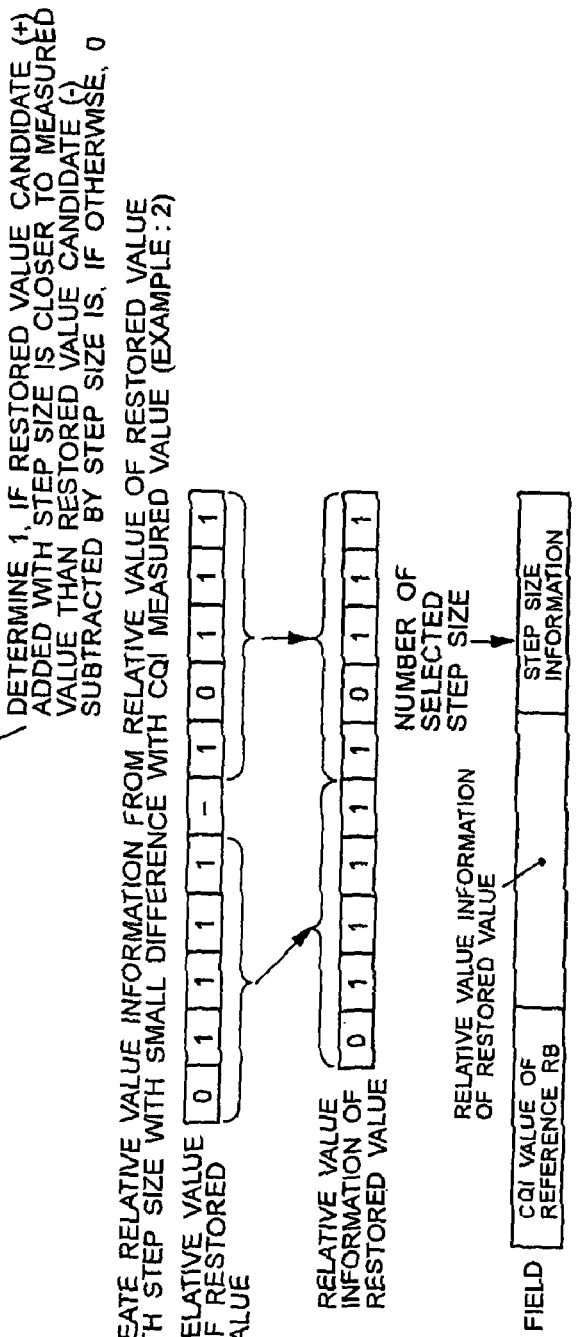
FIG. 40 is a diagram showing an example of operations of the mobile station of the eleventh embodiment.

FIG. 40 shows an example of a calculating operation of the mobile station where the step size is two. Referring to FIG. 40, the reference RB is selected, two candidates for the restored value are obtained by increasing or decreasing the step size for the adjacent bands that is adjacent upward and downward (in the direction of high and low) respectively with the reference RB being as a reference, and generating the relative value information of the restored value indicating which restored value candidate that is increased or decreased by the step size is the restored value candidate near to the measured value as a bitmap. Then, the restored value is obtained for each of the plurality of step sizes by using relative value information and the step size by which the restored value is the closest to the measured value is selected. The selected step size information, the CQI value of the reference RB and the bitmap are informed to the base station in the format 6.

The base station retrieves the relative value of the restored value and the step size from the relative value information between the CQI value of the reference RB and the restored value at the CQI receiving section 10. The CQI value of the RB is calculated by the formulas below according to the relative value of the restored value for the CQI value of the informed reference RB as in the seventh embodiment.

$k=k0$ ReCQI$(k)$=CQI 0

$k<k0$ ReCQI$(k)$=ReCQI$(k+1)$+$A$ ... RelativeReCQI$(k)$=1

ReCQI$(k)$=ReCQI$(k+1)$−$A$ ... RelativeReCQI$(k)$=0

$k>k0$ ReCQI($k$)=ReCQI($k-1$)+$A$ ... RelativeReCQI($k$)=1

ReCQI($k$)=ReCQI($k-1$)-$A$ ... RelativeReCQI($k$)=0

Figure 41:
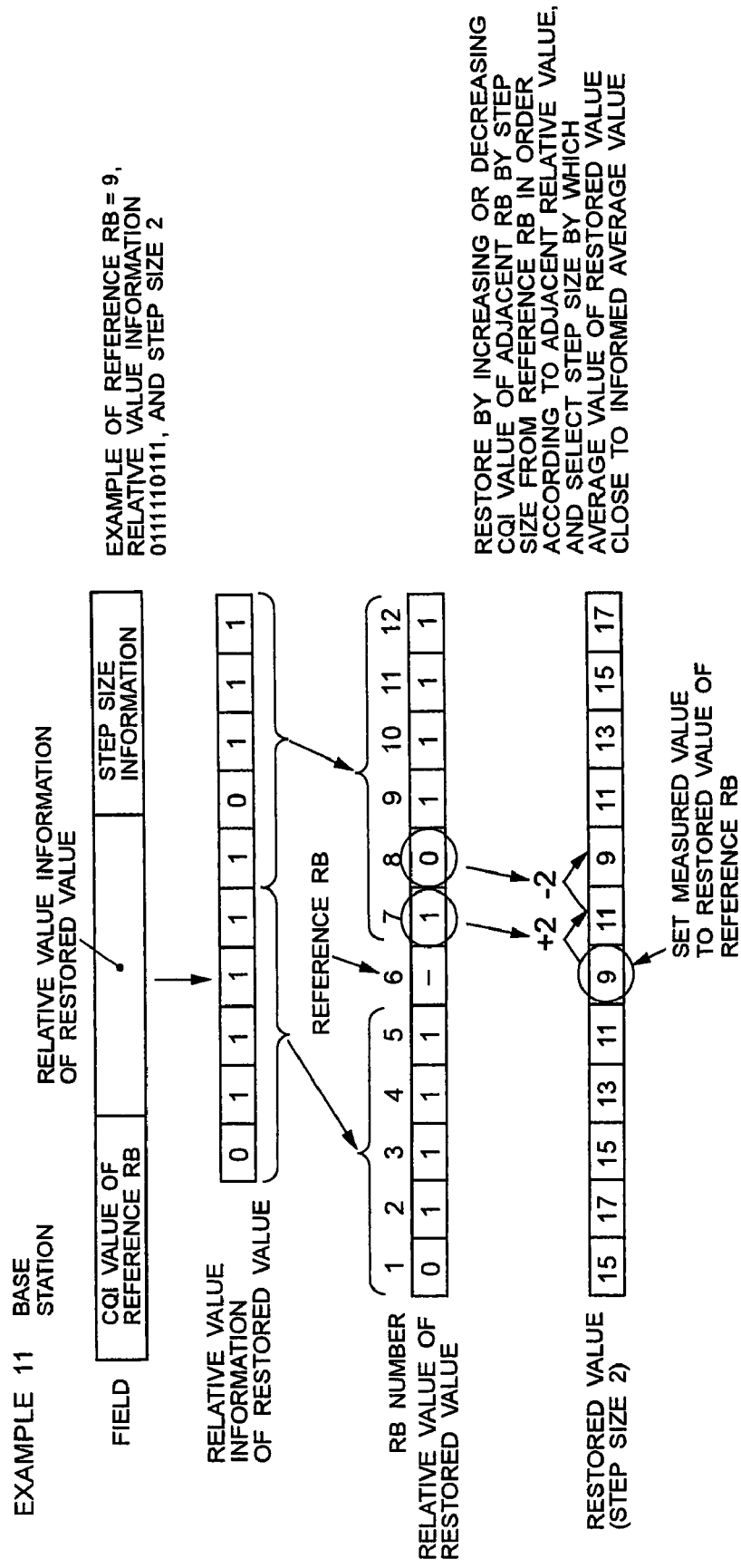
FIG. 41 is a diagram showing an example of operations of the mobile station of the eleventh embodiment.

An example of a calculating operation of the base station is shown in FIG. 41. At the base station, the restored value is obtained by increasing or decreasing the step size according to the adjacent relative value for the CQI value of the adjacent RB from the reference RB in order. Then, the step size by which the average value of the restored value is close to the informed average value is selected.

If the relative value of the restored value is indicated by four stages, it is represented as below.

$k=k0$ ReCQI($k$)=CQI 0

$k<k0$ ReCQI($k$)=ReCQI($k+1$)+3×$A$ ... RelativeReCQI($k$)=11

ReCQI($k$)=ReCQI($k+1$)+$A$ ... RelativeReCQI($k$)=01

ReCQI($k$)=ReCQI($k+1$)-$A$ ... RelativeReCQI($k$)=00

ReCQI($k$)=ReCQI($k+1$)-3×$A$ ... RelativeReCQI($k$)=10

$k>k0$ ReCQI($k$)=ReCQI($k-1$)+3×$A$ ... RelativeReCQI($k$)=11

ReCQI($k$)=ReCQI($k-1$)+$A$ ... RelativeReCQI($k$)=01

ReCQI($k$)=ReCQI($k-1$)-$A$ ... RelativeReCQI($k$)=00

ReCQI($k$)=ReCQI($k-1$)-3×$A$ ... RelativeReCQI($k$)=10

<Modification Of The Eleventh Embodiment (Modification Of The Example 11)>

Figure 42:
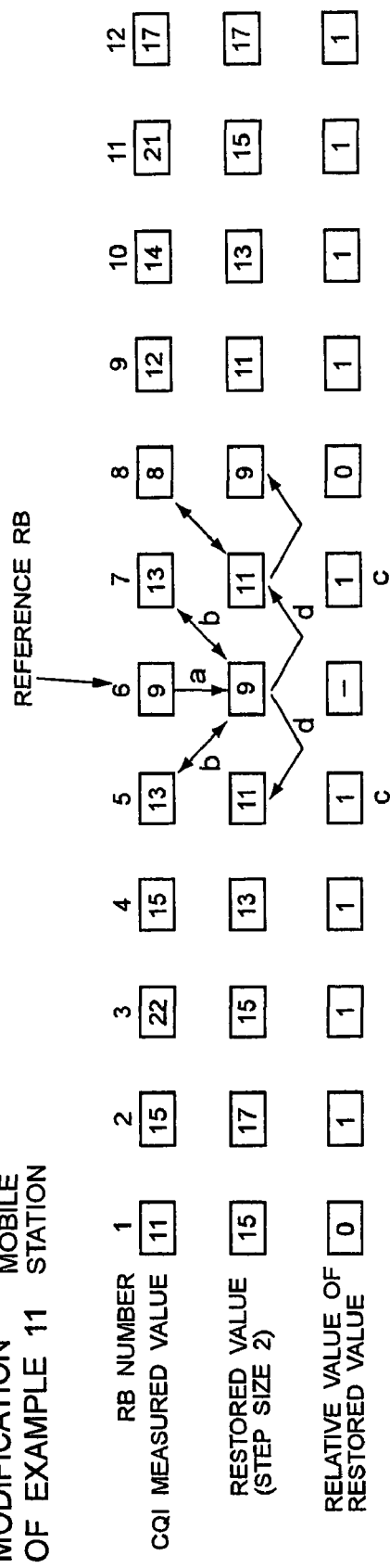
FIG. 42 is a diagram showing an example of operations of the mobile station in a modification of the eleventh embodiment.

The operations of the mobile station in the example are shown in FIG. 42. First, the CQI measured value of the reference RB is set to the restored value (Step a). Then, the CQI measured value and the restored value of the adjacent RB are compared with each other (Step b). If the CQI measured value is bigger than the restored value of the adjacent RB in the comparison result, the relative value is set to 1; if otherwise, the relative value is set to 0 (Step c). If the relative value is 1, the step size is added to the restored value of the adjacent RB; and if the relative value is 0, the step size is subtracted from the restored value of the adjacent RB to make the result the restored value of the RB (Step d).

The restored value ReCQI (k) is calculated as below, where k0 is the reference RB number, the CQI (k) is the CQI value of the RB number k, and A is the step size.

$k=k0$ ReCQI($k$)=CQI($k$)

$k<k0$ ReCQI($k$)=ReCQI($k+1$)+$A$ ... RelativeCQI($k$)=1

ReCQI($k$)=ReCQI($k+1$)-$A$ ... RelativeCQI($k$)=0

$k>k0$ ReCQI($k$)=ReCQI($k-1$)+$A$ ... RelativeCQI($k$)=1

ReCQI($k$)=ReCQI($k-1$)-$A$ ... RelativeCQI($k$)=0

The relative value Relative CQI (k) of the restored value is defined by the formulas below.

$k<k0$ RelativeCQI($k$)=1 CQI($k$)≧ReCQI($k+1$)

RelativeCQI($k$)=0 CQI($k$)<ReCQI($k+1$)

$k>k0$ RelativeCQI($k$)=1 CQI($k$)≧ReCQI($k-1$)

RelativeCQI($k$)=0 CQI($k$)<ReCQI($k-1$)

<The Twelfth Embodiment (Example 12)>

Figure 43:
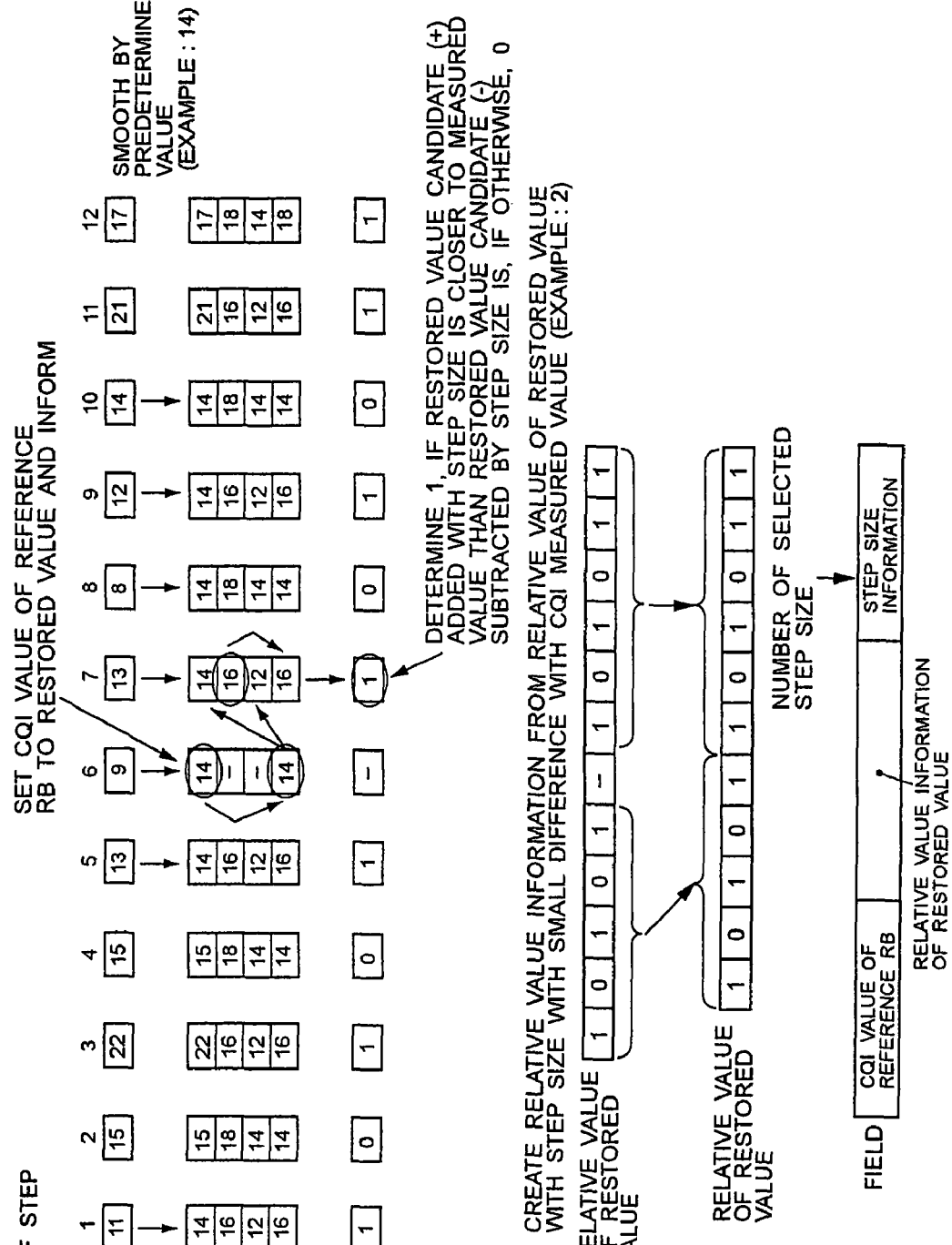
FIG. 43 is a diagram showing an example of operations of the mobile station of the twelfth embodiment.

The twelfth embodiment has a configuration of the mobile station of the eleventh embodiment added with the CQI value smoothing section 8. The CQI value smoothing section 8 replaces the CQI value smaller than a predetermined value by the predetermined value for the CQI value obtained by the CQI measuring section 1. For example, it may be a predetermined value or an average value. A CQI value may be smoothed in a certain range by using a certain level for a reference as a smoothing level for smoothing the CQI value, other than the maximum value or the median value in addition to the abovementioned values (cut off a certain value and below). An example of calculating operations of the mobile station is shown in FIG. 43. The transmission format 6 is used for the information as in the first embodiment. As the remaining operations are the same as those of the eleventh embodiment, they are omitted from the description.

<The Thirteenth Embodiment (Example 13)>

The thirteenth embodiment has a configuration of the twelfth embodiment with a difference in the operations of the reference RB deciding section in the mobile station. In the twelfth embodiment, the reference RB is decided according to a predetermined rule, though, the reference RB is decided by making rounds according to the predetermined rule for each transmission time. For example, an initial value may be decided by using a frame number and rounds may be made for all the RBs starting from the RB in the order of the RB numbers. As the other operations are the same as those of the twelfth embodiment, they are omitted from the description. The transmission format 6 is used for the information.

In the seventh to the eleventh embodiments, the reference RB deciding section may decide the reference RB by making rounds according to a predetermined rule for each transmission time as in the thirteenth embodiment.

<The Fourteenth Embodiment (Example 14)>

Figure 44:
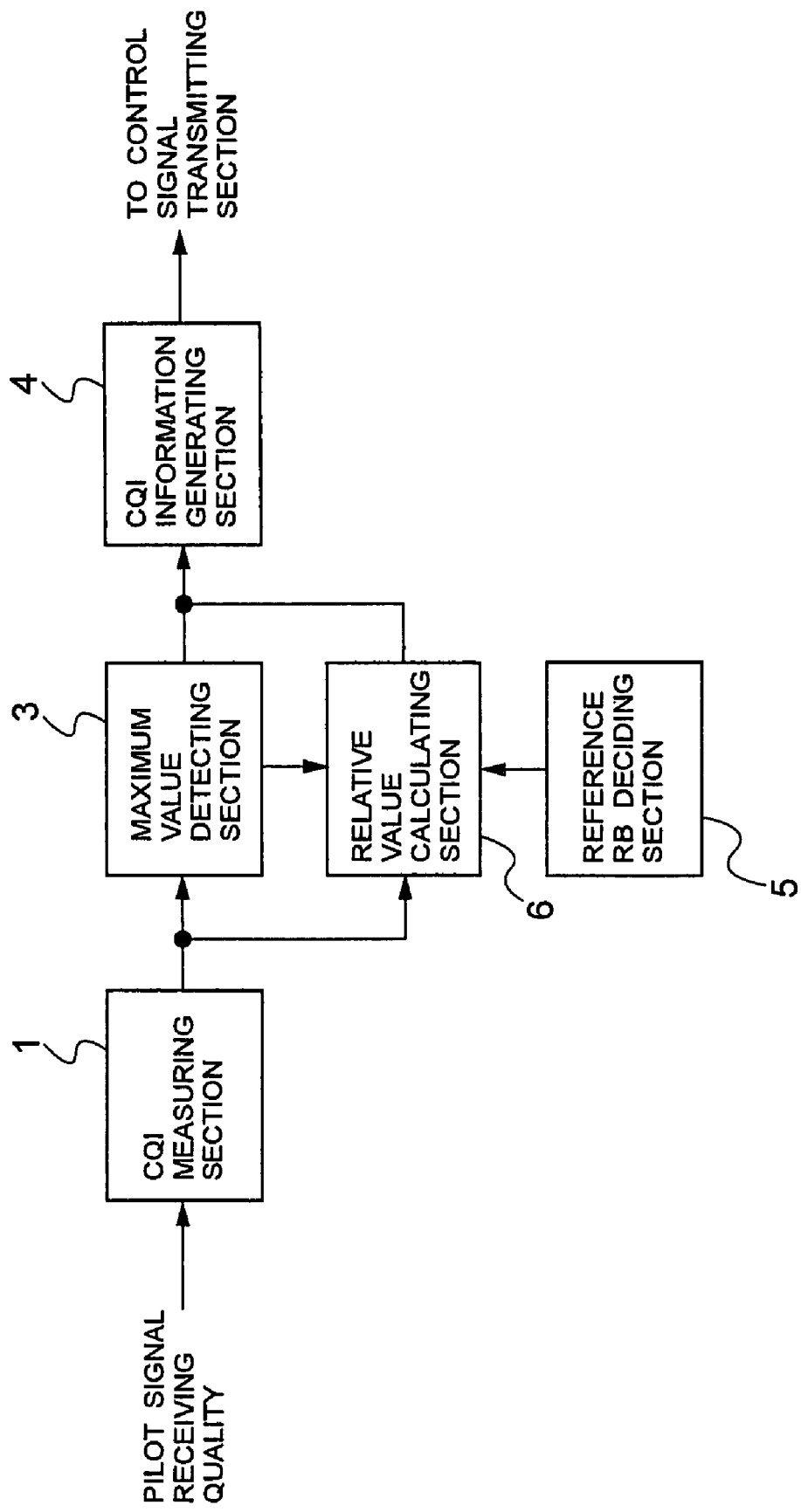
FIG. 44 is a diagram showing a configuration of the mobile station of the fourteenth embodiment.

The configuration of the mobile station of the fourteenth embodiment is shown in FIG. 44. As the configuration of the base station is the same as that of the eleventh embodiment, it is omitted from the description. The mobile station is that of the eleventh embodiment added with the maximum value detecting section 3. It is different from that of the eleventh embodiment in that the maximum value of the measured CQI value is informed of instead of the CQI value of the reference RB. The object of informing is to match the maximum value of the restored CQI value with the maximum value of the measured CQI as the value to be restored depends on the CQI value of the reference RB. At the base station, a provisional CQI value from the relative value is restored by giving an appropriate initial CQI value to an appropriate RB, and the restored value is shifted by a difference between the maximum value of the restored CQI value and the informed CQI value.

Figure 45:
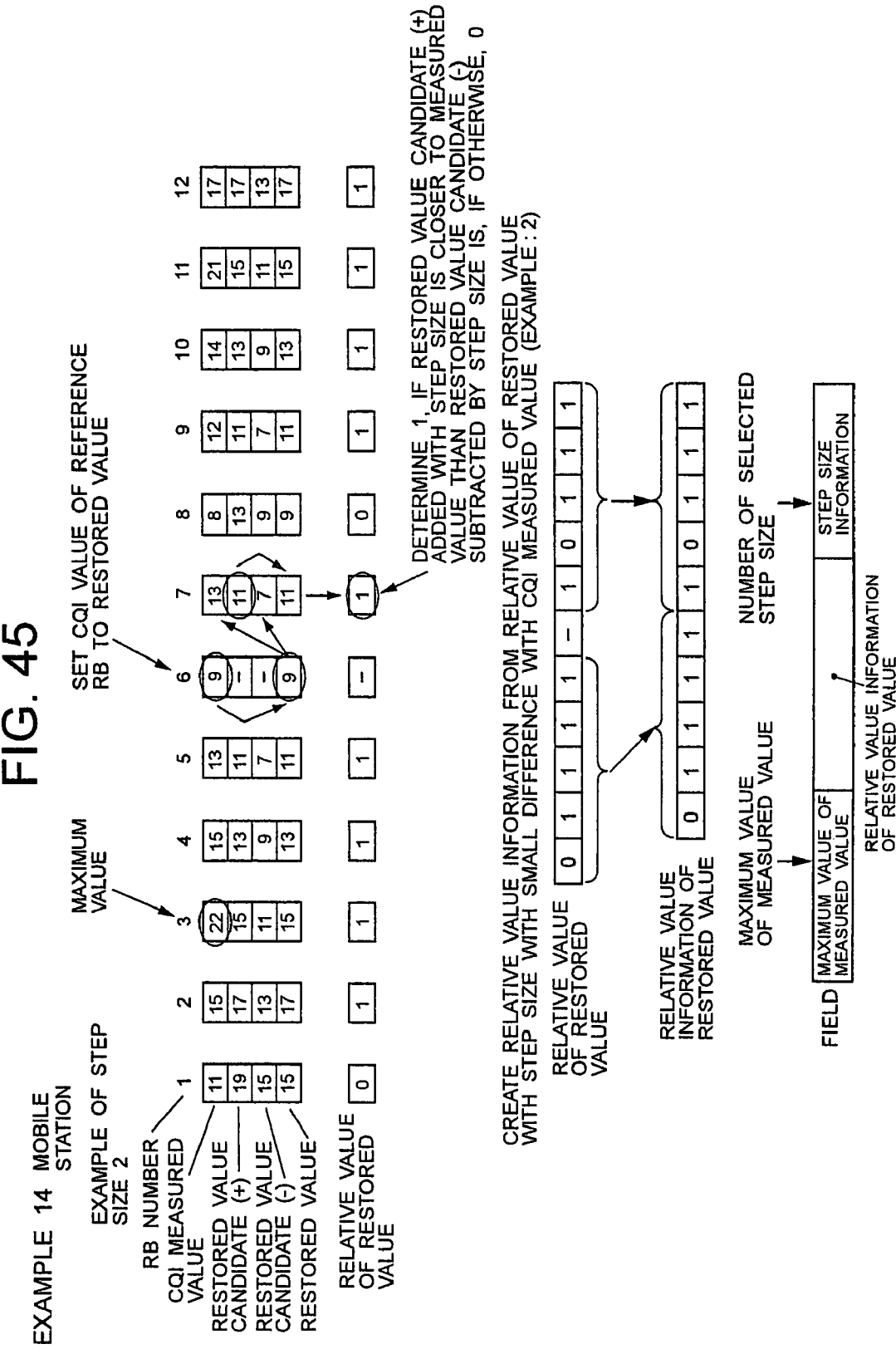
FIG. 45 is a diagram showing an example of operations of the mobile station of the fourteenth embodiment.

First, the mobile station obtains the CQI value by the CQI measuring section 1 and obtains the maximum value of the CQI value at the maximum value detecting section. The relative value of the restored value is calculated by the reference RB as in the mobile station of the eleventh embodiment. At the CQI information generating section 4, the number of the reference RB, the most preferable CQI value, the relative value information of the restored value and the step size information are transmitted. FIG. 45 shows an example of operations of the mobile station. In FIG. 45, the operations until obtaining the CQI measured value of each RB to generating a bitmap, which is the relative value information of the restored value, are the same as those in the eleventh embodiment. Then, the maximum value of the CQI measured value is obtained, the maximum value of the measured value, the relative value information of the restored value and the step size are created as a transmission sequence and informed of in the format 7 as shown in FIG. 4.

Figure 47:
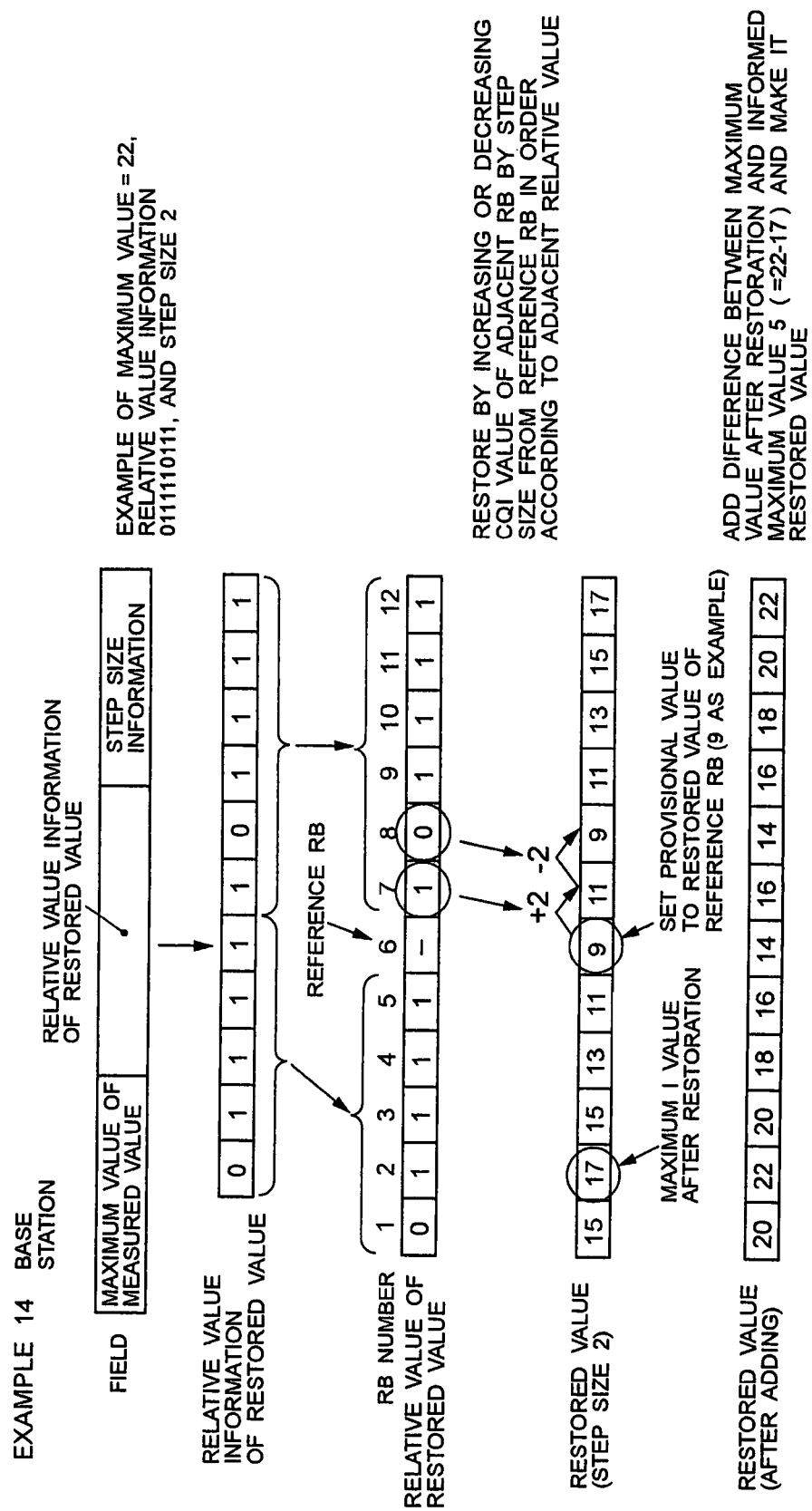
FIG. 47 is a diagram showing an example of operations of the base station of the fourteenth embodiment.

At the base station, the CQI value of the reference RB is set to a provisional value and the restored value is calculated based on the information of the relative value of the restored value. The maximum value is searched in the calculated restored values and a difference from the informed maximum value is obtained. The obtained difference is added to the restored value to correct the restored value. FIG. 47 shows an example of a calculating operation of the base station. In FIG. 47, the operations until the restored value is obtained by increasing or decreasing the step size are the same as those of the eleventh embodiment. Then, a difference between the restored maximum value and the maximum value of the informed measured values (5=22−17 in this example) is added to the restored value obtained by increasing or decreasing the step size to obtain a final restored value.

Such an operation is possible as the CQI value at the certain number of RB is informed of, instead of the maximum value of the measured value, and the CQI value is made the same value after restoration. The maximum RB may be the reference RB so that the place of the RB to be informed of. Further, the minimum value instead of the maximum value may be used as the reference value, and the median value or the average value may be used as statistics.

<The Fifteenth Embodiment (Example 15)>

Figure 48:
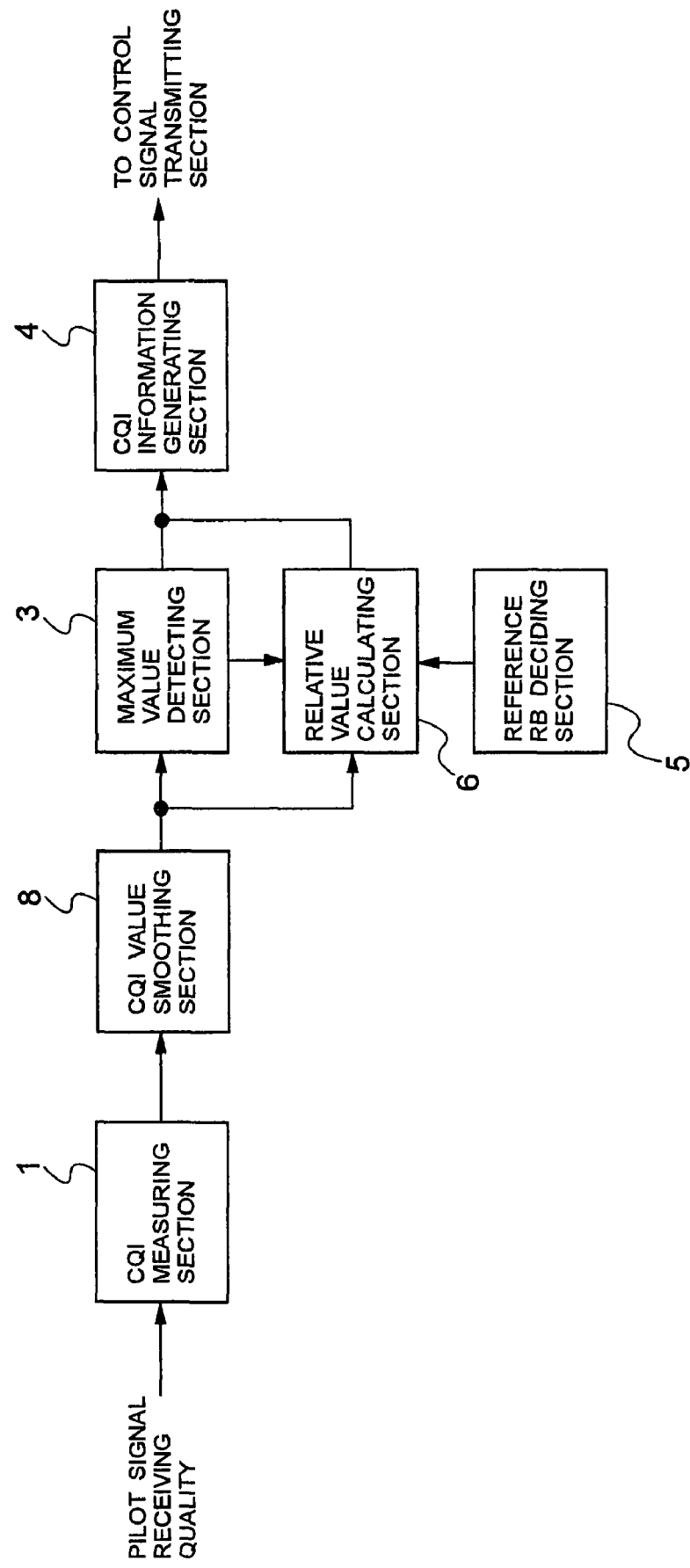
FIG. 48 is a diagram showing a configuration of the mobile station of the fifteenth embodiment.
Figure 49:
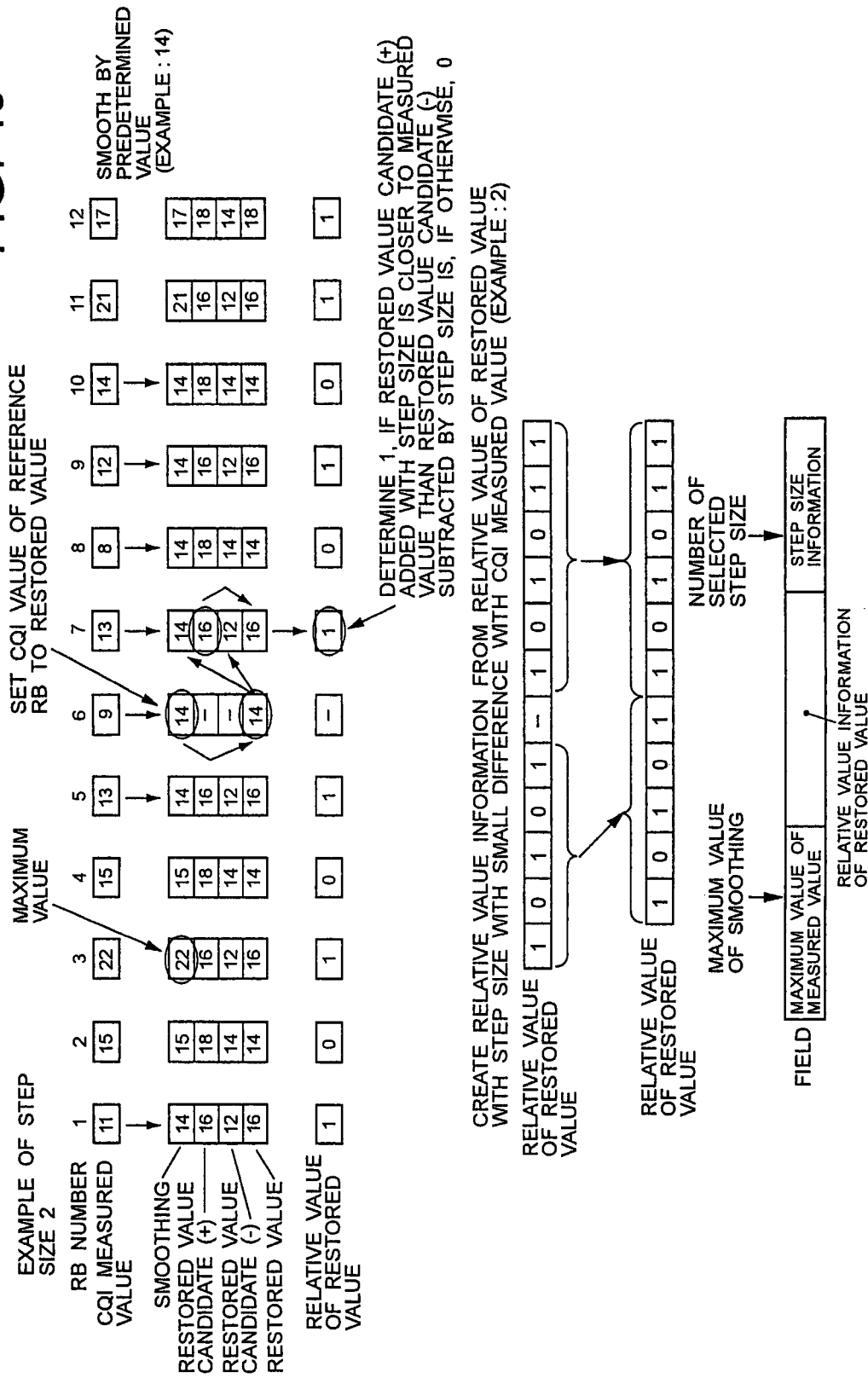
FIG. 49 is a diagram showing an example of operations of the mobile station of the fifteenth embodiment.

The configuration of the mobile station of the fifteenth embodiment is shown in FIG. 48. The fifteenth embodiment is different from the fourteenth embodiment in that the CQI value smoothing section 8 is added. The CQI value smoothing section 8 replaces the CQI value smaller than a predetermined value by the predetermined value as in the other embodiments. For example, it may be a predetermined value or an average value. A CQI value may be smoothed in a certain range by using a certain level for a reference as a smoothing level for smoothing the CQI value, other than the maximum value or the median value in addition to the abovementioned values (cut off a certain value and below). The maximum value detecting section detects and informs the maximum value for the smoothed CQI value. FIG. 49 shows an example of calculating operations of the mobile station. The transmission format 7 is applied to. As the other operations are the same as those in the fourteenth embodiment, they are omitted from the description.

<The Sixteenth Embodiment (Example 16)>

Figure 50:
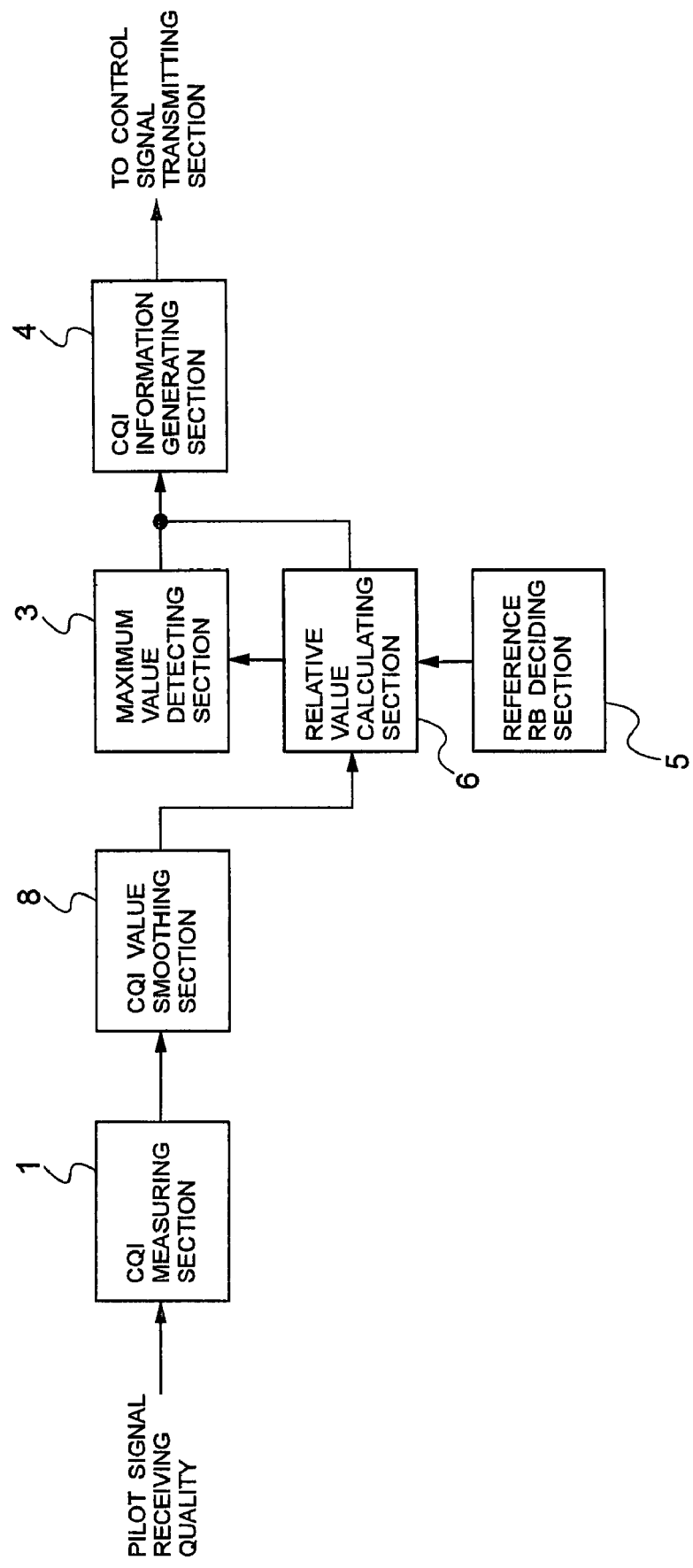
FIG. 50 is a diagram showing a configuration of the mobile station of the sixteenth embodiment.
Figure 51:
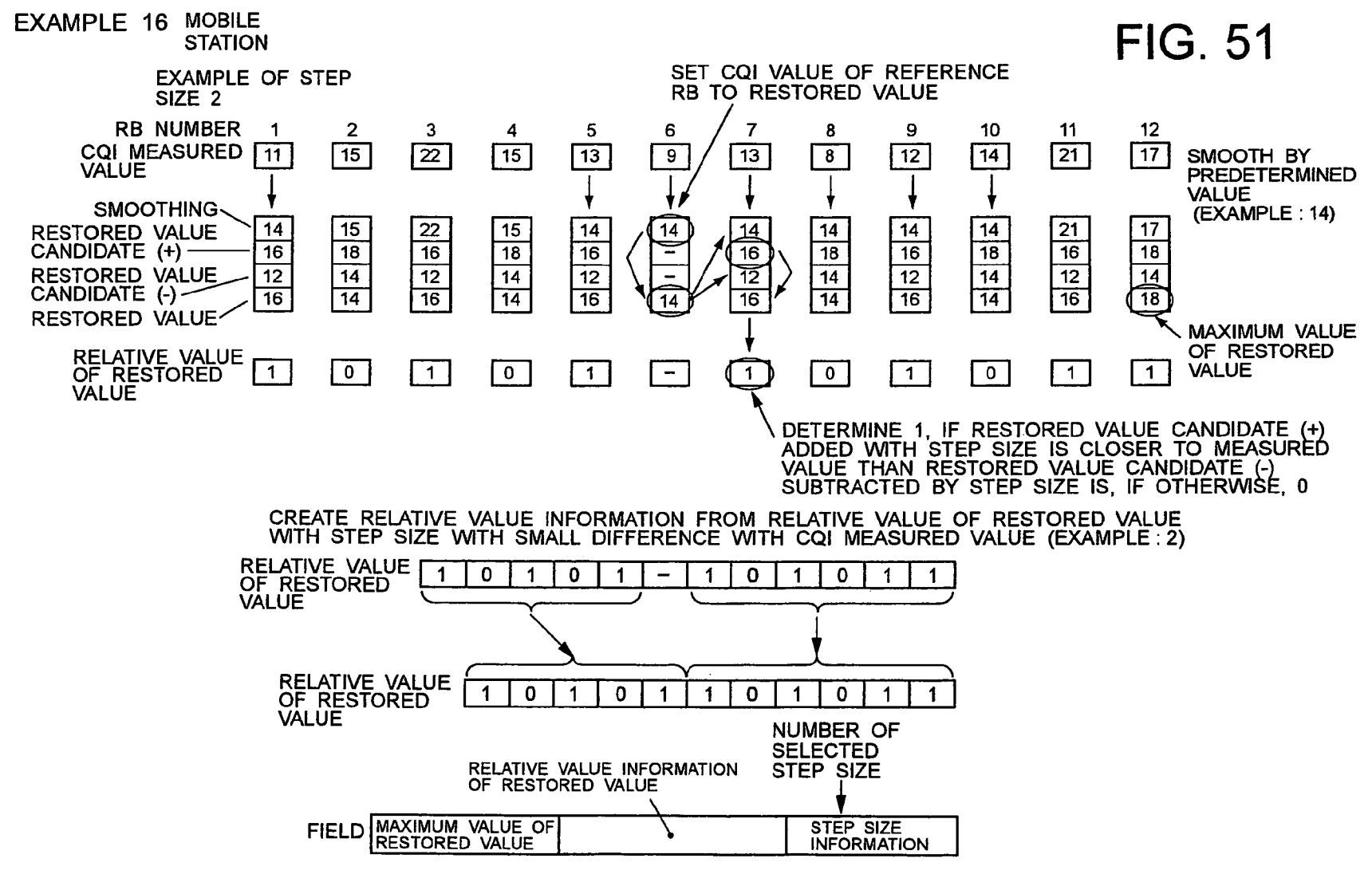
Figure 52:
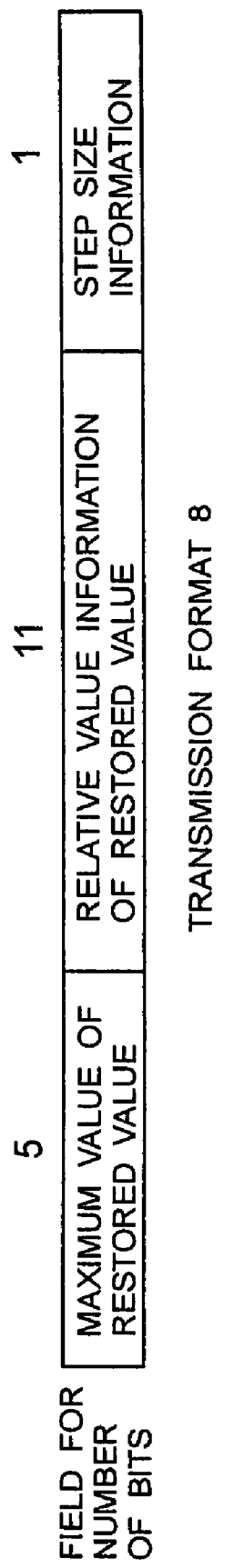
FIG. 52 is an example of a transmission format for data in the mobile station in the sixteenth to twentieth embodiments.

The configuration of the sixteenth embodiment is shown in FIG. 50. As the configuration of the base station is the same as that of the fifteenth embodiment, the block diagram for that is omitted. The sixteenth embodiment is different from the fifteenth embodiment in the operations of the maximum value detecting section of the mobile station. Although the maximum value is searched in the smoothed CQI values in the fifteenth embodiment, the maximum value is searched in the restored values and the maximum value of the restored values is informed of in the sixteenth embodiment. FIG. 51 shows an example of the calculating operations of the mobile station. In FIG. 51, first, a measured CQI value for each RB is smoothed by a predetermined value (14 in the example) and two restored value candidates are obtained and then the restored value is obtained. Then, as shown in the format 8 in FIG. 52, the maximum value of the restored values is transmitted instead of the maximum value of the measured value in the format 7. As the other operations are the same as those in the fifteenth embodiment, they are omitted from the description.

<The Seventeenth Embodiment (Example 17)>

Figure 53:
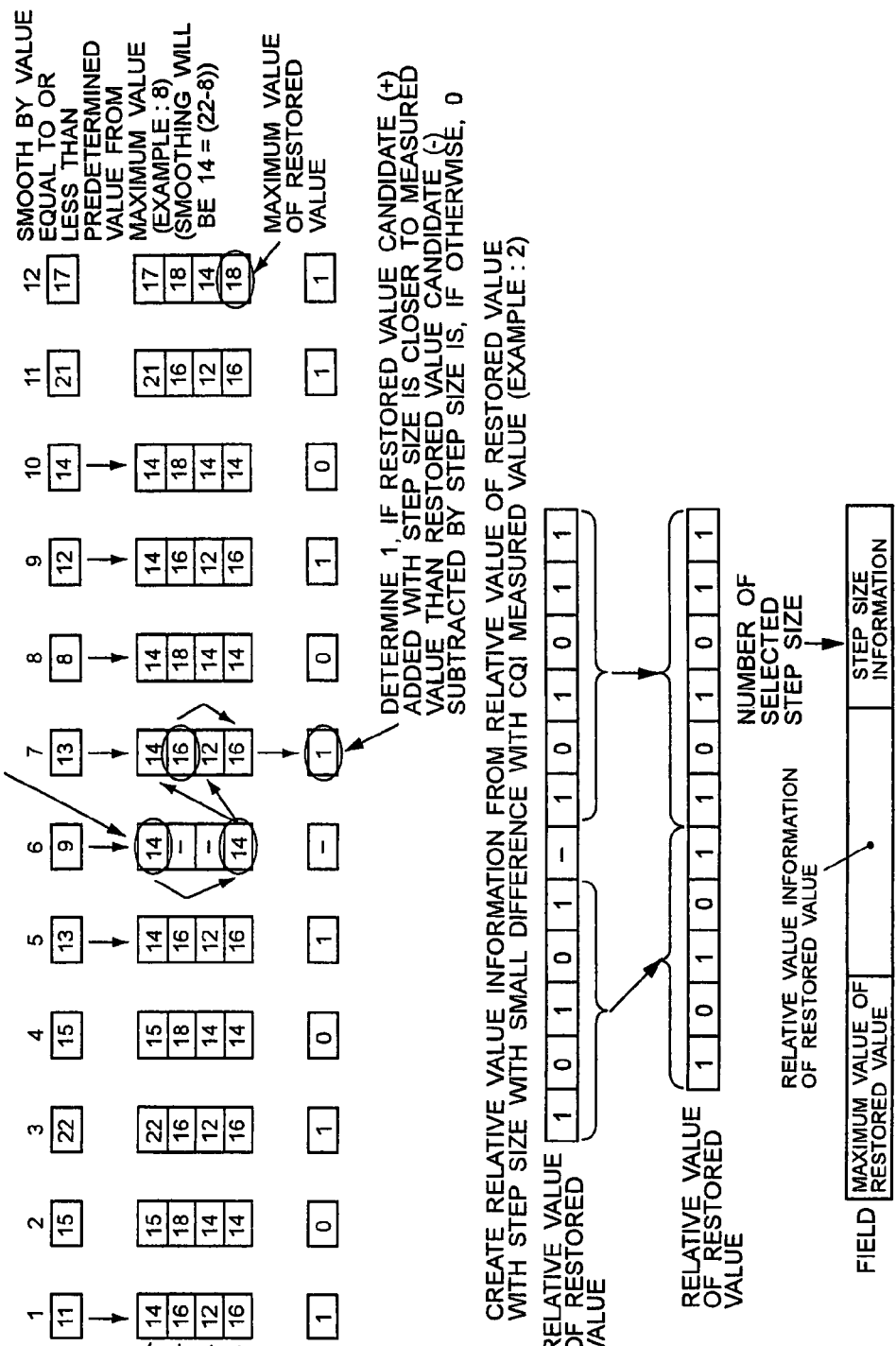
FIG. 53 is a diagram showing an example of operations of the mobile station of the seventeenth embodiment.
Figure 54:
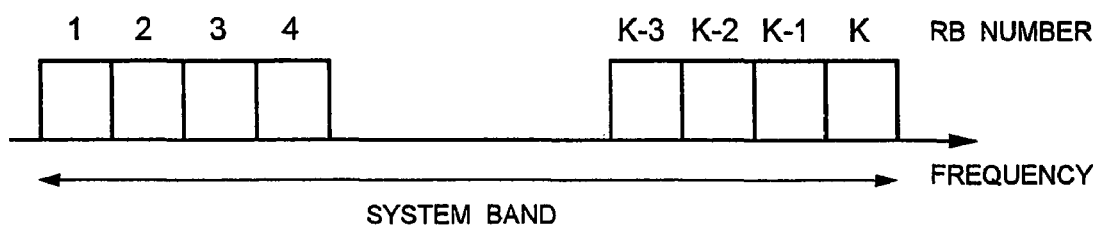
FIG. 54 is a diagram showing relationship between the system band and the RBs.

As the configuration of the seventeenth embodiment is the same as that of the sixteenth embodiment, the block diagram for that is omitted. The seventeenth embodiment is different from the sixteenth embodiment in the operations of the smoothing section of the CQI value. Smoothing in the sixteenth embodiment replaces the CQI value equal to or less than a predetermined value by the predetermined value. The seventeenth embodiment is different from the sixteenth embodiment in that the CQI values which are equal to or less than a value being small by a predetermined value from the maximum value are replaced by the value which is small by the predetermined value from the maximum value. A CQI value may be smoothed in a certain range by using a certain level for a reference as a smoothing level for smoothing the CQI value, other than the maximum value or the median value in addition to the abovementioned values (cut off a certain value and below). FIG. 53 shows an example of a calculating operation of the mobile station. The other operations are the same as those in the sixteenth embodiment, they are omitted from the description.

<The Eighteenth Embodiment (Example 18)>

As the configuration of the eighteenth embodiment is the same as that of the sixteenth embodiment, the block diagram for that is omitted. The eighteenth embodiment is different from the sixteenth embodiment in how a value is decided in smoothing. Although a predetermined value is used in the sixteenth embodiment, the eighteenth embodiment is different from the sixteenth embodiment in that a value informed from the base station is used. As the other operations are the same as those in the sixteenth embodiment, they are omitted from the description.

<The Nineteenth Embodiment (Example 19)>

As the nineteenth embodiment has the same configuration as that in the seventeenth embodiment, the block diagram for that is omitted (from the description). The nineteenth embodiment is different from the seventeenth embodiment in how a value is decided in smoothing. Although the CQI values which are equal to or less than a value being small by a predetermined value from the maximum value are replaced by the value which is small by the predetermined value from the maximum value in the seventeenth embodiment, the nineteenth embodiment is different from the seventeenth embodiment in that the CQI values which are equal to or less than the informed level from the maximum value are replaced by the value which is small by the informed level from the maximum value by using the predetermined level informed from the base station. As the other operations are the same as the seventeenth embodiment, they are omitted from the description.

<The Twentieth Embodiment (Example 20)>

As the twentieth embodiment has the same configuration as that in the nineteenth embodiment, the block diagram for that is omitted (from the description). The twentieth embodiment is different from the nineteenth embodiment in the operation of the reference RB deciding section. Although the reference RB deciding section in the nineteenth embodiment decides the reference RB according to a predetermined rule, the twentieth embodiment is different from the nineteenth embodiment in using the previously informed RB. As the other operations are the same as those of the nineteenth embodiment, they are omitted from the description.

In the seventeenth to the twentieth embodiments, the same transmission format 8 as that of the sixteenth embodiment is used for an informing format. In the seventh to the eighteenth embodiment, at the reference RB deciding section, the value may be decided according to a predetermined rule, the value informed in advance is also used as in the twentieth embodiment. In each of the formats from 1 to 8, the CRC (Cyclic Redundancy Check) code or the other information may be entered, and in the formats from 2 to 7, in which the CQI value of the reference RB is inserted, the information indicting the place of the reference RB may be entered.

As mentioned above, in the abovementioned embodiments, the formats which is transmitted by the mobile station are eight types of the formats from 1 to 8. Assuming the number of RBs is 12, the CQI value is five bits, candidates for the step size is two, the number of bits required for a time of transmission is 22 bits for the format 1, 21 bits for the format 5 and 17 bits for the other formats. On the other hand, if the CQI values for all the RBs are transmitted as they are in the conventional manner, 60 bits are required (=12×5). If the number of CQIs to be informed of increases, the amount of information that is transmitted for a time of transmission can be decreased, the CQI information required for the scheduling or adaptive modulation can be informed to the base station in short cycles even if a communication band is limited. As a result, the correct communication channel state can be informed to the base station. That can prevent the throughput of the downlink from being degraded.

In the embodiments from the fourth to the eighth and from the eleventh to the twentieth, it is not necessary to transmit the step size to the base station. Thus, it is practical to decide the step size as 1. In such a case, the amount of information further decreases by the number of bits corresponding to the step size.

In the abovementioned embodiments, the sum of differences among all the sequences or the difference among the top M RBs is indicated in calculating the minimum of the differences between the restored value obtained for each step and the measured CQI value in selecting the step size. The other things as shown below can also be considered as indicators in selecting the step size. A square error=$\Sigma(ReCQI(k)-CQI(k))\times(ReCQI(k)-CQI(k))$, that with a close average value ($\Sigma ReCQI(k)/K$), that with a close median value (Median ($ReCQI(k)$)), the average value of differences among CQIs whose measured values are at a certain level or more, the average value of differences for CQIs whose restored values are at a certain level or more, the average value of differences among CQIs whose measured values are in a certain range from the maximum value, the average value of differences for CQIs whose restored values are in a certain range from the maximum value, and the average value (sum) among the top M values may use the average value for the difference as an indicator with not only the top M measured values but also the top M restored values as objects.

Further, it may be an X percent value (X is a predetermined value from 0 to 100) instead of the average value for differences among CQIs whose measured values are at the average value or more of the measured values, the average value for differences among CQIs whose restored values are at the average value or more of the restored values, the average value for differences among CQIs whose measured values are at the median value or more of the measured values, the average value of differences among CQIs whose restored values are at the median value or more of the restored values, and the median value.

In the abovementioned embodiments, the reference RB is represented in five bits, though, the reference RB may be represented in less than five bits even if it is at the CQI level with the same number. This can also be implemented as same by setting the CQI value represented by the code of the reference RB to the restored value of the reference RB instead of setting the measured CQI value as it is to the restored value (copying), if the reference RB is represented by the code less than five bits.

It is apparent that the operations of the mobile station or the base station in each of the abovementioned embodiments can be adapted so that their operational procedures are stored in a recording medium such as a ROM in advance as a program to cause a computer (CPU) to read the program for execution. Although each of the abovementioned embodiments is described such that the mobile station measures information of the CQI and informs the information to the base station, the roles of the mobile station and the base station can be exchanged.

What is claimed is:

1. A communication system, in which a mobile station measures a communication channel quality of each of a plurality of bands obtained by dividing a communication band of a downlink and transmits a result of the measurement to a base station via an uplink,
wherein the mobile station comprises:
means for representing a communication channel quality of a first band by a first code, representing a communication channel quality of a second band by a second code by using the communication channel quality of said first band as a reference, and representing a communication channel quality of a third band by a third code by using the communication channel quality of said second band as a reference,
wherein a plurality of step sizes are decided, and
wherein said mobile station further comprises means for selecting a common step size so that communication channel quality of said first to third bands become closer to the measured communication channel quality represented by said first to third codes according to a predetermined standard,
wherein at least said first, second and third codes and information of said common step size are transmitted to said base station.

2. The communication system according to claim 1, wherein said first and second bands differ in time being in a chronological order.

3. The communication system according to claim 1, wherein said first and second bands differ in frequency being in the ascending or the descending order.

4. The communication system according to claim 1, wherein said second code and said third code correspond to codes indicating increasing or decreasing.

5. A communication system, in which a mobile station measures a communication channel quality of each of a plurality of bands obtained by dividing a communication band of a downlink and transmits a result of the measurement to a base station via an uplink, wherein the mobile station comprises:
means for representing a communication channel quality of a first band by a first code and representing a communication channel quality of a second band by a second code by using the first communication channel quality represented by said first code as a reference, and representing a communication channel quality of a third band by a third code by using the communication channel quality of said second band represented by said second code as a reference and
wherein a plurality of step sizes are decided,
wherein said mobile station further comprises means for selecting a common step size so that communication channel quality of said first to third bands become closer to the measured communication channel quality represented by said first to third codes according to a predetermined standard, and wherein at least said first and second codes and information of said common step size are transmitted to said base station.

6. The communication system according to claim 5, wherein a communication channel quality that meets a predetermined condition is replaced according to a predetermined rule before a communication channel quality of each code of said bands is represented by code.

7. A communication method, in which a mobile station measures a communication channel quality of each of a plurality of bands obtained by dividing a communication band of a downlink and transmits, a result of the measurement to a base station via an uplink, comprising:
   a step of representing a communication channel quality of a first band by a first code, representing a communication channel quality of a second band by a second code by using the communication channel quality of said first band as a reference, and representing a communication channel quality of a third band by a third code by using the communication channel quality of said second band as a reference;
   a step of deciding a plurality of step sizes;
   a step of selecting a common step size so that communication channel quality of said first to third bands become closer to the measured communication channel quality represented by said first to third codes according to a predetermined standard; and
   a step of transmitting, from the mobile station, at least said first, second and third codes and information of said common step size to said base station.

8. A mobile station for measuring a communication channel quality of each of a plurality of bands and transmit the measurement to a base station via an uplink, wherein each of the plurality of bands is obtained by dividing a downlink communication band into the plurality of bands, the mobile station comprising:
   means for representing a communication channel quality of a first band by a first code, representing a communication channel quality of a second band by a second code by using the communication channel quality of said first band as a reference, and representing a communication channel quality of a third band by a third code by using the communication channel quality of said second band as a reference; and
   wherein a plurality of step sizes are decided,
   wherein said mobile station further comprises means for selecting a common step size so that communication channel quality of said first to third bands become closer to the measured communication channel quality represented by said first to third codes according to a predetermined standard, and
   wherein at least said first, second and third codes and information of said common step size are transmitted to said base station.

9. A communication method for a mobile station to periodically measure a communication channel quality of each of a plurality of bands and transmit the measurement to a base station via an uplink,
   wherein each of the plurality of bands is obtained by dividing a downlink communication band into the plurality of bands, comprising:
   a step of representing a communication channel quality of a first band by a first code and representing a communication channel quality of a second band by a second code by using the first communication channel quality represented by said first code as a reference, and representing a communication channel quality of a third band by a third code by using the communication channel quality of said second band as a reference,
   a step of deciding a plurality of step sizes;
   a step of selecting a common step size so that communication channel quality of said first to third bands become closer to the measured communication channel quality represented by said first to third codes according to a predetermined standard; and
   a step of transmitting, from the mobile station, at least said first and said second codes and information of said common step size to said base station.

10. A mobile station for measuring a communication channel quality of each of a plurality of bands and transmitting the measurement to a base station via an uplink, wherein each of the plurality of bands is obtained by dividing a downlink communication band into the plurality of bands, comprising:
    means for representing a communication channel quality of a first band by a first code and representing a communication channel quality of a second band by a second code by using the first communication channel quality represented by said first code as a reference and representing a communication channel quality of a third band by a third code by using the communication channel quality of said second band as a reference; and
    wherein a plurality of step sizes are decided, and
    wherein said mobile station further comprises means for selecting a common step size so that communication channel quality of said first to third bands become closer to the measured communication channel quality represented by said first to third codes according to a predetermined standard, and
    wherein at least said first and said second codes and information of said common step size are transmitted to said base station.

11. A base station comprising:
    means for receiving a first and second codes from a mobile station and information of a common step size; and
    means for reproducing a communication channel quality of each band, based on said received first and second codes and information of the common step size from the mobile station,
    wherein said mobile station measures a communication channel quality of each of a plurality of bands and transmits the measurement and the first and second codes and information of the common step size to the base station via the uplink,
    wherein each of the plurality of bands is obtained by dividing a downlink communication band into the plurality of bands,
    wherein the mobile station comprises:
    means for representing a communication channel quality of a first band by the first code and representing a communication channel quality of a second band by the second code by using the first communication channel quality represented by said first code as a reference and representing a communication channel quality of a third band by a third code by using the communication channel quality of said second band as a reference, and
    wherein a plurality of step sizes are decided, and said mobile station further comprises means for selecting a common step size so that communication channel quality of said first to third bands become closer to the measured communication channel quality represented by said first to third codes according to a predetermined standard.

* * * * *